United States Patent
Takahashi et al.

(10) Patent No.: US 9,564,767 B2
(45) Date of Patent: Feb. 7, 2017

(54) POWER STORAGE DEVICE CONTROL SYSTEM, POWER STORAGE SYSTEM, AND ELECTRICAL APPLIANCE

(71) Applicant: SEMICONDUCTOR ENERGY LABORATORY CO., LTD., Atsugi-shi, Kanagawa-ken (JP)

(72) Inventors: Minoru Takahashi, Nagano (JP); Junpei Momo, Kanagawa (JP); Yutaka Shionoiri, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 493 days.

(21) Appl. No.: 14/136,732

(22) Filed: Dec. 20, 2013

(65) Prior Publication Data
US 2014/0184162 A1    Jul. 3, 2014

(30) Foreign Application Priority Data
Dec. 28, 2012 (JP) ................. 2012-287574

(51) Int. Cl.
*H01G 11/06* (2013.01)
*H01M 10/44* (2006.01)
*H01M 10/42* (2006.01)
*H02J 7/00* (2006.01)

(52) U.S. Cl.
CPC .............. *H02J 7/007* (2013.01); *H02J 7/0057* (2013.01); *H01M 10/4207* (2013.01)

(58) Field of Classification Search
CPC ............ H01G 11/06; H02J 7/007; H02J 7/00; H01M 10/441; H01M 10/44; H01M 10/42; H01M 10/425
USPC .................. 320/128, 166; 361/502; 429/158
See application file for complete search history.

(56) References Cited

U.S. PATENT DOCUMENTS

| | | |
|---|---|---|
| 7,674,650 B2 | 3/2010 | Akimoto et al. |
| 2012/0034526 A1 | 2/2012 | Kurahashi |
| 2012/0161709 A1 | 6/2012 | Fujii et al. |
| 2013/0162197 A1 | 6/2013 | Takahashi et al. |

FOREIGN PATENT DOCUMENTS

| | | |
|---|---|---|
| JP | 2002-112463 A | 4/2002 |
| JP | 2002-171675 A | 6/2002 |
| JP | 2006-197676 A | 7/2006 |
| JP | 2008-278635 A | 11/2008 |
| JP | 2012-135154 A | 7/2012 |
| WO | WO 2010/113268 A1 | 10/2010 |

*Primary Examiner* — Richard Isla Rodas
*Assistant Examiner* — Dung V Bui
(74) *Attorney, Agent, or Firm* — Nixon Peabody LLP; Jeffrey L. Costellia

(57) ABSTRACT

Deterioration of a power storage device is reduced. Switches that control the connections of a plurality of power storage devices separately are provided. The switches are controlled with a plurality of control signals, so as to switch between charge and discharge of each of the power storage devices or between serial connection and parallel connection of the plurality of power storage devices. Further, a semiconductor circuit having a function of carrying out arithmetic is provided for the power storage devices, so that a control system of the power storage devices or a power storage system is constructed.

17 Claims, 25 Drawing Sheets

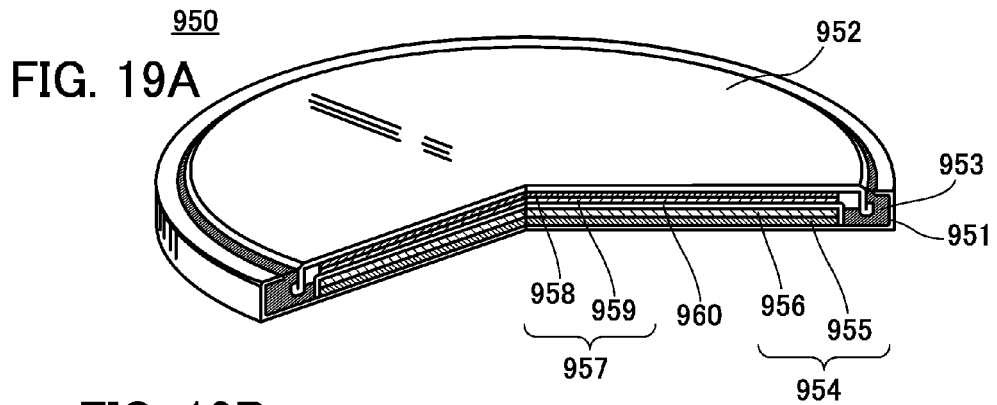
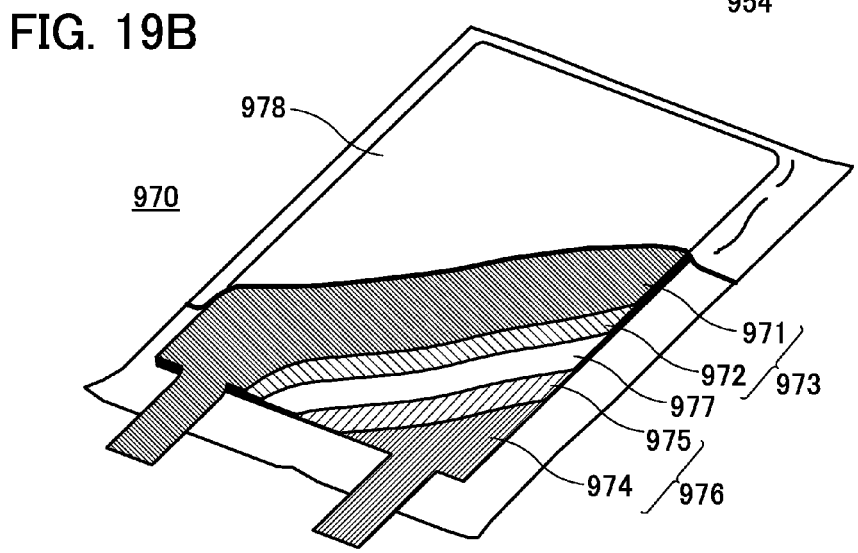
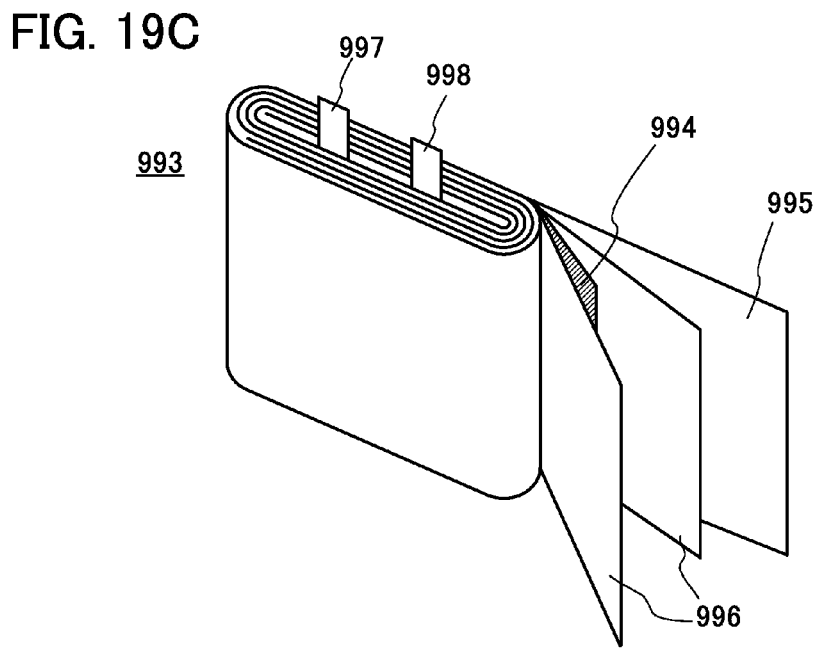

POWER STORAGE DEVICE CONTROL SYSTEM, POWER STORAGE SYSTEM, AND ELECTRICAL APPLIANCE

BACKGROUND OF THE INVENTION

1. Field of the Invention

The present invention relates to an object (a product including a machine, a manufacture, and a composition of matter) and a method (a process including a simple method and a production method). In particular, the present invention relates to a power storage device, a control system of a power storage device, a power storage system, an electronic circuit, a semiconductor device, a display device, a light-emitting device, and an electrical appliance, and further to a driving method thereof and a manufacturing method thereof. More specifically, the present invention relates to a power storage device, a control system of a power storage device, a power storage system, an electronic circuit, a semiconductor device, a display device, a light-emitting device, and an electrical appliance which include an oxide semiconductor, and further to a driving method thereof and a manufacturing method thereof.

2. Description of the Related Art

In recent years, various power storage devices such as secondary batteries including lithium-ion secondary batteries and the like, lithium-ion capacitors, and air cells have been actively developed (e.g., Patent Document 1). In particular, demand for lithium-ion secondary batteries with high output and high energy density has rapidly grown with the development of the semiconductor industry, for electrical appliances, for example, portable information terminals such as mobile phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

As another example of the conventional power storage device, there is a power storage system in which a plurality of battery cells is connected in series (e.g., Patent Document 2).

REFERENCE

Patent Document

[Patent Document 1] PCT International Publication No. 10/113,268
[Patent Document 2] Japanese Published Patent Application No. 2012-135154

SUMMARY OF THE INVENTION

The conventional power storage device has problems of a capacity decrease and a resistance increase due to gradual deterioration by repetitive charge and discharge.

For example, in the case of a lithium-ion secondary battery, the resistance of a negative electrode may increase in a charge period. One of the reasons is that carrier ions from a positive electrode are precipitated on a negative electrode when the potential of the negative electrode becomes below the allowable value.

In addition, in a conventional power storage device in which a plurality of battery cells is connected in series, if there is a variation in resistance among the battery cells at the time of charge, the battery cells are charged with the voltage of the battery cell having the highest resistance as a reference. Accordingly, all of the plurality of battery cells cannot be fully charged.

An object of one embodiment of the present invention is to reduce deterioration of a power storage device or the like.

An object of one embodiment of the present invention is to decrease the reduction in the capacity of a power storage device or the like due to charge or discharge.

An object of one embodiment of the present invention is to increase charge efficiency in a plurality of battery cells.

An object of one embodiment of the present invention is to control a power storage device or the like with low power.

An object of one embodiment of the present invention is to improve the reliability of a power storage device or the like.

An object of one embodiment of the present invention is to improve the safety of a power storage device or the like.

An object of one embodiment of the present invention is to provide a novel control system of a power storage device, a novel power storage device, and the like.

An object of one embodiment of the present invention is to provide an efficient control system of a power storage device, an efficient power storage device, and the like.

An object of one embodiment of the present invention is to provide a highly reliable semiconductor device or the like.

In particular, one embodiment of the present invention can achieve at least one of the objects set forth above, in some cases. Note that one embodiment of the present invention does not necessarily achieve all the objects set forth above. If an object is not described above but apparent from the description of the specification, drawings, the scope of claims, and the like, the object can be regarded as it is.

The present inventors have hit upon an idea of providing switches that control the connections of a plurality of power storage devices separately in order to switch between charge and discharge of each power storage device or between serial connection and parallel connection of the plurality of power storage devices.

Further, the present inventors have hit upon an idea of incorporating a control circuit in the power storage devices to construct a control system of the power storage devices or a power storage system.

One embodiment of the present invention is a control system of a power storage device configured to control charge and discharge of at least a first power storage element, a second power storage element, a third power storage element, and a fourth power storage element. The control system includes a pair of first switches, a pair of second switches, a pair of third switches, a pair of fourth switches, a fifth switch, an encoder, a semiconductor circuit, a pair of first connection terminals capable of being electrically connected to a power supply, and a pair of second connection terminals capable of being electrically connected to a load. The pair of first switches have a function of determining, based on a first control signal, to which connection terminal the first power storage element is electrically connected to, the pair of first connection terminals or one of the pair of second connection terminals. The pair of second switches have a function of determining, based on a second control signal, to which connection terminal the second power storage element is electrically connected to, the pair of first connection terminals or one of the pair of second connection terminals. The pair of third switches have a function of determining, based on a third control signal, to which connection terminal the third power storage element is electrically connected to, the pair of first connection terminals or the pair of second connection terminals. The pair of fourth switches have a function of determining, based on a fourth control signal, to which connection terminal the fourth power storage element is electrically connected to, the pair of first connection terminals or the pair of second connection terminals. The fifth switch has a function of determining, based on one of the first to fourth control signals, whether to electrically and serially connect at least one of the first power storage element and the second power storage element to at least one of the third power storage element and the second power storage element. The encoder has a function of encoding a plurality of inputted data signals to generate and output at least the first control signal, the second control signal, the third control signal, and the fourth control signal. The semiconductor circuit has a function of outputting data of instruction to charge or discharge the first power storage element, the second power storage element, the third power storage element, and the fourth power storage element, as the plurality of data signals.

In the above-described control system of a power storage device, the semiconductor circuit may include a processor, a memory electrically connected to the processor, and a controller electrically connected to the processor and the memory. The processor may include a register, and the register may include a first memory circuit having a function of retaining data for a period in which power is supplied to the processor and a second memory circuit having a function of retaining data for a period in which power supply to the processor is stopped. The second memory circuit may include a transistor having a function of controlling writing and retention of data, and the transistor may have an off-state current of 100 zA or lower per micrometer of channel width.

One embodiment of the present invention is a power storage system that includes the above-described control system and the first to fourth power storage elements.

One embodiment of the present invention is an electrical appliance including the above-described power storage system.

The reduction in the capacity of a power storage device due to charge can be decreased. The control of a power storage device can be performed with low power. The reliability of a power storage device can be improved. The safety of a power storage device can be improved. A novel power storage device can be provided. An efficient power storage device can be provided. The efficiency of charging a plurality of power storage devices can be increased.

A highly reliable semiconductor device can be provided.

BRIEF DESCRIPTION OF THE DRAWINGS

In the accompanying drawings:
FIGS. 19A to 19C show power storage devices.

DETAILED DESCRIPTION OF THE INVENTION

Figure 1:
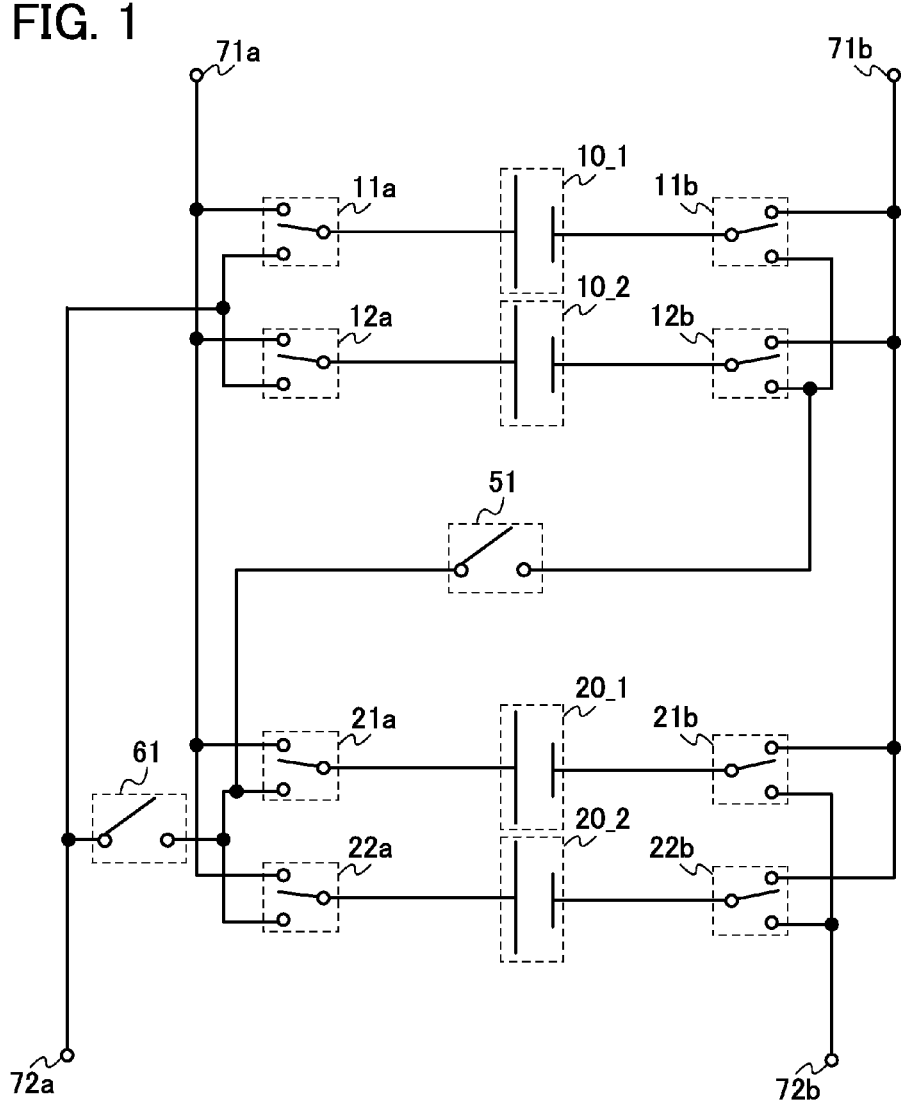
FIG. 1 shows a power storage system.

Embodiments of the present invention will be described in detail below with reference to the drawings.

However, the present invention is not limited to the description of the embodiments, and it is easily understood by those skilled in the art that the modes can be modified in various ways. Therefore, the invention should not be construed as being limited to the description in the following embodiments.

Note that in drawings used in this specification, the thicknesses of films, layers, and substrates and the sizes of components (e.g., the sizes of regions) are exaggerated for simplicity in some cases. Therefore, the sizes of the components are not limited to those in the drawings and relative sizes between the components in the drawings.

Note that the ordinal numbers such as "first" and "second" in this specification and the like are used for convenience and do not denote the order of steps, the stacking order of layers, or the like. In addition, the ordinal numbers in this specification and the like do not denote particular names which specify the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

Note that a resist mask or the like might be reduced in size unintentionally owing to treatment such as etching in an actual manufacturing process; however, the reduction is not shown in the drawings in some cases for easy understanding.

Note that the term such as "over" or "below" in this specification and the like does not necessarily mean that a component is placed "directly on" or "directly under" another component. For example, the expression "a gate electrode over a gate insulating layer" can mean the case where there is an additional component between the gate insulating layer and the gate electrode.

Note that a voltage refers to a potential difference between a certain potential and a reference potential (e.g., a ground potential (GND) or a source potential) in many cases. Accordingly, a voltage can also be called a potential.

In addition, in this specification and the like, the term such as "electrode" or "wiring" does not limit the function of the component itself. For example, an "electrode" is sometimes a part of a "wiring", and vice versa. Furthermore, the term "electrode" or "wiring" can include the case where a plurality of "electrodes" or "wirings" is formed in an integrated manner.

Functions of a "source" and a "drain" are sometimes replaced with each other when a transistor of opposite polarity is used or when the direction of current flowing is changed in circuit operation, for example. Therefore, the terms "source" and "drain" can be replaced with each other in this specification and the like.

In this specification and the like, a connection includes an electrical connection, a functional connection, and a direct connection. A connection relation of components described in embodiments is not limited to the connection relation illustrated in the drawings and described in the specification.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, even when such portions are not specified, one embodiment of the invention can be clear and it can be determined that one embodiment of the invention is disclosed in this specification and the like, in some cases. In particular, in the case where there are several possible portions to which a terminal can be connected, it is not necessary to specify all the portions to which the terminal is connected. Thus, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least connection portions of a circuit are specified. Alternatively, it might be possible for those skilled in the art to specify the invention when at least a function of a circuit is specified. In other words, when a function of a circuit is specified, one embodiment of the present invention can be clear and it can be determined that one embodiment of the invention is disclosed in this specification and the like, in some cases. Thus, when not a function but connection portions of a circuit are specified, the circuit is disclosed as one embodiment of the invention, and one embodiment of the invention can be constituted. Alternatively, when not connection portions but a function of a circuit is specified, the circuit is disclosed as one embodiment of the invention, and one embodiment of the invention can be constituted.

Note that in this specification and the like, a positive electrode and a negative electrode for a secondary battery may be collectively referred to as electrodes; the electrode in this case refers to at least one of the positive electrode and the negative electrode.

Note that in this specification and the like, a charging rate C refers to the rate at which a secondary battery is charged. For example, the charging rate in the case of charging a battery having a capacity of 1 Ah with 1 A is 1 C. In addition, a discharging rate C refers to the rate at which a secondary battery is discharged. For example, the discharging rate in the case of discharging a battery having a capacity of 1 Ah with 1 A is 1 C.

Contents described in Detailed Description of the Invention can be combined as appropriate.

Embodiment 1

Power Storage System

Examples of a power storage device and a power storage system will be described.

[1.1. Configuration]

A circuit configuration example of a power storage system will be described with reference to FIG. 1.

The power storage system illustrated in FIG. 1 includes a power storage element 10_1, a power storage element 10_2, a power storage element 20_1, a power storage element 20_2, a pair of switches 11 (a switch 11a and a switch 11b), a pair of switches 12 (a switch 12a and a switch 12b), a pair of switches 21 (a switch 21a and a switch 21b), a pair of switches 22 (a switch 22a and a switch 22b), a switch 51, and a switch 61.

For example, the switch 11a and the switch 11b has a function of determining to which connection terminal the power storage element 10_1 is connected to, a pair of connection terminals 71 (a connection terminal 71a and a connection terminal 71b) or a connection terminal 72a. Alternatively, for example, the switch 11a has a function of determining whether to connect the power storage element 10_1 to the pair of connection terminals 71 (the connection terminal 71a). Alternatively, for example, the switch 11a has a function of determining whether to connect the power storage element 10_1 to the connection terminal 72a. Similarly, for example, the switch 11b has a function of determining whether to connect the power storage element 10_1 to the pair of connection terminals 71 (the connection terminal 71b). Alternatively, for example, the switch 11b has a function of determining whether to connect the power storage element 10_1 to the connection terminal 72a. Alternatively, for example, the switch 11a has a function of preventing the power storage element 10_1 from connecting to any terminal. Similarly, for example, the switch 11b has a function of preventing the power storage element 10_1 from connecting to any terminal.

The connection terminal 71a and the connection terminal 71b are terminals that can be connected to a power supply, for example.

The connection terminal 72a and the connection terminal 72b are terminals that can be connected to a load, for example.

For example, the switch 12a and the switch 12b have a function of determining to which connection terminal the power storage element 10_2 is connected to, the connection terminals 71a and 71b or the connection terminal 72a.

For example, the switch 21a and the switch 21b have a function of determining to which connection terminal the power storage element 20_1 is connected to, the connection terminals 71a and 71b or the connection terminals 72a and 72b. Alternatively, for example, the switch 21a has a function of determining whether to connect the power storage element 20_1 to the connection terminal 71a. Alternatively, for example, the switch 21a has a function of determining whether to connect the power storage element 20_1 to the connection terminal 72a. Similarly, for example, the switch 21b has a function of determining whether to connect the power storage element 20_1 to the connection terminal 71b. Alternatively, for example, the switch 21b has a function of determining whether to connect the power storage element 20_1 to the connection terminal 72b. Alternatively, for example, the switch 21a has a function of preventing the power storage element 20_1 from connecting to any terminal. Similarly, for example, the switch 21b has a function of preventing the power storage element 20_1 from connecting to any terminal.

For example, the switch 22a and the switch 22b have a function of determining to which connection terminal the power storage element 20_2 is connected to, the connection terminals 71a and 71b or the connection terminals 72a and 72b. Alternatively, for example, the switch 22a has a function of determining whether to connect the power storage element 20_2 to the connection terminal 71a. Alternatively, for example, the switch 22a has a function of determining whether to connect the power storage element 20_2 to the connection terminal 72a. Similarly, for example, the switch 22b has a function of determining whether to connect the power storage element 20_2 to the connection terminal 71b. Alternatively, for example, the switch 22b has a function of determining whether to connect the power storage element 20_2 to the connection terminal 72a. Alternatively, for example, the switch 22a has a function of preventing the power storage element 20_2 from connecting to any terminal. Similarly, for example, the switch 22b has a function of preventing the power storage element 20_2 from connecting to any terminal.

Note that phrases "a switch connects A to B" and "a switch does not connect A to B" are used to refer to the state in which A and B are in a conducting state and the state in which A and B are out of a conducting state, respectively, in some cases. Further, the phrases "a switch connects A to B" and "a switch does not connect A to B" are used to refer to the state of the switch being in a conducting state (on state) and in a non-conducting state (off state), respectively, in some cases.

The switch 51 has a function of determining whether to serially connect at least one of the power storage elements 10_1 and 10_2 to at least one of the power storage elements 20_1 and 20_2.

The switch 61 has a function of determining whether to serially connect at least one of the power storage elements 10_1 and 10_2 to at least one of the power storage elements 20_1 and 20_2.

Figure 2:
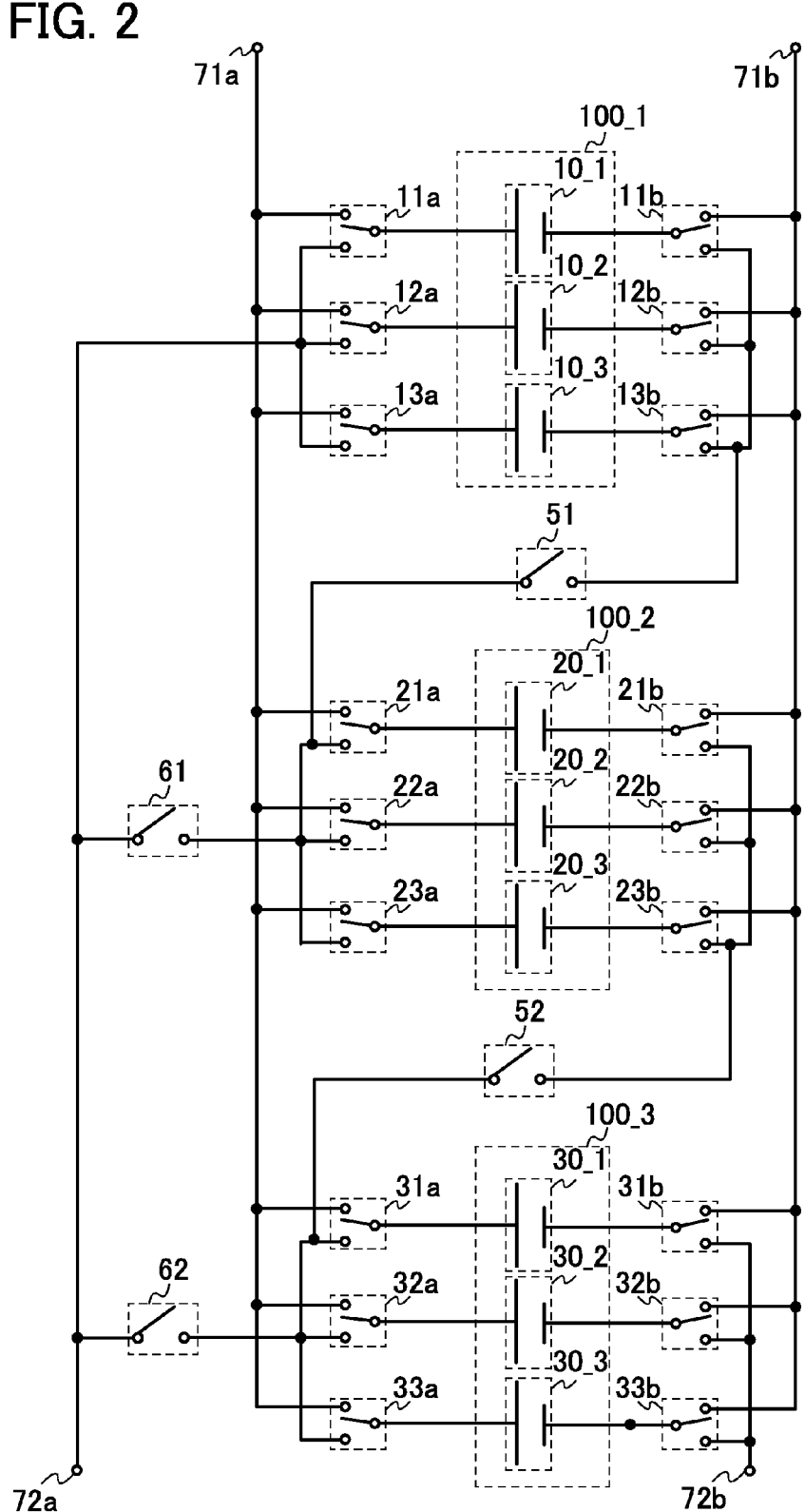
FIG. 2 shows a power storage system.

Note that the number of power storage elements and switches is not limited to that shown in FIG. 1. For example, as shown in FIG. 2, the number of power storage elements and switches may be increased; also in this case, switches are provided for each of a plurality of power storage elements. A configuration of a power storage system shown in FIG. 2 will be described below. The description of the configuration shown in FIG. 1 can be referred to as appropriate for the configuration of FIG. 2, and vice versa.

The power storage system shown in FIG. 2 includes a power storage elements 10_1 to a power storage element 10_3, a power storage element 20_1 to a power storage element 20_3, a power storage element 30_1 to a power storage element 30_3, a pair of switches 11 (a switch 11a and a switch 11b), a pair of switches 12 (a switch 12a and a switch 12b), a pair of switches 13 (a switch 13a and a switch 13b), a pair of switches 21 (a switch 21a and a switch 21b), a pair of switches 22 (a switch 22a and a switch 22b), a pair of switches 23 (a switch 23a and a switch 23b), a pair of switches 31 (a switch 31a and a switch 31b), a pair of switches 32 (a switch 32a and a switch 32b), a pair of switches 33 (a switch 33a and a switch 33b), a switch 51, a switch 52, a switch 61, a switch 62, a pair of connection terminals 71 (a connection terminal 71a and a connection terminal 71b), and a pair of connection terminals 72 (a connection terminal 72a and a connection terminal 72b).

The power storage element 10_1 to the power storage element 10_3 are provided in a cell 100_1. The power storage element 20_1 to the power storage element 20_3 are provided in a cell 100_2. The power storage element 30_1 to the power storage element 30_3 are provided in a cell 100_3. The power storage elements are each an element including at least a pair of electrodes and an electrolyte and having a function of storing power. Note that the power storage elements may be used as power storage devices. Alternatively, one cell may be used as one power storage device or battery cell. Alternatively, one cell may be used as one assembled battery.

As the power storage elements 10_1 to 10_3, the power storage elements 20_1 to 20_3, and the power storage elements 30_1 to 30_3, secondary batteries such as a lithium-ion secondary battery, a lead storage battery, a lithium-ion polymer secondary battery, a nickel-metal hydride battery, a nickel-cadmium battery, a nickel-iron battery, a nickel-zinc battery, and a zinc-silver oxide battery; secondary flow batteries such as a redox flow battery, a zinc-chlorine battery, and a zinc-bromide battery; mechanically rechargeable secondary batteries such as an aluminum-air battery, a zinc-air battery, and an iron-air battery; and high-operating-temperature secondary batteries such as a sodium-sulfur battery and a lithium-iron sulfide battery; and the like can be used, for example. However, without being limited to these secondary batteries, the power storage elements 10_1 to 10_3, the power storage elements 20_1 to 20_3, and the power storage elements 30_1 to 30_3 may have other structures using a lithium-ion capacitor or the like, for example.

The switch 11a, the switch 11b, the switch 12a, the switch 12b, the switch 13a, the switch 13b, the switch 21a, the switch 21b, the switch 22a, the switch 22b, the switch 23a, the switch 23b, the switch 31a, the switch 31b, the switch 32a, the switch 32b, the switch 33a, and the switch 33b each have at least three terminals (a first terminal, a second terminal, and a third terminal). For example, the switches having three terminals may be formed using a plurality of transistors. Alternatively, the switches having three terminals may be formed using microelectromechanical systems (also referred to as MEMS). Alternatively, the switches having three terminals may be other electrical switches or mechanical switches.

The first terminal of the switch 11a is connected to a positive electrode of the power storage element 10_1, the second terminal of the switch 11a is connected to the connection terminal 71a, and the third terminal of the switch 11a is connected to the third terminal of the switch 12a, the third terminal of the switch 13a, and the connection terminal 72a.

The first terminal of the switch 11b is connected to a negative electrode of the power storage element 10_1, the second terminal of the switch 11b is connected to the connection terminal 71b, and the third terminal of the switch 11b is connected to the third terminal of the switch 12b and the third terminal of the switch 13b.

For example, the switch 11a and the switch 11b have a function of determining to which connection terminal the power storage element 10_1 is connected to, the connection terminals 71a and 71b or the connection terminal 72a.

The first terminal of the switch 12a is connected to a positive electrode of the power storage element 10_2, the second terminal of the switch 12a is connected to the connection terminal 71a, and the third terminal of the switch 12*a* is connected to the third terminal of the switch 11*a*, the third terminal of the switch 13*a*, and the connection terminal 72*a*.

The first terminal of the switch 12*b* is connected to a negative electrode of the power storage element 10_2, the second terminal of the switch 12*b* is connected to the connection terminal 71*b*, and the third terminal of the switch 12*b* is connected to the third terminal of the switch 11*b* and the third terminal of the switch 13*b*.

For example, the switch 12*a* and the switch 12*b* have a function of determining to which connection terminal the power storage element 10_2 is connected to, the connection terminals 71*a* and 71*b* or the connection terminal 72*a*.

The first terminal of the switch 13*a* is connected to a positive electrode of the power storage element 10_3, the second terminal of the switch 13*a* is connected to the connection terminal 71*a*, and the third terminal of the switch 13*a* is connected to the third terminal of the switch 11*a*, the third terminal of the switch 12*a*, and the connection terminal 72*a*.

The first terminal of the switch 13*b* is connected to a negative electrode of the power storage element 10_3, the second terminal of the switch 13*b* is connected to the connection terminal 71*b*, and the third terminal of the switch 13*b* is connected to the third terminal of the switch 11*b* and the third terminal of the switch 12*b*.

For example, the switch 13*a* and the switch 13*b* have a function of determining to which connection terminal the power storage element 10_3 is connected to, the connection terminals 71*a* and 71*b* or the connection terminal 72*a*.

The first terminal of the switch 21*a* is connected to a positive electrode of the power storage element 20_1, the second terminal of the switch 21*a* is connected to the connection terminal 71*a*, and the third terminal of the switch 21*a* is connected to the third terminal of the switch 22*a*, the third terminal of the switch 23*a*, and the connection terminal 72*a*.

The first terminal of the switch 21*b* is connected to a negative electrode of the power storage element 20_1, the second terminal of the switch 21*b* is connected to the connection terminal 71*b*, and the third terminal of the switch 21*b* is connected to the third terminal of the switch 22*b* and the third terminal of the switch 23*b*.

For example, the switch 21*a* and the switch 21*b* have a function of determining to which connection terminal the power storage element 20_1 is connected to, the connection terminals 71*a* and 71*b* or the connection terminal 72*a*.

The first terminal of the switch 22*a* is connected to a positive electrode of the power storage element 20_2, the second terminal of the switch 22*a* is connected to the connection terminal 71*a*, and the third terminal of the switch 22*a* is connected to the third terminal of the switch 21*a*, the third terminal of the switch 23*a*, and the connection terminal 72*a*.

The first terminal of the switch 22*b* is connected to a negative electrode of the power storage element 20_2, the second terminal of the switch 22*b* is connected to the connection terminal 71*b*, and the third terminal of the switch 22*b* is connected to the third terminal of the switch 21*b* and the third terminal of the switch 23*b*.

For example, the switch 22*a* and the switch 22*b* have a function of determining to which connection terminal the power storage element 20_2 is connected to, the connection terminals 71*a* and 71*b* or the connection terminal 72*a*.

The first terminal of the switch 23*a* is connected to a positive electrode of the power storage element 20_3, the second terminal of the switch 23*a* is connected to the connection terminal 71*a*, and the third terminal of the switch 23*a* is connected to the third terminal of the switch 21*a*, the third terminal of the switch 22*a*, and the connection terminal 72*a*.

The first terminal of the switch 23*b* is connected to a negative electrode of the power storage element 20_3, the second terminal of the switch 23*b* is connected to the connection terminal 71*b*, and the third terminal of the switch 23*b* is connected to the third terminal of the switch 21*b* and the third terminal of the switch 22*b*.

For example, the switch 23*a* and the switch 23*b* have a function of determining to which connection terminal the power storage element 20_3 is connected to, the connection terminals 71*a* and 71*b* or the connection terminal 72*a*.

The first terminal of the switch 31*a* is connected to a positive electrode of the power storage element 30_1, the second terminal of the switch 31*a* is connected to the connection terminal 71*a*, and the third terminal of the switch 31*a* is connected to the third terminal of the switch 32*a*, the third terminal of the switch 33*a*, and the connection terminal 72*a*.

The first terminal of the switch 31*b* is connected to a negative electrode of the power storage element 30_1, the second terminal of the switch 31*b* is connected to the connection terminal 71*b*, and the third terminal of the switch 31*b* is connected to the third terminal of the switch 32*b*, the third terminal of the switch 33*b*, and the connection terminal 72*b*.

For example, the switch 31*a* and the switch 31*b* have a function of determining to which connection terminal the power storage element 30_1 is connected to, the connection terminals 71*a* and 71*b* or the connection terminals 72*a* and 72*b*.

The first terminal of the switch 32*a* is connected to a positive electrode of the power storage element 30_2, the second terminal of the switch 32*a* is connected to the connection terminal 71*a*, and the third terminal of the switch 32*a* is connected to the third terminal of the switch 31*a*, the third terminal of the switch 33*a*, and the connection terminal 72*a*.

The first terminal of the switch 32*b* is connected to a negative electrode of the power storage element 30_2, the second terminal of the switch 32*b* is connected to the connection terminal 71*b*, and the third terminal of the switch 32*b* is connected to the third terminal of the switch 31*b*, the third terminal of the switch 33*b*, and the connection terminal 72*b*.

For example, the switch 32*a* and the switch 32*b* have a function of determining to which connection terminal the power storage element 30_2 is connected to, the connection terminals 71*a* and 71*b* or the connection terminals 72*a* and 72*b*.

The first terminal of the switch 33*a* is connected to a positive electrode of the power storage element 30_3, the second terminal of the switch 33*a* is connected to the connection terminal 71*a*, and the third terminal of the switch 33*a* is connected to the third terminal of the switch 31*a*, the third terminal of the switch 32*a*, and the connection terminal 72*a*.

The first terminal of the switch 33*b* is connected to a negative electrode of the power storage element 30_3, the second terminal of the switch 33*b* is connected to the connection terminal 71*b*, and the third terminal of the switch 33*b* is connected to the third terminal of the switch 31*b*, the third terminal of the switch 32*b*, and the connection terminal 72*b*.

For example, the switch 33a and the switch 33b have a function of determining to which connection terminal the power storage element 30_3 is connected to, the connection terminals 71a and 71b or the connection terminals 72a and 72b.

The switch 51 and the switch 52 each have at least two terminals (a first terminal and a second terminal). For example, the switches having two terminals may be formed using transistors. Alternatively, the switches having two terminals may be formed using microelectromechanical systems or the like.

The first terminal of the switch 51 is connected to the third terminals of the switches 11b to 13b, and the second terminal of the switch 51 is connected to the third terminals of the switches 21a to 23a.

The switch 51 has a function of determining whether to serially connect at least one of the power storage elements 10_1 to 10_3 to at least one of the power storage elements 20_1 to 30_3.

The first terminal of the switch 52 is connected to the third terminals of the switches 21b to 23b, and the second terminal of the switch 52 is connected to the third terminals of the switches 31a to 33a.

The switch 52 has a function of determining whether to serially connect at least one of the power storage elements 20_1 to 20_3 to at least one of the power storage elements 30_1 to 30_3.

The switch 61 and the switch 62 each have at least two terminals (a first terminal and a second terminal). For example, the switches having two terminals may be formed using transistors. Alternatively, the switches having two terminals may be formed using microelectromechanical systems or the like.

The first terminal of the switch 61 is connected to the connection terminal 72a, and the second terminal of the switch 61 is connected to the third terminals of the switches 21a to 23a.

The switch 61 has a function of determining whether to connect the connection terminal 72a to at least one of the power storage elements 20_1 to 20_3.

The first terminal of the switch 62 is connected to the connection terminal 72a, and the second terminal of the switch 62 is connected to the third terminals of the switches 31a to 33a.

The switch 62 has a function of determining whether to connect the connection terminal 72a to at least one of the power storage elements 30_1 to 30_3.

Note that as an example, an example of providing a plurality of power storage elements has been described; however, an embodiment of the present invention is not limited to this example. Depending on conditions or cases, the power storage elements are not necessarily provided.

[1.2. Driving Method]

Next, examples of a method for driving the power storage system shown in FIG. 2 will be described with reference to FIG. 3, FIG. 4, FIG. 5, and FIG. 6. For simplicity, the case where the connection terminal 71a and the connection terminal 71b are connected to a power source 91 and the connection terminal 72a and the connection terminal 72b are connected to a load 92 is described with reference to FIG. 3, FIG. 4, FIG. 5, and FIG. 6.

[1.2.1. Driving Method 1]

An example of the driving method during charge and discharge will be described with reference to FIG. 3 and FIG. 4.

Figure 3:
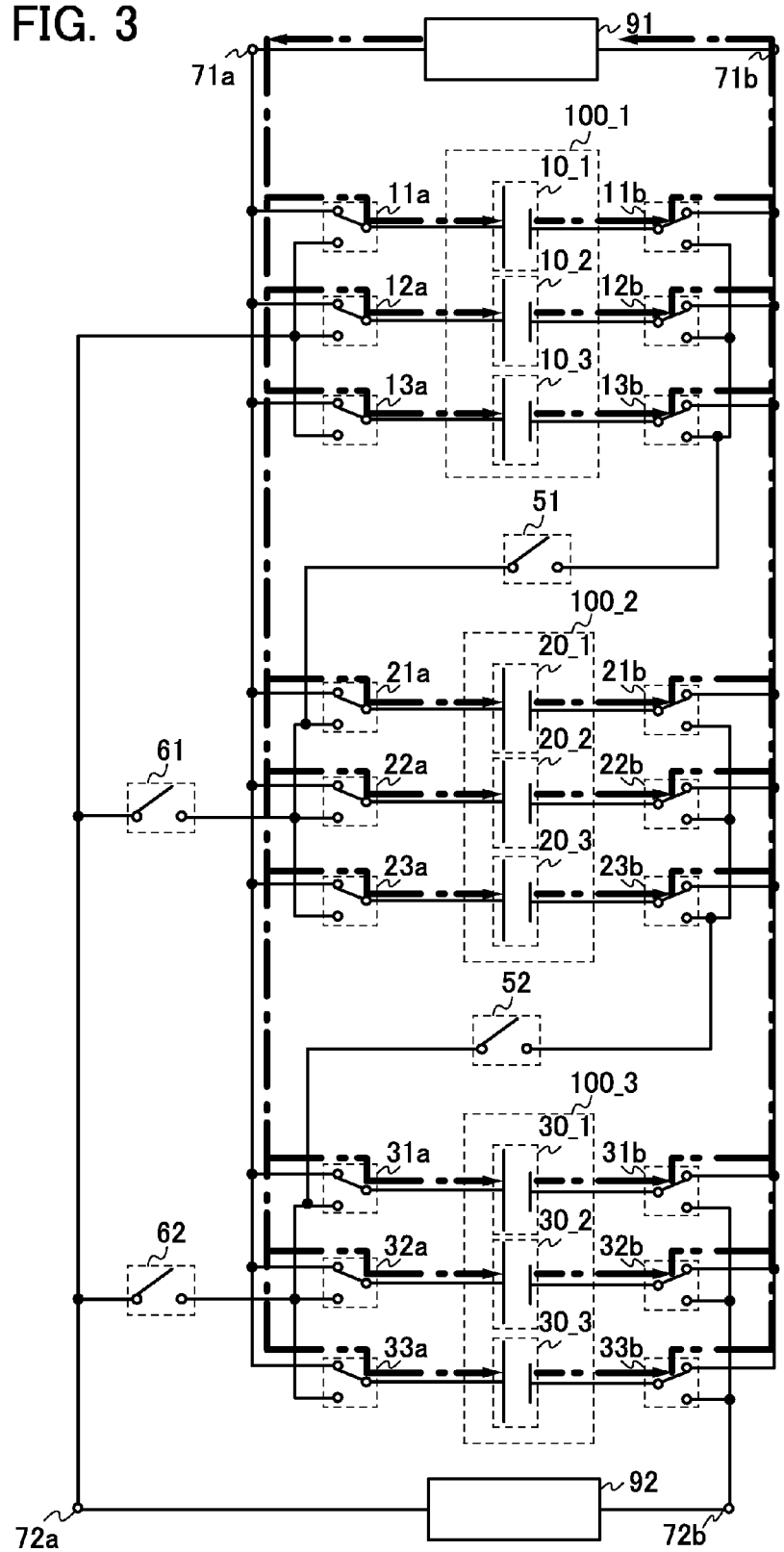
FIG. 3 shows a power storage system.

In charging the power storage elements 10_1 to 10_3, the power storage elements 20_1 to 20_3, and the power storage elements 30_1 to 30_3, as shown in FIG. 3, the switches 11a to 13a, the switches 11b to 13b, the switches 21a to 23a, the switches 21b to 23b, the switches 31a to 33a, and the switches 31b to 33b are set so that the power storage elements 10_1 to 10_3, the power storage elements 20_1 to 20_3, the power storage elements 30_1 to 30_3, and the power source 91 are connected in parallel. In addition, the switch 51 and the switch 52 are off. Note that the switch 61 and the switch 62 may be either on or off.

At this time, the power storage elements 10_1 to 10_3, the power storage elements 20_1 to 20_3, and the power storage elements 30_1 to 30_3 are each charged. Since the power storage elements 10_1 to 10_3, the power storage elements 20_1 to 20_3, and the power storage elements 30_1 to 30_3 are connected in parallel, charging can be carried out on the power storage element basis. In the case of charging a power storage device including a plurality of series-connected power storage elements, if there is a variation in resistance among the power storage elements, the power storage elements are charged with the voltage of the power storage element having the highest resistance as a reference and all of the power storage elements cannot be fully charged; however, the driving method of this embodiment does not cause this problem. Accordingly, a higher degree of safety can be achieved in the power storage elements.

Figure 4:
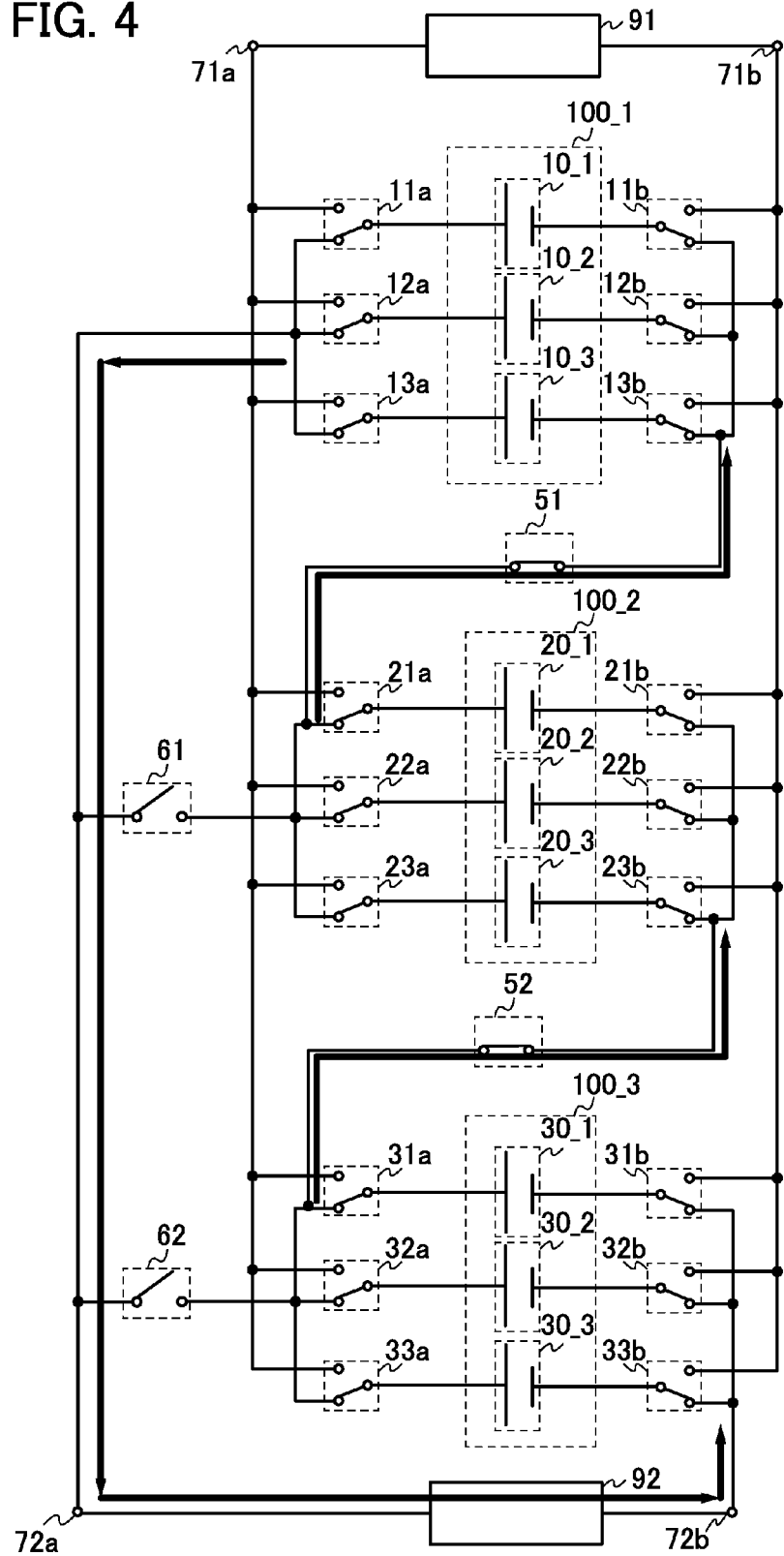
FIG. 4 shows a power storage system.

In discharging the power storage elements 10_1 to 10_3, the power storage elements 20_1 to 20_3, and the power storage elements 30_1 to 30_3, as shown in FIG. 4, the switch 51 and the switch 52 are on, and the switch 61 and the switch 62 are off. Further, the switches 11a to 13a, the switches 11b to 13b, the switches 21a to 23a, the switches 21b to 23b, the switches 31a to 33a, and the switches 31b to 33b are set so that the power storage elements 10_1 to 10_3, the power storage elements 20_1 to 20_3, the power storage elements 30_1 to 30_3, and the load 92 are connected in series.

At this time, the power storage elements 10_1 to 10_3, the power storage elements 20_1 to 20_3, and the power storage elements 30_1 to 30_3 are each discharged, and a current flows through the load 92. Since the power storage elements 10_1 to 10_3, the power storage elements 20_1 to 20_3, and the power storage elements 30_1 to 30_3 are connected in series, a large amount of current can be supplied to the load 92.

[1.2.2. Driving Method 2]

Although all the power storage elements are discharged in the driving method described with reference to FIG. 4, an embodiment of the present invention is not limited to this example, and a method in which only part of the power storage elements are discharged may be employed.

Figure 5:
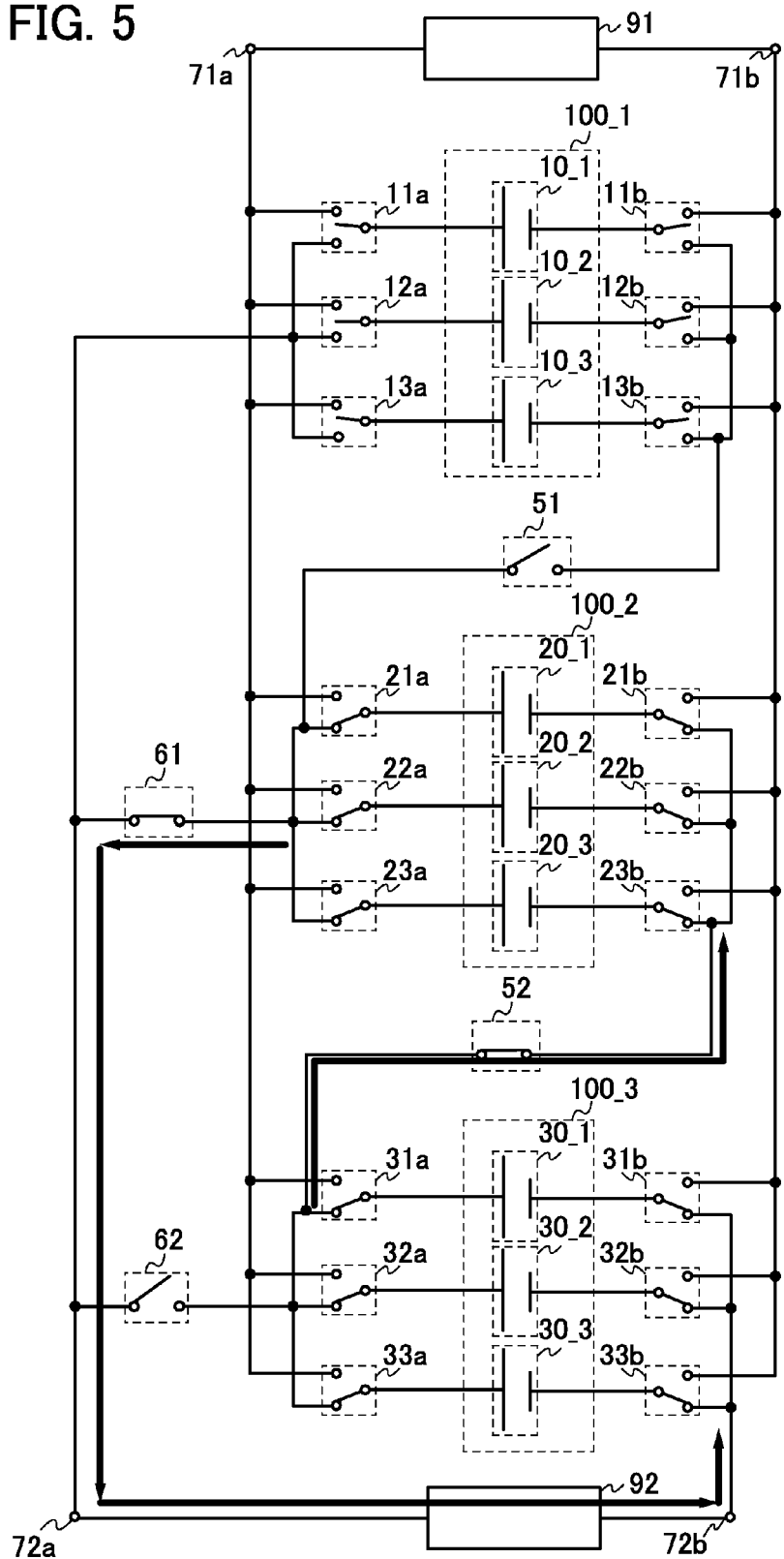
FIG. 5 shows a power storage system.

For example, as shown in FIG. 5, the switch 51 is off, the switch 52 is on, the switch 61 is on, and the switch 62 is off. In addition, the switches 11a to 13a, the switches 11b to 13b, the switches 21a to 23a, and the switches 21b to 23b may be set so that the power storage elements 10_1 to 10_3 are not discharged, and the switches 31a to 33a and the switches 31b to 33b may be set so that the power storage elements 20_1 to 20_3 and the power storage elements 30_1 to 30_3 are electrically connected in series and discharged. In this manner, the current flowing through the load 92 can be changed as appropriate without a voltage conversion circuit such as a converter.

[1.2.3. Driving Method 3]

Although all the power storage elements are charged and discharged in the driving method described with reference to FIG. 3 and FIG. 4, an embodiment of the present invention is not limited to this example, and a method in which part of the power storage elements are charged and the rest of the power storage elements are discharged may be employed.

Figure 6:
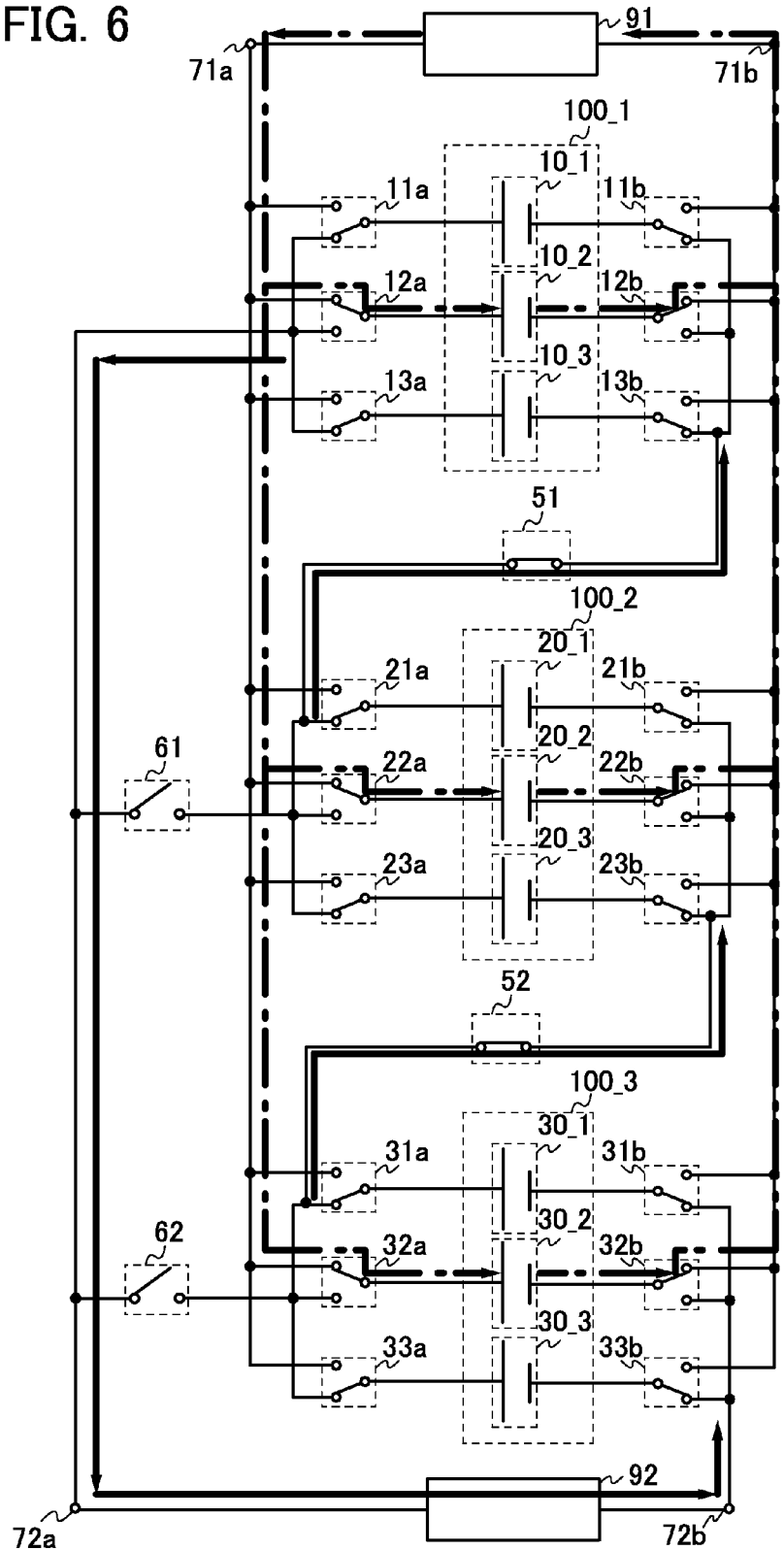
FIG. 6 shows a power storage system.

For example, as shown in FIG. 6, the switch 12a and the switch 12b are set so that the power storage element 10_2 and the power source 91 are connected in parallel, the switch 22a and the switch 22b are set so that the power storage element 20_2 and the power source 91 are connected in parallel, and the switch 32a and the switch 32b are set so that the power storage element 30_2 and the power source 91 are connected in parallel; thus, the power storage element 10_2, the power storage element 20_2, and the power storage element 30_2 are charged. The switch 51 and the switch 52 are on, and the switch 61 and the switch 62 are off. Further, the switch 11a, the switch 11b, the switch 13a, the switch 13b, the switch 21a, the switch 21b, the switch 23a, the switch 23b, the switch 31a, the switch 31b, the switch 33a, and the switch 33b may be set so that the power storage element 10_1, the power storage element 10_3, the power storage element 20_1, the power storage element 20_3, the power storage element 30_1, the power storage element 30_3, and the load 92 are connected in series; thus, the power storage element 10_1, the power storage element 10_3, the power storage element 20_1, the power storage element 20_3, the power storage element 30_1, and the power storage element 30_3 are discharged. Note that the charged power storage elements are not limited to the power storage element 10_2, the power storage element 20_2, and the power storage element 30_2. For example, the power storage elements may be charged in order by switching the switches 11a to 13a, the switches 11b to 13b, the switches 21a to 23a, the switches 21b to 23b, the switches 31a to 33a, and the switches 31b to 33b.

As described with reference to FIG. 6, part of power storage elements can be charged while the rest of the power storage elements are discharged. Accordingly, an operation stop period for charging is not necessary in the power storage system, leading to high-speed operation.

Embodiment 2

Power Storage Device Control System

An example of a control system of a power storage device that can be used in a power storage system of one embodiment of the present invention will be described. Note that the description of the power storage system with reference to FIG. 1 to FIG. 6 can be referred to for the same portion, as appropriate.

[2.1. Configuration]

An example of a control system of a power storage device will be described with reference to FIG. 7.

Figure 7:
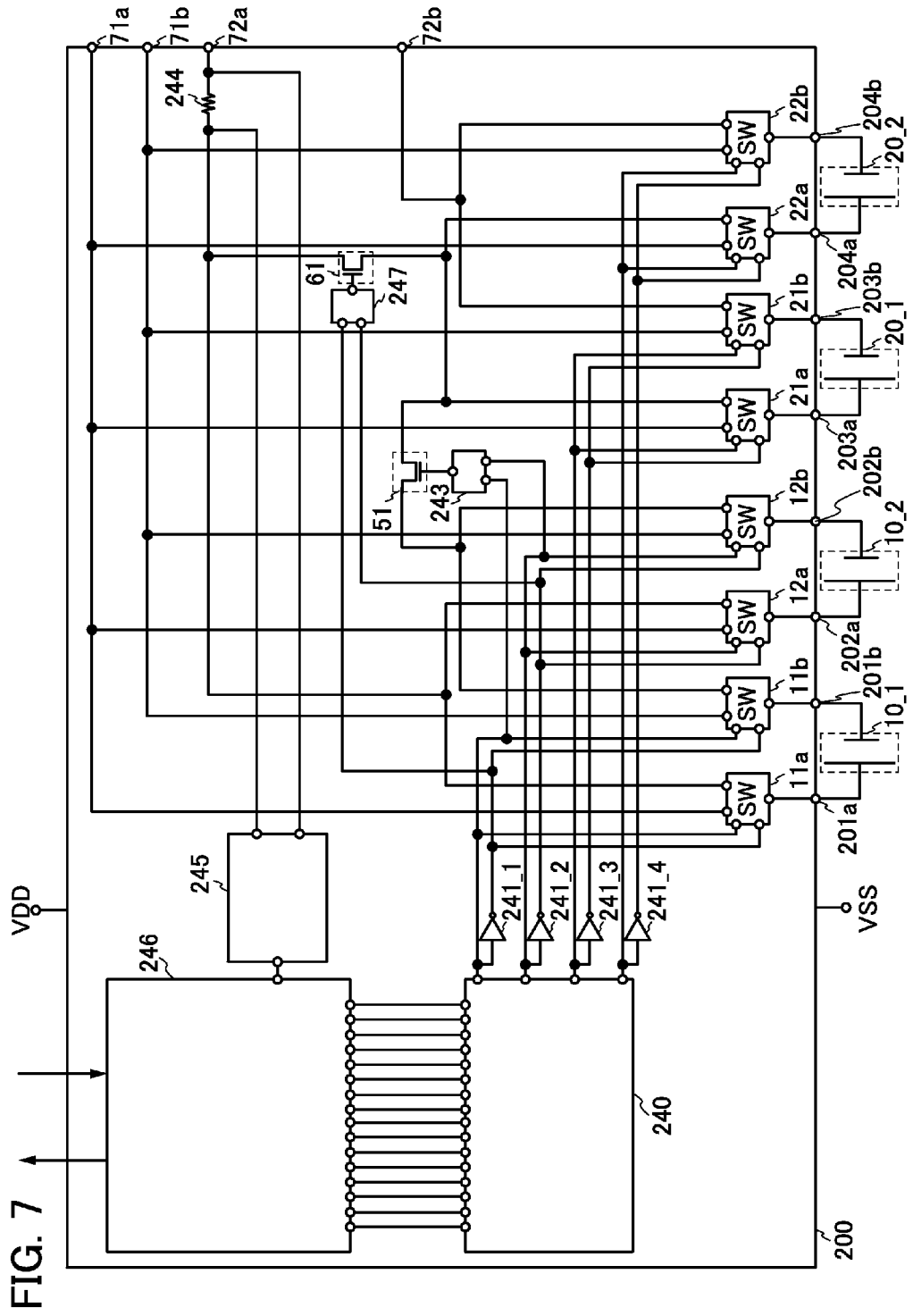
FIG. 7 shows a power storage system.

A circuit 200 shown in FIG. 7 includes a pair of switches 11 (a switch 11a and a switch 11b), a pair of switches 12 (a switch 12a and a switch 12b), a pair of switches 21 (a switch 21a and a switch 21b), a pair of switches 22 (a switch 22a and a switch 22b), a switch 51, a switch 61, an encoder 240, a current detection circuit 245, a semiconductor circuit 246, a pair of connection terminals 201 (a connection terminal 201a and a connection terminal 201b), a pair of connection terminals 202 (a connection terminal 202a and a connection terminal 202b), a pair of connection terminals 203 (a connection terminal 203a and a connection terminal 203b), a pair of connection terminals 204 (a connection terminal 204a and a connection terminal 204b), a pair of connection terminals 71 (a connection terminal 71a and a connection terminal 71b), and a pair of connection terminals 72 (a connection terminal 72a and a connection terminal 72b).

Note that the circuit 200 may be a control system, a controller, or a circuit substrate. The circuit 200, the power storage element 10_1, the power storage element 10_2, the power storage element 20_1, and the power storage element 20_2 form a power storage system in combination. Further, the circuit 200 may be connected to a power supply via the connection terminal 71a and the connection terminal 71b. Further, the circuit 200 may be connected to a load via the connection terminal 72a and the connection terminal 72b. Note that a power supply voltage (VDD-VSS) may be generated using a voltage output to the load and then input to the circuit 200. Note that although an example in which the circuit 200 controls four power storage elements is described here, an embodiment of the present invention is not limited to this example. For example, the number of power storage elements may be more than four as shown in FIG. 2.

Figure 8:
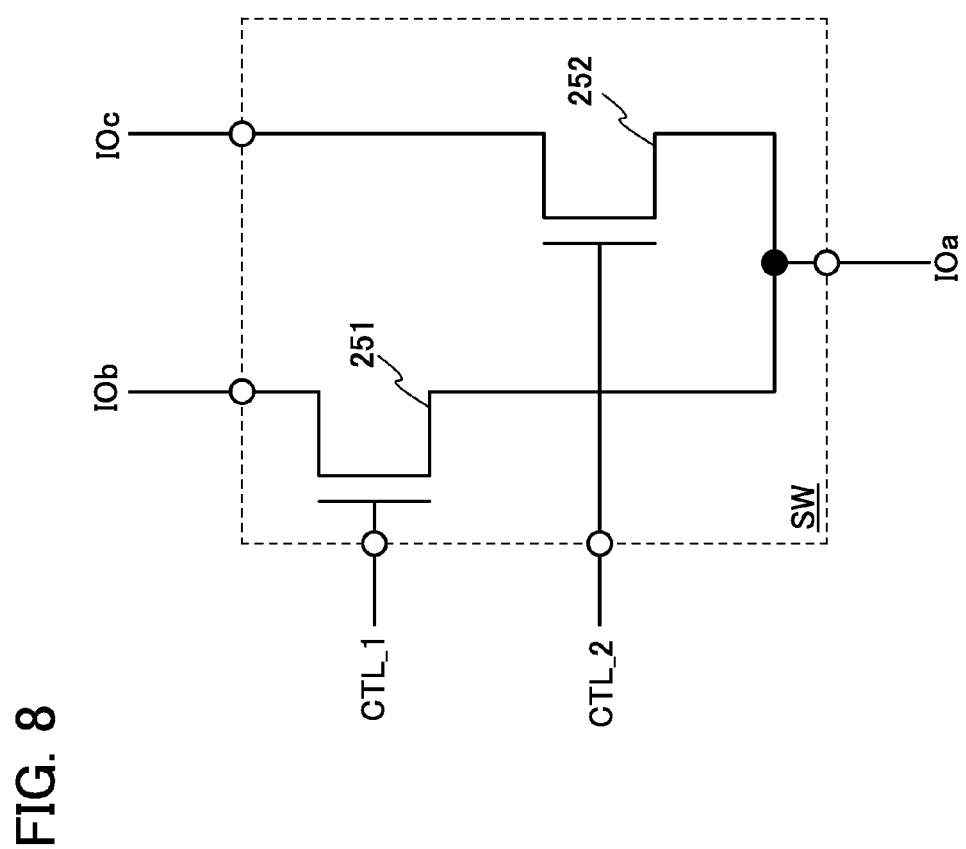
FIG. 8 shows a switch.

A specific example of each of the switch 11a, the switch 11b, the switch 12a, the switch 12b, the switch 21a, the switch 21b, the switch 22a, and the switch 22b is shown in FIG. 8.

The switch shown in FIG. 8 includes three input-output terminals (input-output terminals IOa to IOc) and two control terminals (control terminals CTL_1 and CTL_2).

Further, the switch shown in FIG. 8 includes a transistor 251 and a transistor 252.

One of a source and a drain of the transistor 251 is connected to the input-output terminal IOa, and the other is connected to the input-output terminal IOb. A gate of the transistor 251 is electrically connected to the control terminal CTL_1.

One of a source and a drain of the transistor 252 is connected to the input-output terminal IOa, and the other is connected to the input-output terminal IOc. A gate of the transistor 252 is electrically connected to the control terminal CTL_2.

In the switch shown in FIG. 8, the connection between the input-output terminal IOa and the input-output terminal IOb or the connection between the input-output terminal IOa and the input-output terminal IOc is selected by controlling the conduction state between the source and the drain of the transistor 251 and the conduction state between the source and the drain of the transistor 252 in accordance with a control signal.

Note that both the transistor 251 and the transistor 252 can be set in an off state by controlling the potential of the control terminal CTL_1 and the potential of the control terminal CTL_2.

Note that a transistor having a different polarity from that of the transistor 251 may be connected in parallel to the transistor 251 to form a CMOS structure. Similarly, a transistor having a different polarity from that of the transistor 252 may be connected in parallel to the transistor 252 to form a CMOS structure.

That is the specific example of the switches.

A control signal CTL1 is input from the encoder 240 to the control terminal CTL_1 of the switch 11a and the control terminal CTL_1 of the switch 11b. An inversion signal of the control signal CTL1 is input from the inverter 241_1 to the control terminal CTL_2 of the switch 11a and the control terminal CTL_2 of the switch 11b.

The input-output terminal IOa of the switch 11a is connected to the connection terminal 201a. Thus, the input-output terminal IOa of the switch 11a can be connected to the positive electrode of the power storage element 10_1 via the connection terminal 201a. The input-output terminal IOb of the switch 11a is connected to the connection terminal 71a, and the input-output terminal IOc of the switch 11a is connected to the connection terminal 72a via a resistor 244.

The input-output terminal IOa of the switch 11b is connected to the connection terminal 201b. Accordingly, the input-output terminal IOa of the switch 11b can be connected to the negative electrode of the power storage element 10_1 via the connection terminal 201b. The input-output terminal IOb of the switch 11b is connected to the connection terminal 71b, and the input-output terminal IOc of the switch 11b is connected to one of a source and a drain of a transistor included in the switch 51.

A control signal CTL2 is input from the encoder 240 to the control terminal CTL_1 of the switch 12a and the control terminal CTL_1 of the switch 12b. An inversion signal of the control signal CTL2 is input from the inverter 241_2 to the control terminal CTL_2 of the switch 12a and the control terminal CTL_2 of the switch 12b.

The input-output terminal IOa of the switch 12a is connected to the connection terminal 202a. Accordingly, the input-output terminal IOa of the switch 12a can be connected to the positive electrode of the power storage element 10_2 via the connection terminal 202a. The input-output terminal IOb of the switch 12a is connected to the connection terminal 71a, and the input-output terminal IOc of the switch 12a is connected to the connection terminal 72a via the resistor 244.

The input-output terminal IOa of the switch 12b is connected to the connection terminal 202b. Accordingly, the input-output terminal IOa of the switch 12b can be connected to the negative electrode of the power storage element 10_2 via the connection terminal 202b. The input-output terminal IOb of the switch 12b is connected to the connection terminal 71b, and the input-output terminal IOc of the switch 12b is connected to one of a source and a drain of a transistor included in the switch 51.

A control signal CTL3 is input from the encoder 240 to the control terminal CTL_1 of the switch 21a and the control terminal CTL_1 of the switch 21b. An inversion signal of the control signal CTL3 is input from the inverter 241_3 to the control terminal CTL_2 of the switch 21a and the control terminal CTL_2 of the switch 21b.

The input-output terminal IOa of the switch 21a is connected to the connection terminal 203a. Thus, the input-output terminal IOa of the switch 21a can be connected to the positive electrode of the power storage element 20_1 via the connection terminal 203a. The input-output terminal IOb of the switch 21a is connected to the connection terminal 71a, and the input-output terminal IOc of the switch 21a is connected to the connection terminal 72a via the resistor 244 and also connected to the other of the source and the drain of the transistor included in the switch 51.

The input-output terminal IOa of the switch 21b is connected to the connection terminal 203b. Accordingly, the input-output terminal IOa of the switch 21b can be connected to the negative electrode of the power storage element 20_1 via the connection terminal 203b. The input-output terminal IOb of the switch 21b is connected to the connection terminal 71b, and the input-output terminal IOc of the switch 21b is connected to the connection terminal 72b.

A control signal CTL4 is input from the encoder 240 to the control terminal CTL_1 of the switch 22a and the control terminal CTL_1 of the switch 22b. An inversion signal of the control signal CTL4 is input from the inverter 241_4 to the control terminal CTL_2 of the switch 22a and the control terminal CTL_2 of the switch 22b.

The input-output terminal IOa of the switch 22a is connected to the connection terminal 204a. Thus, the input-output terminal IOa of the switch 22a can be connected to the positive electrode of the power storage element 20_2 via the connection terminal 204a. The input-output terminal IOb of the switch 22a is connected to the connection terminal 71a, and the input-output terminal IOc of the switch 22a is connected to the connection terminal 72a via the resistor 244.

The input-output terminal IOa of the switch 22b is connected to the connection terminal 204b. Accordingly, the input-output terminal IOa of the switch 22b can be connected to the negative electrode of the power storage element 20_2 via the connection terminal 204b. The input-output terminal IOb of the switch 22b is connected to the connection terminal 71b, and the input-output terminal IOc of the switch 22b is connected to the connection terminal 72b.

One of the source and the drain of the transistor included in the switch 51 is connected to the input-output terminal IOc of the switch 11b and the input-output terminal IOc of the switch 12b, and the other is connected to the input-output terminal IOc of the switch 21a and the input-output terminal IOc of the switch 22a. The potential of the gate of the transistor included in the switch 51 is controlled by a logic circuit 243. The output of the logic circuit 243 corresponds to a logical sum of the potential of the control signal CTL1 and the potential of the control signal CTL2. Accordingly, the conduction state of the switch 51 is controlled with the potential of the control signal CTL1 and the potential of the control signal CTL2. The logic circuit 243 includes an OR circuit, for example.

One of the source and the drain of the transistor included in the switch 61 is connected to the input-output terminal IOc of the switch 11a and the input-output terminal IOc of the switch 12a, and the other is connected to the input-output terminal IOc of the switch 21a and the input-output terminal IOc of the switch 22a. The potential of a gate of the transistor included in the switch 61 is controlled by a logic circuit 247. The output of the logic circuit 247 corresponds to a logical sum of the potential of the inversion signal of the control signal CTL1 and the potential of the inversion signal of the control signal CTL2. Accordingly, the conduction state of the switch 61 is controlled with the potential of the inversion signal of the control signal CTL1 and the potential of the inversion signal of the control signal CTL2. The logic circuit 247 includes an OR circuit, for example.

The encoder 240 has a function of encoding a plurality of data signals input from the semiconductor circuit 246 to generate and output control signals CTL1 to CTL4.

The current detection circuit 245 has a function of detecting potentials at both ends of the resistor 244 and inputting each of the potentials to a comparison circuit as detection signals so as to determine whether the current flowing through the resistor 244 is larger than a reference value.

The semiconductor circuit 246 has a function of generating and outputting a plurality of data signals including an instruction to charge or discharge the power storage elements. Note that the semiconductor circuit 246 may exchange signals with an external circuit such as a load, for example. For example, the semiconductor circuit 246 may be a microcomputer, a microprocessor (also referred to as an MPU), a microcontroller unit (also referred to as an MCU), a field programmable gate array (also referred to as an FPGA), a central processing unit (also referred to as a CPU), or a battery management unit (also referred to as a BMU).

Note that transistors used in the switches of the circuit 200 (e.g., the switch 11a, the switch 11b, the switch 12a, the switch 12b, the switch 21a, the switch 21b, the switch 22a, the switch 22b, the switch 51, the switch 61) may be transistors with low off-state current. As the transistors with low off-state current, a transistor including a channel formation region that includes an oxide semiconductor with a wider bandgap than that of silicon and is substantially i-type can be used, for example. The structure is not limited to that of the circuit 200, and the transistors with low off-state current can also be used in the switch 31a, the switch 31b, the switch 32a, the switch 32b, the switch 33a, the switch 33b, the switch 52, the switch 62, and the like shown in FIG. 2, for example. Without being limited to the above structures, the switches may be formed using a semiconductor including silicon.

The transistor including the oxide semiconductor can be fabricated in such a manner that, for example, impurities such as hydrogen or water are reduced as much as possible and oxygen vacancies are reduced as much as possible by supply of oxygen. At this time, the amount of hydrogen that is regarded as a donor impurity in the channel formation region is preferably reduced to lower than or equal to $1\times10^{19}/cm^3$, further preferably lower than or equal to $1\times10^{18}/cm^3$ by secondary ion mass spectrometry (also referred to as SIMS). The off-state current per micrometer of the channel width of the transistor at 25° C. is lower than or equal to $1\times10^{-19}$ A (100 zA), preferably lower than or equal to $1\times10^{-22}$ A (100 yA). It is preferable that the off-state current of the transistor be as low as possible; the lowest value of the off-state current of the transistor is estimated to be about $1\times10^{-30}$ A/μm.

The oxide semiconductor can be, for example, an In-based metal oxide, a Zn-based metal oxide, an In—Zn-based metal oxide, or an InGa—Zn-based metal oxide.

Here, an example of the semiconductor circuit 246 will be described here with reference to FIG. 9.

Figure 9:
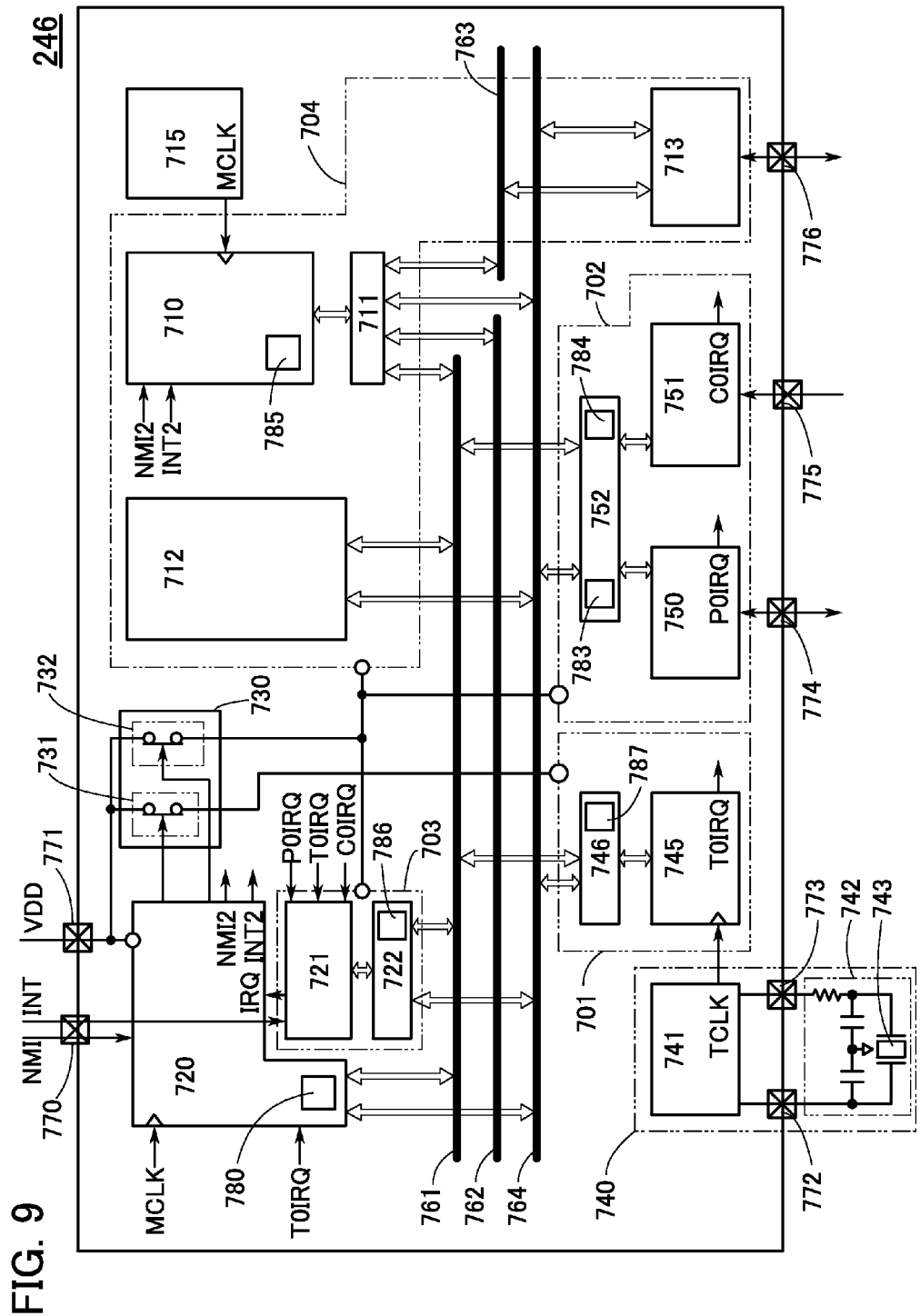
FIG. 9 shows a semiconductor circuit.

The semiconductor circuit 246 shown in FIG. 9 includes a processor 710, a bus bridge 711, a memory 712, a memory interface 713, a controller 720, an interrupt controller 721, an I/O interface (input-output interface) 722, and a power gate unit 730.

The semiconductor circuit 246 further includes a crystal oscillation circuit 741, a timer circuit 745, an I/O interface 746, an I/O port 750, a comparator 751, an I/O interface 752, a bus line 761, a bus line 762, a bus line 763, and a data bus line 764. Further, the semiconductor circuit 246 includes at least connection terminals 770 to 776 for connection to an external device. Note that each of the connection terminals 770 to 776 represents one terminal or a terminal group including a plurality of terminals. An oscillation unit 742 including a quartz crystal oscillator 743 is connected to the semiconductor circuit 246 through the connection terminal 772 and the connection terminal 773.

The processor 710 includes a register 785 and is connected to the bus lines 761 to 763 and the data bus line 764 through the bus bridge 711.

The memory 712 is a memory device capable of functioning as a main memory of the processor 710, and a random access memory is used, for example. The memory 712 stores an instruction executed by the processor 710, data necessary for execution of an instruction, and data on processing of the processor 710. In accordance with the instruction processed by the processor 710, writing and reading of data to/from the memory 712 are carried out. For example, the semiconductor circuit 246 may generate a data signal in accordance with an instruction on the connection of each power storage element and output the data signal via the I/O port 750.

In the semiconductor circuit 246, power supply to the memory 712 is blocked in a low power consumption mode. Therefore, a memory capable of storing data when power is not supplied to the memory is preferably used as the memory 712.

The memory interface 713 is an input-output interface with an external memory device. Under the instruction executed by the processor 710, data is written into and read out from the external memory device connected to the connection terminal 776 via the memory interface 713.

A clock generation circuit 715 is a circuit that generates a clock signal MCLK (hereinafter, also simply referred to as "MCLK") to be used in the processor 710, and includes an RC oscillator and the like. MCLK is also output to the controller 720 and the interrupt controller 721.

The controller 720 is a circuit that controls the semiconductor circuit 246, and can carry out control of a power supply of the semiconductor circuit 246, control of the clock generation circuit 715 and the crystal oscillation circuit 741, and the like.

The connection terminal 770 is a terminal for inputting an external interrupt signal. A non-maskable interrupt signal NMI is input to the controller 720 through the connection terminal 770. As soon as the non-maskable interrupt signal NMI is input to the controller 720, the controller 720 outputs the non-maskable interrupt signal NMI2 to the processor 710, so that the processor 710 executes interrupt processing.

The interrupt signal INT is input to the interrupt controller 721 through the connection terminal 770. Interrupt signals (T0IRQ, P0IRQ, and C0IRQ) from the peripheral circuits are input to the interrupt controller 721 without passing through the buses (761 to 764).

The interrupt controller 721 has a function of assigning priorities to interrupt requests. When the interrupt controller 721 detects the interrupt signal, the interrupt controller 721 determines whether the interrupt request is valid or not. If the interrupt request is valid, the interrupt controller 721 outputs an interrupt signal IRQ to the controller 720.

The interrupt controller 721 is connected to the bus line 761 and the data bus line 764 through an I/O interface 722.

When the interrupt signal INT is input, the controller 720 outputs the interrupt signal INT2 to the processor 710 and makes the processor 710 execute interrupt processing.

The interrupt signal T0IRQ is directly input to the controller 720 without passing through the interrupt controller 721 in some cases. When the controller 720 receives the interrupt signal T0IRQ, the controller 720 outputs the non-maskable interrupt signal NMI2 to the processor 710, so that the processor 710 executes interrupt processing.

A register 780 of the controller 720 is provided in the controller 720. A register 786 of the interrupt controller 721 is provided in the I/O interface 722.

Next, a peripheral circuit included in the semiconductor circuit 246 will be described. The semiconductor circuit 246 includes the timer circuit 745, the I/O port 750, and the comparator 751 as peripheral circuits. These are examples of the peripheral circuits, and a circuit needed for an electrical appliance using the semiconductor circuit 246 can be provided as appropriate.

The timer circuit 745 has a function of measuring time based on a clock signal TCLK (hereinafter, also simply referred to as "TCLK") output from a clock generation circuit 740. A plurality of timer circuits may be provided in the timer circuit 745. In addition, the timer circuit 745 can output the interrupt signal T0IRQ to the controller 720 and the interrupt controller 721 at a set time interval. The timer circuit 745 is connected to the bus line 761 and the data bus line 764 through the I/O interface 746. For example, the timer circuit 745 has a function of controlling charge time or discharge time of the power storage elements.

TCLK is a clock signal having a frequency lower than that of MCLK. For example, the frequency of MCLK is about several megahertz (MHz) (e.g., 8 MHz) and the frequency of TCLK is about several tens of kilohertz (kHz) (e.g., 32 kHz). The clock generation circuit 740 includes the crystal oscillation circuit 741 incorporated in the semiconductor circuit 246, and the oscillation unit 742 which is connected to the connection terminal 772 and the connection terminal 773. The quartz crystal oscillator 743 is used as an oscillator of the oscillation unit 742. In addition, the clock generation circuit 740 is made up of a CR oscillator and the like, and thereby, all modules in the clock generation circuit 740 can be incorporated in the semiconductor circuit 246.

The I/O port 750 is an interface that inputs and outputs information to and from an external device connected to the I/O port 750 through the connection terminal 774 and is an input-output interface for a digital signal. For example, the I/O port 750 outputs the interrupt signal P0IRQ to the interrupt controller 721 in accordance with an input digital signal. The I/O port 750 is connected to the encoder 240 and the current detection circuit 245 which are shown in FIG. 7, through the connection terminal 774. Accordingly, a data signal can be output to the encoder 240. A detection signal is input from the current detection circuit 245. Note that a plurality of connection terminals 774 may be provided.

The comparator 751 can compare a potential (or current) of the analog signal inputted from the connection terminal 775 with a potential (or current) of a reference signal and generate a digital signal having a level of 0 or 1. Further, the comparator 751 can generate the interrupt signal C0IRQ depending on the level of this digital signal. The interrupt signal C0IRQ is output to the interrupt controller 721.

The I/O port 750 and the comparator 751 are connected to the bus line 761 and the data bus line 764 through the I/O interface 752 common to the both. Here, one I/O interface 752 is used because the I/O interfaces of the I/O port 750 and the comparator 751 can share a circuit; however, the I/O port 750 and the comparator 751 can each have an I/O interface separately.

In addition, a register of each peripheral circuit is placed in the input/output interface corresponding to the peripheral circuit. A register 787 of the timer circuit 745 is placed in the I/O interface 746, and a register 783 of the I/O port 750 and a register 784 of the comparator 751 are placed in the I/O interface 752.

The semiconductor circuit 246 includes the power gate unit 730 that can block power supply to the internal circuits. Power is supplied only to a circuit necessary for operation by the power gate unit 730, so that power consumption of the semiconductor circuit 246 can be lowered.

As shown in FIG. 9, circuits in a unit 701, a unit 702, a unit 703, and a unit 704 in the semiconductor circuit 246 which are surrounded by chain double-dashed lines are connected to the connection terminal 771 through the power gate unit 730.

In this embodiment, the unit 701 includes the timer circuit 745, and the I/O interface 746. The unit 702 includes the I/O port 750, the comparator 751, and the I/O interface 752. The unit 703 includes the interrupt controller 721, and the I/O interface 722. The unit 704 includes the processor 710, the memory 712, the bus bridge 711, and the memory interface 713.

The power gate unit 730 is controlled by the controller 720. The power gate unit 730 includes a switch circuit 731 and a switch circuit 732 for blocking supply of power supply voltage to the units 701 to 704. As the power supply voltage at this time, a power supply voltage of a control system or the like can be used, for example.

The switching of the switch circuits 731 and 732 is controlled by the controller 720. Specifically, the controller 720 outputs a signal to turn off some or all of the switches included in the power gate unit 730, depending on the request by the processor 710 (power supply stop). In addition, the controller 720 outputs a signal to turn on the switches included in the power gate unit 730 with, as a trigger, the non-maskable interrupt signal NMI or the interrupt signal T0IRQ from the timer circuit 745 (start of power supply).

FIG. 9 illustrates a structure where two switches (the switches 731 and 732) are provided in the power gate unit 730; however, the structure is not limited thereto. Switches may be provided as much as needed to block supply of power.

In this embodiment, the switch 731 is provided to individually control supply of power to the unit 701 and the switch circuit 732 is provided to individually control supply of power to the units 702 to 704. However, this embodiment of the present invention is not limited to such a power supply path. For example, another switch which is not the switch circuit 732 may be provided to individually control supply of power to the memory 712. Further, a plurality of switches may be provided for one circuit.

In addition, a power supply voltage is constantly supplied from the connection terminal 771 to the controller 720 without passing through the power gate unit 730. In order to reduce noise, a power supply potential from an external power supply circuit, which is different from the power supply circuit for the power supply voltage, is given to both the oscillation circuit of the clock generation circuit 715 and the crystal oscillation circuit 741.

By provision of the controller 720, the power gate unit 730, and the like, the semiconductor circuit 246 can operate in three kinds of operation modes. The first operation mode is a normal operation mode where all circuits included in the semiconductor circuit 246 are active. Here, the first operation mode is referred to as "Active mode".

The second and third operation modes are low power consumption modes where some of the circuits are active. In the second operation mode, the controller 720, the timer circuit 745, and circuits (the crystal oscillation circuit 741 and the I/O interface 746) associated thereto are active. In the third operation mode, only the controller 720 is active. Here, the second operation mode is referred to as "the Noff1 mode" and the third operation mode is referred to as "the Noff2 mode". Only the controller 720 and some of the peripheral circuits (circuits necessary for timer operation) operate in the Noff1 mode and only the controller 720 operates in the Noff2 mode.

Note that power is constantly supplied to the oscillator of the clock generation circuit 715 and the crystal oscillation circuit 741 regardless of the operation modes. In order to bring the clock generation circuit 715 and the crystal oscillation circuit 741 into non-active state, an enable signal is inputted from the controller 720 or an external circuit to stop oscillation of the clock generation circuit 715 and the crystal oscillation circuit 741.

In addition, in Noff1 and Noff2 modes, power supply is blocked by the power gate unit 730, so that the I/O port 750 and the I/O interface 752 are in non-active state, but power is supplied to parts of the I/O port 750 and the I/O interface 752 in order to allow the external device connected to the connection terminal 774 to operate normally. Specifically, power is supplied to an output buffer of the I/O port 750 and the register 783 of the I/O port 750.

Note that in this specification, the phrase "a circuit is in non-active state" includes a state where major functions in Active mode (normal operation mode) are stopped and an operation state with power consumption lower than that of Active mode, as well as a state that a circuit is stopped by blocking of power supply.

With the above-described structure, when the charge operation of a power storage device is forcibly terminated by a user, for example, a signal to turn off some or all of the switches included in the power gate unit 730 can be output depending on the request by the processor 710, and the mode can be switched to the Noff1 or Noff2 mode to stop power supply to an unnecessary circuit block.

[2.2. Driving Method]

Further, an operation example of the control system will be described with reference to the above example of the method for driving the power storage system.

In the case of charging at least one power storage element, potentials of control signals CTL1 to CTL4 are set by the encoder 240, so that a positive electrode and a negative electrode of the charged power storage element are connected to the connection terminal 71a and the connection terminal 71b.

For example, in the case of charging the power storage element 10_1, the power storage element 10_2, the power storage element 20_1, and the power storage element 20_2, the transistor 251 is turned on and the transistor 252 is turned off in each of the switches 11a, 11b, 12a, 12b, 21a, 21b, 22a, and 22b, by the control signals CTL1 to CTL4. Further, the transistor included in the switch 51 is turned off.

At this time, since the power storage element 10_1, the power storage element 10_2, the power storage element 20_1, and the power storage element 20_2 and the connection terminal 71a and the connection terminal 71b are in a conducting state, the power storage element 10_1, the power storage element 10_2, the power storage element 20_1, and the power storage element 20_2 are charged via the connection terminal 71a and the connection terminal 71b.

In the case of discharging at least one power storage element, potentials of the control signals CTL1 to CTL4 are set by the encoder 240 so that a positive electrode and a negative electrode of the discharged power storage element are connected to the connection terminal 72a and the connection terminal 72b.

For example, in the case of discharging the power storage element 10_1, the power storage element 10_2, the power storage element 20_1, and the power storage element 20_2, the transistor 252 is turned on and the transistor 251 is turned off in each of the switches 11a, 11b, 12a, 12b, 21a, 21b, 22a, and 22b, by the control signals CTL1 to CTL4. Further, the transistor included in the switch 51 is turned on and the transistor included in the switch 61 is turned off by the control signal CTL1 and the control signal CTL2.

At this time, since the power storage element 10_1, the power storage element 10_2, the power storage element 20_1, and the power storage element 20_2 and the connection terminal 72a and the connection terminal 72b are in a conducting state, the power storage element 10_1, the power storage element 10_2, the power storage element 20_1, and the power storage element 20_2 are discharged via the connection terminal 72a and the connection terminal 72b.

Note that whether to charge the power storage element can be selected depending on the detection signal output from the current detection circuit 245.

For example, when it is determined by the current detection circuit 245 that the amount of current flowing through the resistor 244 is lower than or equal to the reference value, a detection signal is set at high level. At this time, the semiconductor circuit 246 determines that charge of the power storage element is necessary. When the semiconductor circuit 246 is in a lower power consumption mode, the interrupt signal P0IRQ is set active to restart power supply to the processor 710. Further, the semiconductor circuit 246 generates a data signal in accordance with an instruction to charge the power storage element and output the data signal via the I/O port 750. Note that in the semiconductor circuit 246 shown in FIG. 9, only one connection terminal 774 for the I/O port 750 is shown; however, the number of connection terminals 774 is not limited to one. A plurality of connection terminals 774 may be provided when a plurality of data signals is generated and output as in this example of the driving method.

At this time, the encoder 240 sets potentials of the control signals CTL1 to CTL4 by encoding the input data signal. Thus, a target power storage element among the power storage element 10_1, the power storage element 10_2, the power storage element 20_1, and the power storage element 20_2 can be connected to the connection terminal 71a and the connection terminal 71b and charged.

To adjust the amount of current flowing through a load, the number of power storage elements connected in series to the load is changed. In this case, instruction data to set the connection state of the power storage element 10_1, the power storage element 10_2, the power storage element 20_1, and the power storage element 20_2 in accordance with the desired amount of current is written in the memory 712 in advance.

For example, in the case where the amount of current flowing through the load may be lower than the maximum amount of current, the semiconductor circuit 246 generates a data signal in accordance with the instruction to set the desired amount of current and outputs the data signal through the I/O port 750.

At this time, the encoder 240 sets potentials of the control signals CTL1 to CTL4 by encoding the input data signal. Thus, the transistors 252 and 251 in each of the switches 11a, 11b, 12a, 12b, 21a, 21b, 22a, and 22b, the transistor included in the switch 51, and the transistor included in the switch 61 are controlled; in this manner, the number of power storage elements connected in series can be set.

In the case where charge or discharge of the power storage device is performed, data to set reference values of charge time or discharge time is written in advance to the register 787 of the I/O interface 746. The timer circuit 745 measures the time. In the semiconductor circuit 246, when the measurement value of the timer circuit 745 reaches the value of the time data prewritten to the register 787, the timer circuit 745 sets T0IRQ active and outputs an interrupt signal. Then, the interrupt signal INT2 is transmitted to the processor 710 through the interrupt controller 721. The processor 710 executes an instruction to switch to charge or discharge and generates a data signal and output it through the I/O port 750.

For example, in the case of charging or discharging the power storage device including the power storage element 10_1, when the measurement value exceeds the value of the time data written to the register 787 in the timer circuit 745, the semiconductor circuit 246 generates a data signal in accordance with an instruction to execute discharge of the power storage element 10_1 with the use of the processor 710 and outputs the data signal to the encoder 240 through the I/O port 750. The encoder 240 encodes the input signal and sets the potentials of the control signals CTL1 to CTL4, so that the power storage element 10_1 and the connection terminal 72*a* and the connection terminal 72*b* are set in a conducting state. Accordingly, the power storage element 10_1 is discharged.

By setting the charge time and discharge time of the register 787 of the I/O interface 746 in this manner, the length of the charge time and discharge time is controlled by the timer circuit 745. Thus, charge and discharge can be performed.

In the above-described manner, the switches are controlled with the semiconductor circuit 246 and the encoder 240; thus, charge or discharge of the power storage elements can be controlled.

Embodiment 3

Register

Further, an example of a structure of the register which can be used in each circuit block of the semiconductor circuit 246 will be described with reference to FIGS. 10A and 10B.

[3.1. Configuration]

Figure 10A:
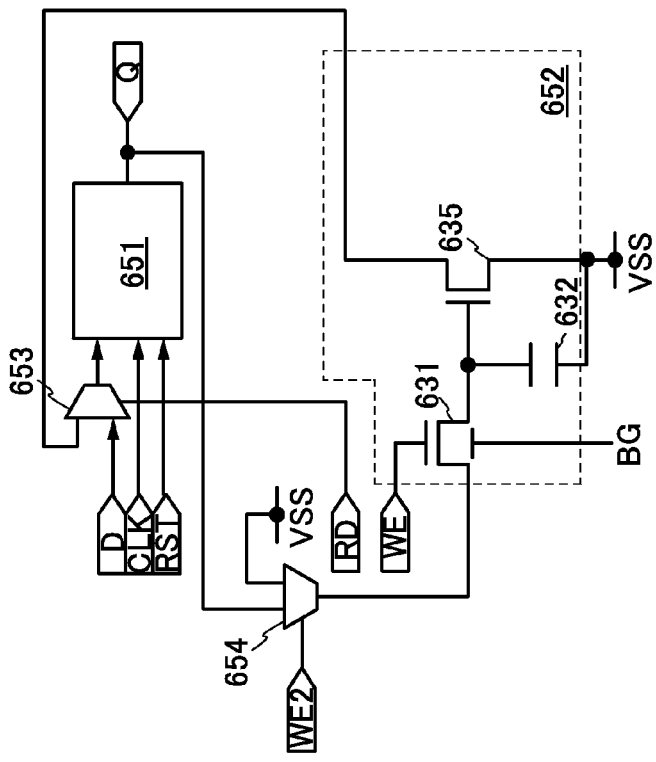
FIGS. 10A and 10B show registers.

The register illustrated in FIG. 10A includes a memory circuit 651, a memory circuit 652, and a selector 653.

The memory circuit 651 is supplied with a reset signal RST, a clock signal CLK, and a data signal D. The memory circuit 651 has a function of storing data of the data signal D in accordance with the clock signal CLK and outputting the data as a data signal Q. For example, a register such as a buffer register or a general-purpose register can be used as the memory circuit 651. As the memory circuit 651, a cache memory including a static random access memory (SRAM) or the like can be provided. Data of such a register or a cache memory can be stored in the memory circuit 652.

The memory circuit 652 is supplied with a write control signal WE, a read control signal RD, and a data signal.

The memory circuit 652 has a function of storing data of an input data signal in accordance with the write control signal WE and outputting the stored data as a data signal in accordance with the read control signal RD.

In the selector 653, the data signal D or the data signal output from the memory circuit 652 is selected in accordance with the read control signal RD, and input to the memory circuit 651.

The memory circuit 652 includes a transistor 631 and a capacitor 632.

The transistor 631, which is an n-channel transistor, functions as a selection transistor. One of a source and a drain of the transistor 631 is connected to an output terminal of the memory circuit 651. Further, a power supply potential is supplied to a back gate of the transistor 631. The transistor 631 has a function of controlling the retention of a data signal output from the memory circuit 651 in accordance with the write control signal WE.

A transistor with low off-state current may be used as the transistor 631, for example.

One of a pair of electrodes of the capacitor 632 is connected to the other of the source and the drain of the transistor 631, and the other of the pair of electrodes is supplied with a low power source potential VSS. The capacitor 632 has a function of holding charge based on data of a stored data signal. Since the off-state current of the transistor 631 is extremely low, the charge in the capacitor 632 is held and thus the data is stored even when the supply of the power source voltage is stopped. A power supply voltage (VDD-VSS) is generated using power supplied from a power storage element, for example.

A transistor 633 is a p-channel transistor. The high power source potential VDD is supplied to one of a source and a drain of the transistor 633, and the read control signal RD is input to a gate of the transistor 633.

A transistor 634 is an n-channel transistor. One of a source and a drain of the transistor 634 is connected to the other of the source and the drain of the transistor 633, and the read control signal RD is input to a gate of the transistor 634.

A transistor 635 is an n-channel transistor. One of a source and a drain of the transistor 635 is connected to the other of the source and the drain of the transistor 634, and the low power source potential VSS is input to the other of the source and the drain of the transistor 635.

An input terminal of an inverter 636 is connected to the other of the source and the drain of the transistor 633. An output terminal of the inverter 636 is connected to the input terminal of the selector 653.

One of a pair of electrodes of a capacitor 637 is connected to the input terminal of the inverter 636, and the other of the pair of electrodes is supplied with the low power source potential VSS. The capacitor 637 has a function of holding charge based on data of a data signal input to the inverter 636.

Note that without limitation to the above, the memory circuit 652 may include a phase-change RAM (PRAM), a phase change memory (PCM), a resistive RAM (ReRAM), a magnetoresistive RAM (MRAM), or the like. For the MRAM, a magnetic tunnel junction element (MTJ element) can be used for example.

[3.2. Driving Method]

Next, an example of a method for driving the register illustrated in FIG. 10A will be described.

First, in a normal operation period, the register is supplied with the power supply voltage that is power for the register, the reset signal RST, and the clock signal CLK. At this time, the selector 653 outputs data of the data signal D to the memory circuit 651. The memory circuit 651 stores the data of the data signal D in accordance with the clock signal CLK. At this time, in response to the read control signal RD, the transistor 633 is turned on while the transistor 634 is turned off.

Then, in a backup period provided immediately before the supply of the power supply voltage is stopped, in accordance with the write control signal WE, the transistor 631 is turned on, the data of the data signal D is stored in the memory circuit 652, and the transistor 631 is turned off. After that, the supply of the clock signal CLK to the register is stopped, and then, the supply of the reset signal RST to the register is stopped. Note that when the transistor 631 is on, the back gate of the transistor 631 may be supplied with a positive power supply potential. At this time, in response to the read control signal RD, the transistor 633 is turned on while the transistor 634 is turned off.

Next, in a power stop period, the supply of the power supply voltage to the register is stopped. During this period, the stored data is held because the off-state current of the transistor 631 is low in the memory circuit 652. Note that the supply of the power supply voltage may be stopped by supplying the ground potential GND instead of the high power supply potential VDD. Note that when the transistor 631 is off, the back gate of the transistor 631 may be supplied with a negative power supply potential, so that the transistor 631 is kept off.

Then, in a recovery period immediately before a normal operation period, the supply of the power supply voltage to the register is restarted; then, the supply of the clock signal CLK is restarted, and after that, the supply of the reset signal RST is restarted. At this time, before the supply of the clock signal CLK is restarted, the wiring which is to be supplied with the clock signal CLK is set to the high power supply potential VDD. Moreover, in accordance with the read control signal RD, the transistor 633 is turned off, the transistor 634 is turned on, and the data signal stored in the memory circuit 652 is output to the selector 653. The selector 653 outputs the data signal to the memory circuit 651 in accordance with the read control signal RD. Thus, the memory circuit 651 can be returned to a state just before the power stop period.

Then, in a normal operation period, normal operation of the memory circuit 651 is performed again.

The above is an example of the method for driving the register illustrated in FIG. 10A.

Note that the structure of the register 511 is not limited to that illustrated in FIG. 10A.

Figure 10B:
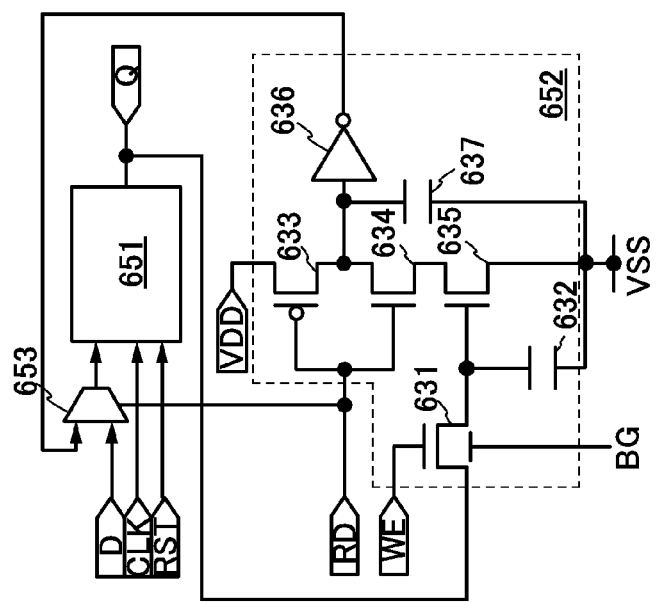

For example, the register illustrated in FIG. 10B has a structure in which the transistors 633 and 634, the inverter 636, and the capacitor 637 are removed from the register illustrated in FIG. 10A and a selector 654 is added to the register illustrated in FIG. 10A. For the same components as those in the register illustrated in FIG. 10A, the description of the register in FIG. 10A is referred to as appropriate.

One of the source and the drain of the transistor 635 is connected to the input terminal of the selector 653.

In the selector 654, the low power supply potential VSS to be data or the data signal output from the memory circuit 651 is selected in accordance with the write control signal WE2, and input to the memory circuit 652.

Next, an example of a method for driving the register illustrated in FIG. 10B will be described.

First, in a normal operation period, the register is supplied with the power supply voltage, the reset signal RST, and the clock signal CLK. At this time, the selector 653 outputs data of the data signal D to the memory circuit 651. The memory circuit 651 stores the data of the data signal D in accordance with the clock signal CLK. In addition, the selector 654 outputs the low power supply potential VSS to the memory circuit 652 in accordance with the write control signal WE2. In the memory circuit 652, the transistor 631 is turned on in response to the write control signal WE, and the low power supply potential VSS is stored as data in the memory circuit 652.

Then, in a backup period provided immediately before the supply of the power source voltage is stopped, the selector 654 does not supply the low power supply potential VSS but provides electrical conduction between the output terminal of the memory circuit 651 and one of the source and the drain of the transistor 631 in accordance with the write control signal WE2. Further, in accordance with the write control signal WE, the transistor 631 is turned on, the data of the data signal D is stored in the memory circuit 652, and the transistor 631 is turned off. At this time, the data of the memory circuit 652 is rewritten only when the potential of the data signal D is equal to the high power supply potential VDD. Furthermore, the supply of the clock signal CLK to the register is stopped, and then, the supply of the reset signal RST to the register is stopped. Note that when the transistor 631 is on, the back gate of the transistor 631 may be supplied with a positive power supply potential.

Next, in a power stop period, the supply of the power supply voltage to the register is stopped. During this period, the stored data is held in the memory circuit 652 because the off-state current of the transistor 631 is low. Note that the supply of the power supply voltage may be stopped by supplying the ground potential GND instead of the high power supply potential VDD. Note that when the transistor 631 is off, the back gate of the transistor 631 may be supplied with a negative power supply potential from a multiplexer, so that the transistor 631 is kept off.

Then, in a recovery period immediately before a normal operation period, the supply of the power supply voltage to the register is restarted; then, the supply of the clock signal CLK is restarted, and after that, the supply of the reset signal RST is restarted. At this time, before the supply of the clock signal CLK is restarted, the wiring which is to be supplied with the clock signal CLK is set to the high power supply potential VDD. In accordance with the read control signal RD, the selector 653 outputs to the memory circuit 651 the data signal corresponding to the data stored in the memory circuit 652. Thus, the memory circuit 651 can be returned to a state just before the power stop period.

Then, in a normal operation period, normal operation of the memory circuit 651 is performed again.

The above is an example of the method for driving the register illustrated in FIG. 10B.

By using the structure illustrated in FIG. 10B, the data of the low power supply potential VSS does not need to be written in the backup period, resulting in an increase in operation speed.

In the case of using the above-described register in the registers 784 to 787, when Active mode shifts to Noff1 or Noff2 mode, prior to the block of power supply, data stored in the memory circuit 651 of the registers 784 to 787 is written to the memory circuit 652, so that data in the memory circuit 651 is reset to initial values; as a result, supply of power is blocked.

In the case where Noff1 or Noff2 mode is returned to Active mode, when power supply to the registers 784 to 787 is restarted, data in the memory circuit 651 is reset to initial values. Then, data in the memory circuit 652 is written to the memory circuit 651.

Accordingly, even in the low power consumption mode, data needed for processing of the semiconductor circuit 246 is stored in the registers 784 to 787, and thus, the semiconductor circuit 246 can return from the low power consumption mode to Active mode immediately. Accordingly, power consumption of the semiconductor circuit 246 can be reduced.

Embodiment 4

Memory

An example of a memory available in one embodiment of the present invention will be described. The memory can be used in the memory 712 in FIG. 9, for example.

[4.1. SRAM]

Here, a static random access memory (SRAM), which is a memory including a flip-flop to which a circuit of an inverter is applied, will be described.

An SRAM retains data by using a flip-flop. Thus, unlike a dynamic random access memory (DRAM), an SRAM does not require refresh operation. Therefore, power consumption during data retention can be reduced. In addition, an SRAM does not require a capacitor and is therefore suitable for applications where high speed operation is required.

Figure 11:
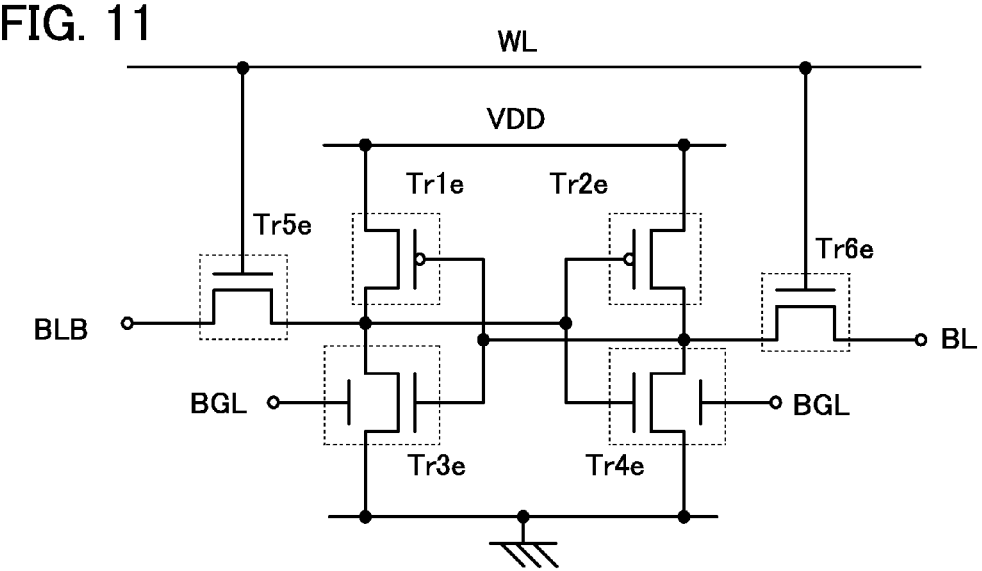
FIG. 11 shows a memory.

FIG. 11 is a circuit diagram corresponding to a memory cell of an SRAM in one embodiment of the present invention. Note that FIG. 11 illustrates only one memory cell; one embodiment of the present invention can also be applied to a memory cell array in which a plurality of such memory cells is arranged.

The memory cell illustrated in FIG. 11 includes a transistor Tr1e, a transistor Tr2e, a transistor Tr3e, a transistor Tr4e, a transistor Tr5e, and a transistor Tr6e. The transistors Tr1e and Tr2e are p-channel transistors. The transistors Tr3e and Tr4e are n-channel transistors. A gate of the transistor Tr1e is electrically connected to a drain of the transistor Tr2e, a gate of the transistor Tr3e, a drain of the transistor Tr4e, and one of a source and a drain of the transistor Tr6e. VDD is supplied to a source of the transistor Tr1e. A drain of the transistor Tr1e is electrically connected to a gate of the transistor Tr2e, a drain of the transistor Tr3e, and one of a source and a drain of the transistor Tr5e. VDD is supplied to a source of the transistor Tr2e. GND is supplied to a source of the transistor Tr3e. A back gate of the transistor Tr3e is electrically connected to a back gate line BGL. GND is supplied to a source of the transistor Tr4e. A back gate of the transistor Tr4e is electrically connected to the back gate line BGL. A gate of the transistor Tr5e is electrically connected to a word line WL. The other of the source and the drain of the transistor Tr5e is electrically connected to a bit line BLB. A gate of the transistor Tr6e is electrically connected to the word line WL. The other of the source and the drain of the transistor Tr6e is electrically connected to a bit line BL.

Note that this embodiment shows an example where n-channel transistors are used as the transistors Tr5e and Tr6e. However, the transistors Tr5e and Tr6e are not limited to n-channel transistors and may be p-channel transistors. In that case, writing, retaining, and reading methods described below may be changed as appropriate.

Thus, a flip-flop has a structure in which an inverter including the transistors Tr1e and Tr3e and an inverter including the transistors Tr2e and Tr4e are connected in a ring.

The p-channel transistors may be, but are not limited to, transistors including silicon, for example. The n-channel transistors may each be the transistor including an oxide semiconductor film described in the above embodiment.

In this embodiment, the transistors Tr3e and Tr4e may each be the transistor including an oxide semiconductor film described in the above embodiment. In addition, with an extremely low off-state current, the transistor has an extremely low flow-through current.

Note that instead of the p-channel transistors, n-channel transistors may be applied to the transistors Tr1e and Tr2e. In the case where n-channel transistors are used as the transistors Tr1e and Tr2e, depletion transistors may be employed.

Writing, retaining, and reading operation of the memory cell illustrated in FIG. 11 will be described below.

In writing, first, a potential corresponding to data 0 or data 1 is applied to the bit line BL and the bit line BLB.

For example, in the case where data 1 is to be written, the high power supply potential VDD is applied to the bit line BL and the ground potential GND is applied to the bit line BLB. Then, a potential (VH) higher than or equal to the sum of the high power supply potential VDD and the threshold voltage of the transistors Tr5e and Tr6e is applied to the word line WL.

Next, the potential of the word line WL is set to be lower than the threshold voltage of the transistors Tr5e and Tr6e, whereby the data 1 written to the flip-flop is retained. In the case of the SRAM, a current flowing during retention of data is only the leakage current of the transistors. Here, when the above-described transistor with low off-state current is applied to some of the transistors in the SRAM, stand-by power for retaining data is reduced.

In reading, the high power supply potential VDD is applied to the bit line BL and the bit line BLB in advance. Then, the VH is applied to the word line WL, so that the bit line BLB is discharged through the transistors Tr5e and Tr3e to be equal to the ground potential GND, while the potential of the bit line BL is kept at the high power supply potential VDD. The potential difference between the bit line BL and the bit line BLB is amplified by a sense amplifier (not illustrated), whereby the retained data 1 can be read.

In the case where data 0 is to be written, the ground potential GND is applied to the bit line BL and the high power supply potential VDD is applied to the bit line BLB; then, the VH is applied to the word line WL. Next, the potential of the word line WL is set to be lower than the threshold voltage of the transistors Tr5e and Tr6e, whereby the data 0 written to the flip-flop is retained. In reading, the high power supply potential VDD is applied to the bit line BL and the bit line BLB in advance. Then, the VH is applied to the word line WL, so that the bit line BL is discharged through the transistors Tr6e and Tr4e to be equal to the ground potential GND, while the potential of the bit line BLB is kept at the high power supply potential VDD. The potential difference between the bit line BL and the bit line BLB is amplified by the sense amplifier, whereby the retained data 0 can be read.

In the above-described manner, an SRAM with low stand-by power can be provided.

[4.2. DOSRAM]

A transistor including an oxide semiconductor film can have extremely low off-state current. That is, the transistor has electrical characteristics in which leakage of charge through the transistor is unlikely to occur. As a memory which is superior in function to a known memory, a dynamic oxide semiconductor random access memory (DOSRAM) to which a transistor having such electrical characteristics is applied will be described below. DOSRAM is a memory that uses the above-described transistor with low off-state current as a selection transistor (a transistor serving as a switching element) of a memory cell.

Figure 12A:
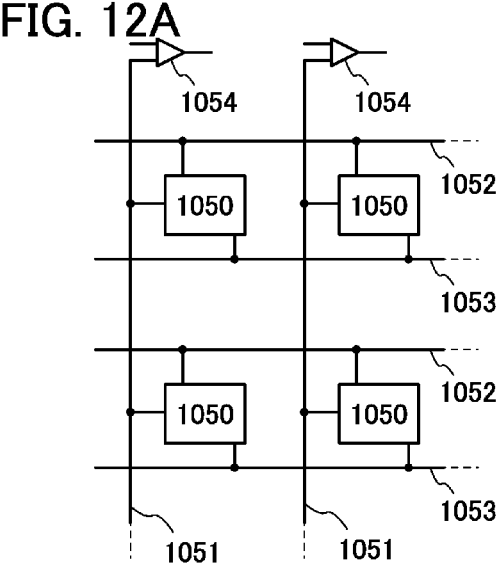
FIGS. 12A and 12B show a memory.
Figure 12B:
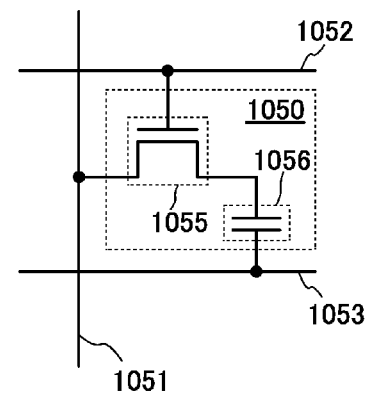

First, the memory will be specifically described with reference to FIGS. 12A and 12B. FIG. 12A is a circuit diagram showing a memory cell array of the memory. FIG. 12B is a circuit diagram of a memory cell.

The memory cell array in FIG. 12A includes a plurality of memory cells 1050, a plurality of bit lines 1051, a plurality of word lines 1052, a plurality of capacitor lines 1053, and a plurality of sense amplifiers 1054.

Note that the bit lines 1051 and the word lines 1052 are provided in a grid pattern, and the memory cell 1050 is provided for each intersection of the bit line 1051 and the word line 1052. The bit lines 1051 are connected to the sense amplifiers 1054, which have a function of reading the potentials of the bit lines 1051 as data.

As shown in FIG. 12B, the memory cell 1050 includes a transistor 1055 and a capacitor 1056. A gate of the transistor 1055 is electrically connected to the word line 1052. A source of the transistor 1055 is electrically connected to the bit line 1051. A drain of the transistor 1055 is electrically connected to one terminal of the capacitor 1056. The other terminal of the capacitor 1056 is electrically connected to the capacitor line 1053.

Figure 13:
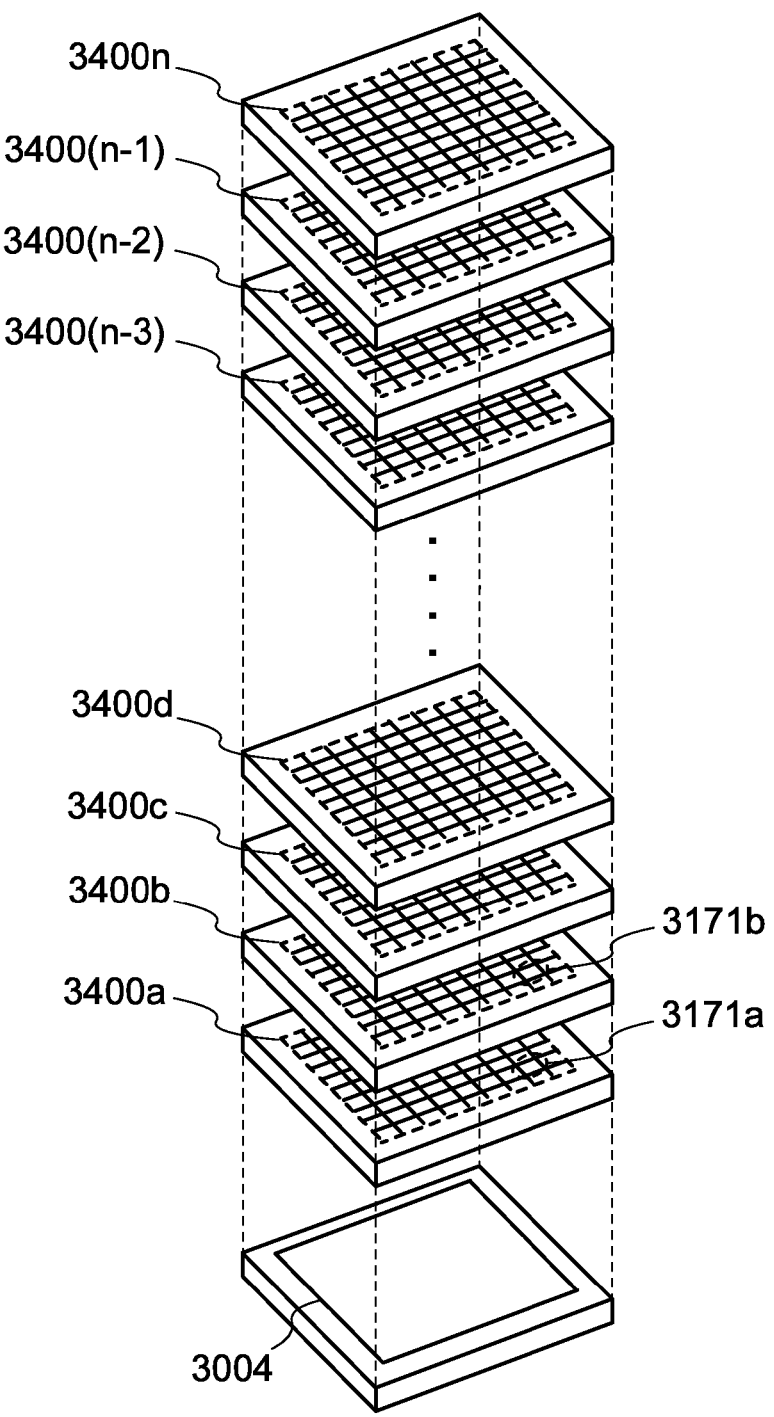
FIG. 13 shows a memory.

FIG. 13 is a perspective view of a memory. The memory illustrated in FIG. 13 includes a plurality of layers of memory cell arrays (memory cell arrays 3400a to 3400n (n is an integer greater than or equal to 2)) each including a plurality of memory cells as memory circuits in the upper portion, and a logic circuit 3004 which is necessary for operating the memory cell arrays 3400a to 3400n, in the lower portion.

A voltage retained in the capacitor 1056 gradually decreases with time due to leakage through the transistor 1055. A voltage originally charged from V0 to V1 is decreased with time to VA that is a limit for reading out data 1. This period is called a retention period T_1. In the case of a two-level memory cell, refresh operation needs to be performed within the retention period T_1.

For example, in the case where the off-state current of the transistor 1055 is not sufficiently small, the retention period T_1 becomes short because the voltage retained in the capacitor 1056 significantly changes with time. Accordingly, refresh operation needs to be frequently performed. An increase in frequency of refresh operation increases power consumption of the memory.

Since the off-state current of the transistor 1055 is extremely small in this embodiment, the retention period T_1 can be made extremely long. In other words, the frequency of refresh operation can be reduced; thus, power consumption can be reduced. For example, in the case where a memory cell is formed using the transistor 1055 having an off-state current of $1 \times 10^{-21}$ A to $1 \times 10^{-25}$ A, data can be retained for several days to several decades without supply of electric power.

As described above, according to one embodiment of the present invention, a memory with high degree of integration and low power consumption can be provided.

[4.3. NOSRAM]

Next, a non-volatile oxide semiconductor random access memory (NOSRAM) is described as a memory that is different from the memories shown in FIG. 11 and FIG. 13. NOSRAM is a memory that uses the transistor with low off-state current as a selection transistor of a memory cell (a transistor serving as a switching element) and a transistor including a silicon material or the like as an output transistor of the memory cell.

Figure 14A:
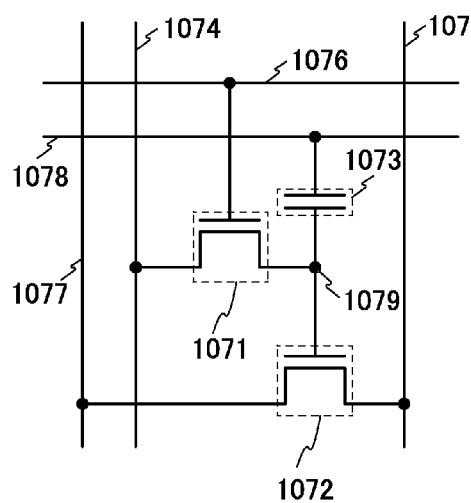
FIGS. 14A and 14B show a memory.
Figure 14B:
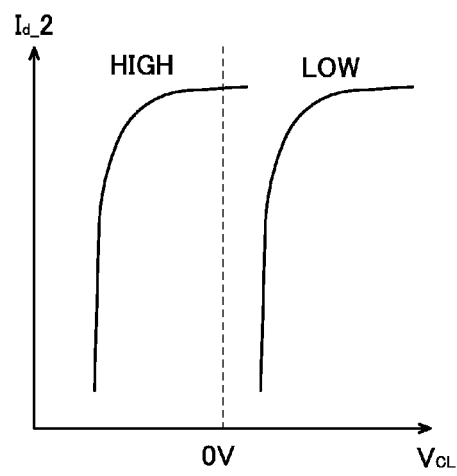

FIG. 14A is a circuit diagram showing a memory cell and wirings included in the memory. FIG. 14B is a graph showing the electrical characteristics of the memory cell in FIG. 14A.

As shown in FIG. 14A, the memory cell includes a transistor 1071, a transistor 1072, and a capacitor 1073. Here, a gate of the transistor 1071 is electrically connected to a word line 1076. A source of the transistor 1071 is electrically connected to a source line 1074. A drain of the transistor 1071 is electrically connected to a gate of the transistor 1072 and one terminal of the capacitor 1073, and this portion is referred to as a node 1079. A source of the transistor 1072 is electrically connected to a source line 1075. A drain of the transistor 1072 is electrically connected to a drain line 1077. The other terminal of the capacitor 1073 is electrically connected to a capacitor line 1078.

The memory illustrated in FIGS. 14A and 14B utilizes variation in the apparent threshold voltage of the transistor 1072, which depends on the potential of the node 1079. For example, FIG. 14B shows a relation between a voltage $V_{CL}$ of the capacitor line 1078 and a drain current $I_d\_2$ flowing through the transistor 1072.

Note that the potential of the node 1079 can be controlled through the transistor 1071. For example, the potential of the source line 1074 is set to a high power supply potential VDD. In this case, when the potential of the word line 1076 is set to be higher than or equal to the sum of the high power supply potential VDD and the threshold voltage Vth of the transistor 1071, the potential of the node 1079 can be HIGH. Further, when the potential of the word line 1076 is set to be lower than or equal to the threshold voltage Vth of the transistor 1071, the potential of the node 1079 can be LOW.

Thus, the transistor 1072 has electrical characteristics shown with either a $V_{CL}$-$I_d\_2$ curve denoted as LOW or a $V_{CL}$-$I_d\_2$ curve denoted as HIGH. That is, when the potential of the node 1079 is LOW, $I_d\_2$ is small at a $V_{CL}$ of 0 V; accordingly, data 0 is stored. Further, when the potential of the node 1079 is HIGH, $I_d\_2$ is large at a $V_{CL}$ of 0 V; accordingly, data 1 is stored. In this manner, data can be stored.

By using the transistor with low off-state current as the transistor 1071, data retention time can be lengthened. The transistor 1072 prevents loss of data in data reading and thereby enables repetitive data reading.

Embodiment 5

Structural Example of Semiconductor Device

A structural example of a semiconductor device used in a control system, a power storage system, or the like is described.

[5.1. Structure of Transistor]

First, examples of the structure of a transistor that can be used in the semiconductor device are described.

Note that the structure of the transistor is not particularly limited and can be selected as appropriate. As the structure of the transistor, a staggered type or a planar type having a bottom gate structure which is described below can be employed. The transistor may have a single-gate structure in which one channel formation region is formed or a multi-gate structure such as a double-gate structure in which two channel formation regions are formed or a triple-gate structure in which three channel formation regions are formed. In addition, the transistor may have a structure in which two gate electrodes are provided above and below a channel formation region with gate insulating films provided therebetween (in this specification, this structure is referred to as a dual-gate structure). Alternatively, a channel-etch type or channel-protective type transistor can be used.

[5.1.1. Bottom-Gate Structure]

Figure 15A:
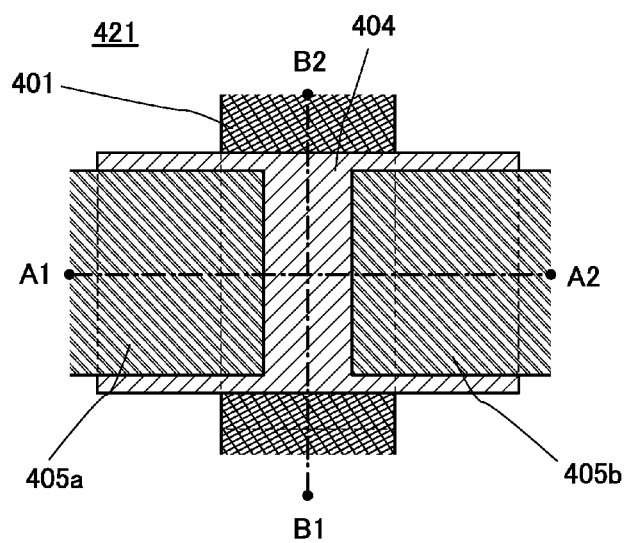
FIGS. 15A to 15C show a structural example of a transistor.
Figure 15C:
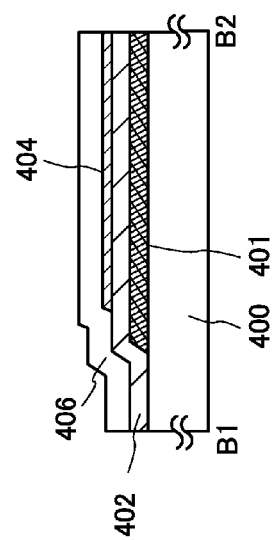
Figure 15B:
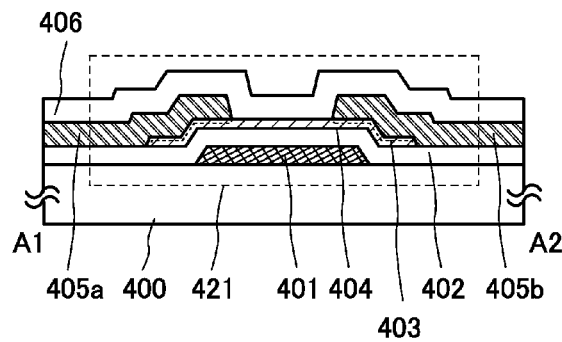

FIGS. 15A to 15C illustrate a structural example of a transistor 421 having a bottom-gate top-contact structure, which is one kind of bottom-gate transistor. FIG. 15A is a plan view of the transistor 421. FIG. 15B is a cross-sectional view taken along the long dashed short dashed line A1-A2 in FIG. 15A. FIG. 15C is a cross-sectional view taken along the long dashed short dashed line B1-B2 in FIG. 15A.

The transistor 421 includes a gate electrode 401 provided over a substrate 400 having an insulating surface, a gate insulating film 402 provided over the gate electrode 401, an oxide film 404 overlapping with the gate electrode 401 with the gate insulating film 402 provided therebetween, and a source electrode 405a and a drain electrode 405b provided in contact with the oxide film 404. In addition, an insulating film 406 is provided so as to cover the source electrode 405a and the drain electrode 405b and be in contact with the oxide film 404. Note that the substrate 400 may be a substrate over which another element is formed.

Note that in the oxide film 404, a region in contact with the source electrode 405a and a region in contact with the drain electrode 405b may include an n-type region 403.

[5.1.2. Top-Gate Structure]

Figure 16A:
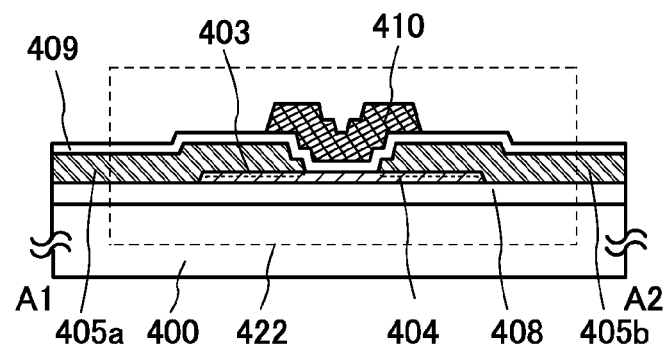
FIGS. 16A and 16B show structural examples of a transistor.

FIG. 16A illustrates a transistor 422 having a top-gate structure.

The transistor 422 includes an insulating film 408 provided over a substrate 400 having an insulating surface, an oxide film 404 provided over the insulating film 408, a source electrode 405a and a drain electrode 405b provided in contact with the oxide film 404, a gate insulating film 409 provided over the oxide film 404, the source electrode 405a, and the drain electrode 405b, and a gate electrode 410 overlapping with the oxide film 404 with the gate insulating film 409 provided therebetween.

Note that in the oxide film 404, a region in contact with the source electrode 405a and a region in contact with the drain electrode 405b may include an n-type region 403.

[5.1.3. Dual-Gate Structure]

Figure 16B:
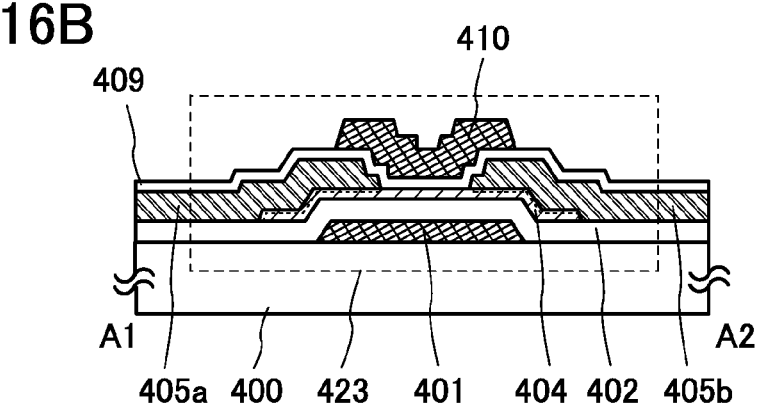

FIG. 16B illustrates a transistor 423 having a dual-gate structure, which includes two gate electrodes above and below a channel formation region with gate insulating films provided therebetween.

The transistor 423 includes a gate electrode 401 provided over a substrate 400 having an insulating surface, a gate insulating film 402 provided over the gate electrode 401, an oxide film 404 overlapping with the gate electrode 401 with the gate insulating film 402 provided therebetween, a source electrode 405a and a drain electrode 405b provided in contact with the oxide film 404, a gate insulating film 409 covering the source electrode 405a and the drain electrode 405b and in contact with the oxide film 404, and a gate electrode 410 overlapping with the oxide film 404 with the gate insulating film 409 provided therebetween.

Note that in the oxide film 404, a region in contact with the source electrode 405a and a region in contact with the drain electrode 405b may include an n-type region 403.

[5.2. Components of Transistor]

Components of the transistors will be described.

[5.2.1. Conductive Film]

As the gate electrode 401 and the gate electrode 410, a layer including Al, Cr, Cu, Ta, Ti, Mo, W, or the like can be used, for example.

As the source electrode 405a and the drain electrode 405b, a layer including Al, Cr, Cu, Ta, Ti, Mo, W, or the like can be used, for example.

[5.2.2. Insulating Film]

As the gate insulating film 402, the insulating film 406, and the gate insulating film 409, a silicon oxide film, a silicon oxynitride film, a silicon nitride oxide film, a silicon nitride film, a gallium oxide film, an aluminum oxide film, an aluminum nitride film, or an aluminum oxynitride film can be used.

The insulating film can contain excess oxygen by being formed under deposition conditions that enable a large amount of oxygen to be contained. In order to make the insulating film contain much more excess oxygen, oxygen is added by ion implantation, ion doping, or plasma treatment. With this structure, oxygen can be supplied to an oxide film.

[5.2.3. Oxide Film]

Next, a material that can be used as the oxide film 404 is described.

The oxide film 404 can be an In-based metal oxide film, a Zn-based metal oxide film, an In—Zn-based metal oxide film, an InGa—Zn-based metal oxide film, or the like, for example.

For example, "In" may have a function of increasing conductivity of the oxide film 404. For example, "In" included in the oxide film 404 can improve carrier mobility of the oxide film 404.

Alternatively, a metal oxide including another metal element instead of part or all of Ga in the InGa—Zn-based metal oxide may be used. As the aforementioned another metal element, a metal element that is capable of being bonded to oxygen atoms more than gallium is can be used, for example, and specifically one or more elements of titanium, zirconium, hafnium, germanium, and tin can be used, for instance. Alternatively, as the aforementioned another metal element, one or more elements of lanthanum, cerium, praseodymium, neodymium, samarium, europium, gadolinium, terbium, dysprosium, holmium, erbium, thulium, ytterbium, and lutetium may be used. These metal elements may have a function as a stabilizer and reduce generation of oxygen vacancies in the oxide film. Note that the amount of such a metal element added is determined so that the metal oxide can function as a semiconductor. When a metal element that is capable of being bonded to oxygen atoms more than gallium is used and oxygen is supplied to a metal oxide, oxygen defects in the metal oxide can be reduced.

For example, "Zn" may have a function of facilitating crystallization of the oxide film.

Specifically, the concentration of hydrogen in the oxide film can be lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$ in secondary ion mass spectrometry (SIMS).

The concentration of nitrogen in the oxide film can be lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$ in SIMS.

The concentration of carbon in the oxide film can be lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$ in SIMS.

The concentration of silicon in the oxide film can be lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Further, the concentration of sodium in the oxide film can be lower than or equal to $5\times10^{16}$ cm$^{-3}$, preferably lower than or equal to $1\times10^{16}$ cm$^{-3}$, and further preferably lower than or equal to $1\times10^{15}$ cm$^3$ in SIMS. In addition, the concentration of lithium in the oxide film can be lower than or equal to $5\times10^{15}$ cm$^3$, and preferably lower than or equal to $1\times10^{15}$ cm$^{-3}$ in SIMS. Further, the concentration of potassium in the oxide film can be lower than or equal to $5\times10^{15}$ cm$^3$, and preferably lower than or equal to $1\times10^{15}$ cm$^{-3}$.

The amount of each of the following gas molecules (atoms) released from the oxide film is preferably less than or equal to $1\times10^{19}$/cm$^3$, and further preferably less than or equal to $1\times10^{18}$/cm$^3$, by thermal desorption spectroscopy (TDS) analysis: a gas molecule (atom) having a mass-to-charge ratio (m/z) of 2 (e.g., hydrogen molecule), a gas molecule (atom) having a m/z of 18, a gas molecule (atom) having a m/z of 28, and a gas molecule (atom) having a m/z of 44.

For example, an oxide semiconductor film can be used as the oxide film 404.

An oxide semiconductor film may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor).

For example, the oxide semiconductor film may include a CAAC-OS. The CAAC-OS includes, for example, an oxide semiconductor in which c-axes are aligned, and a-axes and/or b-axes are not macroscopically aligned.

Embodiment 6

Power Storage Device

As an example of a power storage device, a nonaqueous secondary battery typified by a lithium-ion secondary battery is described.

[6.1. Positive Electrode]

Figure 17A:
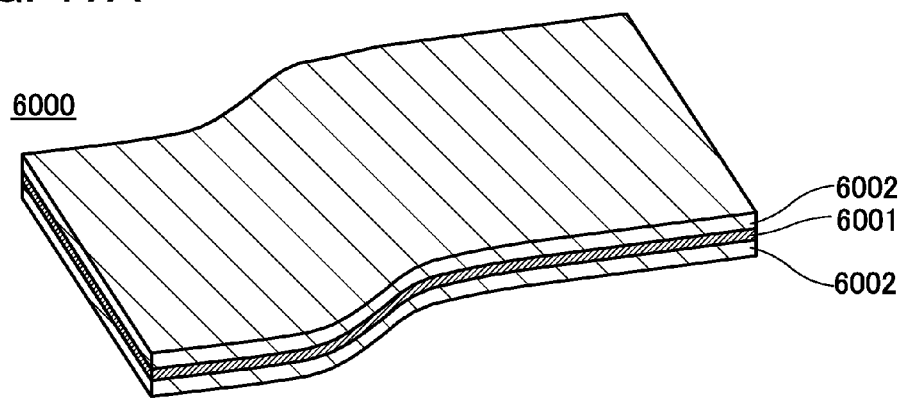
FIGS. 17A and 17B show a positive electrode.

First, a positive electrode of the power storage device is described with reference to FIGS. 17A and 17B.

A positive electrode 6000 includes a positive electrode current collector 6001 and a positive electrode active material layer 6002 formed over the positive electrode current collector 6001 by a coating method, a CVD method, a sputtering method, or the like, for example. Although an example of providing the positive electrode active material layer 6002 on both surfaces of the positive electrode current collector 6001 with a sheet shape (or a strip-like shape) is illustrated in FIG. 17A, one embodiment of the present invention is not limited to this example. The positive electrode active material layer 6002 may be provided on one of the surfaces of the positive electrode current collector 6001. Further, although the positive electrode active material layer 6002 is provided entirely over the positive electrode current collector 6001 in FIG. 17A, one embodiment of the present invention is not limited thereto. The positive electrode active material layer 6002 may be provided over part of the positive electrode current collector 6001. For example, a structure may be employed in which the positive electrode active material layer 6002 is not provided in a portion where the positive electrode current collector 6001 is connected to a positive electrode tab.

The positive electrode current collector 6001 can be formed using a material that has high conductivity and is not alloyed with a carrier ion of lithium or the like, such as stainless steel, gold, platinum, zinc, iron, copper, aluminum, or titanium, an alloy thereof, or the like. Alternatively the positive electrode current collector 6001 can be formed using an aluminum alloy to which an element which improves heat resistance, such as silicon, titanium, neodymium, scandium, or molybdenum, is added. Further alternatively, the positive electrode current collector 6001 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The positive electrode current collector 6001 can have a foil shape, a plate (sheet) shape, a net shape, a punching-metal shape, an expanded-metal shape, or the like as appropriate. The positive electrode current collector 6001 preferably has a thickness of greater than or equal to 10 μm and less than or equal to 30 μm.

Figure 17B:
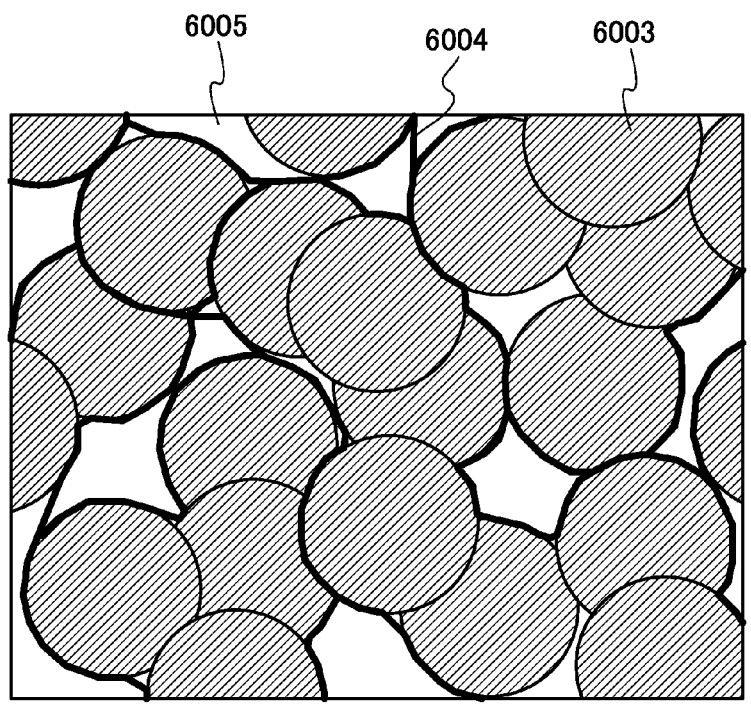

FIG. 17B is a schematic view illustrating the longitudinal cross-sectional view of the positive electrode active material layer 6002. The positive electrode active material layer 6002 includes particles of the positive electrode active material 6003, graphene 6004 as a conductive additive, and a binder 6005.

Examples of the conductive additive are acetylene black (AB), ketjen black, graphite (black lead) particles, and carbon nanotubes in addition to graphene described later. Here, the positive electrode active material layer 6002 using the graphene 6004 is described as an example.

The positive electrode active material 6003 is in the form of particles made of secondary particles having average particle diameter and particle diameter distribution, which is obtained in such a way that material compounds are mixed at a predetermined ratio and baked and the resulting baked product is crushed, granulated, and classified by an appropriate means. For this reason, the positive electrode active material 6003 is schematically illustrated as spheres in FIG. 17B; however, the shape of the positive electrode active material 6003 is not limited to this shape.

As the positive electrode active material 6003, a material into/from which carrier ions such as lithium ions can be inserted and extracted is used.

For example, an olivine-type lithium-containing composite phosphate (General formula: $LiMPO_4$; M is one or more of Fe(II), Mn(II), Co(II), and Ni(II)) can be used. Typical examples of the general formula $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite silicate such as $Li_{(2-j)}MSiO_4$ (general formula) (M is one or more of Fe(II), Mn(II), Co(II), and Ni(II); 0≤j≤2)) can be used. Typical examples of the general formula $Li_{(2-j)}MSiO_4$ are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Further alternatively, any of the following lithium-containing materials with a layered rock-salt crystal structure can be used: lithium cobalt oxide ($LiCoO_2$); $LiNiO_2$; $LiMnO_2$; $Li_2MnO_3$; a NiCo-containing material (general formula: $LiNi_xCo_{1-x}O_2$ (0<x<1)) such as $LiNi_{0.8}Co_{0.2}O_2$; a NiMn-containing material (general formula: $LiNi_xMn_{1-x}O_2$ (0<x<1)) such as $LiNi_{0.5}Mn_{0.5}O_2$; and a NiMnCo-containing material (also referred to as NMC) (general formula: $LiNi_xMn_yCo_{1-x-y}O_2$ (x>0, y>0, and x+y<1)) such as $LiNi_{1/3}Mn_{1/3}Co_{1/3}O_2$.

Still further alternatively, for the positive electrode active material 6003, any of other various compounds, such as an active material having a spinel crystal structure (e.g., $LiMn_2O_4$) and an active material having an inverse spinel crystal structure (e.g., $LiMVO_4$) can be used.

In the case where carrier ions are alkali metal ions other than lithium ions or alkaline-earth metal ions, the following may be used as the positive electrode active material 6003: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides.

Note that although not illustrated, a carbon layer may be provided on a surface of the positive electrode active material 6003. With a carbon layer, conductivity of an electrode can be increased. The positive electrode active material 6003 can be coated with the carbon layer by mixing a carbohydrate such as glucose at the time of baking the positive electrode active material.

In addition, the graphene 6004 which is added to the positive electrode active material layer 6002 as a conductive additive can be formed by performing reduction treatment on graphene oxide.

Here, graphene in this specification includes single-layer graphene or multilayer graphene including two to a hundred layers. The single-layer graphene refers to a sheet of one atomic layer of carbon molecules having π bonds. Further, graphene oxide in this specification refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

In the case of multilayer graphene including graphene obtained by reducing graphene oxide, the interlayer distance of the graphene is greater than or equal to 0.34 nm and less than or equal to 0.5 nm, preferably greater than or equal to 0.38 nm and less than or equal to 0.42 nm, further preferably greater than or equal to 0.39 nm and less than or equal to 0.41 nm. In general graphite, the interlayer distance of single-layer graphene is 0.34 nm. Since the interlayer distance in the graphene used for the power storage device of one embodiment of the present invention is longer than that in the general graphite, carrier ions can easily transfer between layers of the graphene in the multilayer graphene.

Graphene oxide can be formed by an oxidation method called a Hummers method, for example.

The Hummers method is as follows: a sulfuric acid solution of potassium permanganate, a hydrogen peroxide solution, and the like are mixed into a graphite powder to cause oxidation reaction; thus, a dispersion liquid including graphite oxide is formed. Through the oxidation of carbon in graphite, functional groups such as an epoxy group, a carbonyl group, a carboxyl group, or a hydroxyl group are bonded in the graphite oxide. Accordingly, the interlayer distance between a plurality of pieces of graphene in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid containing the graphene oxide, so that powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, potassium permanganate, or the like or a method for forming graphene oxide that does not use the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. Oxygen in a functional group of graphene oxide is negatively charged in a polar solvent typified by NMP (also referred to as N-methylpyrrolidone, 1-methyl-2-pyrrolidone, N-methyl-2-pyrrolidone, or the like); therefore, while interacting with NMP, the graphene oxide repels other graphene oxide and is hardly aggregated. For this reason, in a polar solvent, graphene oxide can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

As illustrated in the cross-sectional view of the positive electrode active material layer 6002 in FIG. 17B, the plurality of particles of the positive electrode active material 6003 is coated with a plurality of pieces of the graphene 6004. The sheet-like graphene 6004 is connected to the plurality of particles of the positive electrode active material 6003. In particular, since the graphene 6004 has the sheet shape, surface contact can be made in such a way that part of surfaces of the particles of the positive electrode active material 6003 are wrapped with the graphene 6004. Unlike a conductive additive in the form of particles such as acetylene black, which makes point contact with a positive electrode active material, the graphene 6004 is capable of surface contact with low contact resistance; accordingly, the electron conductivity between the particles of the positive electrode active material 6003 and the graphene 6004 can be improved without an increase in the amount of a conductive additive.

Further, surface contact is made between the plurality of pieces of the graphene 6004. This is because graphene oxide with extremely high dispersibility in a polar solvent is used for the formation of the graphene 6004. The solvent is removed by volatilization from a dispersion medium in which the graphene oxide is uniformly dispersed, and the graphene oxide is reduced to give graphene; hence, pieces of the graphene 6004 remaining in the positive electrode active material layer 6002 are partly overlapped with each other and dispersed such that surface contact is made, thereby forming a path for electron conduction.

Further, some pieces of the graphene 6004 are arranged three-dimensionally between the particles of the positive electrode active material 6003. Furthermore, the graphene 6004 is an extremely thin film (sheet) made of a single layer of carbon molecules or stacked layers thereof and hence is in contact with part of the surfaces of the particles of the positive electrode active material 6003 in such a way as to cover and fit these surfaces. A portion of the graphene 6004 which is not in contact with the particles of the positive electrode active material 6003 is warped between the plurality of particles of the positive electrode active material 6003 and crimped or stretched.

Consequently, a network for electron conduction is formed in the positive electrode 6000 by the pieces of the graphene 6004. Therefore, a path for electric conduction between the particles of the positive electrode active material 6003 is maintained. As described above, in the case of the coating method, the graphene which is obtained by reducing the dispersion medium in which the graphene oxide is uniformly dispersed after coating and drying is used as a conductive additive, which enables the positive electrode active material layer 6002 to have high electron conductivity.

The ratio of the positive electrode active material 6003 in the positive electrode active material layer 6002 can be increased because it is not necessary to increase the added amount of the conductive additive in order to increase contact points between the positive electrode active material 6003 and the graphene 6004. Accordingly, the discharge capacity of the secondary battery can be increased.

The average particle diameter of the primary particle of the positive electrode active material 6003 is less than or equal to 500 nm, preferably greater than or equal to 50 nm and less than or equal to 500 nm. To make surface contact with the plurality of particles of the positive electrode active material 6003, the length of one side of the graphene 6004 is greater than or equal to 50 nm and less than or equal to 100 µm, preferably greater than or equal to 800 nm and less than or equal to 20 µm.

Examples of the binder included in the positive electrode active material layer 6002 are polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical example.

The above-described positive electrode active material layer 6002 preferably includes the positive electrode active material 6003 at greater than or equal to 90 wt % and less than or equal to 94 wt %, the graphene 6004 as the conductive additive at greater than or equal to 1 wt % and less than or equal to 5 wt %, and the binder at greater than or equal to 1 wt % and less than or equal to 5 wt % with respect to the total weight of the positive electrode active material layer 6002.

[6.2. Negative Electrode]

Figure 18A:
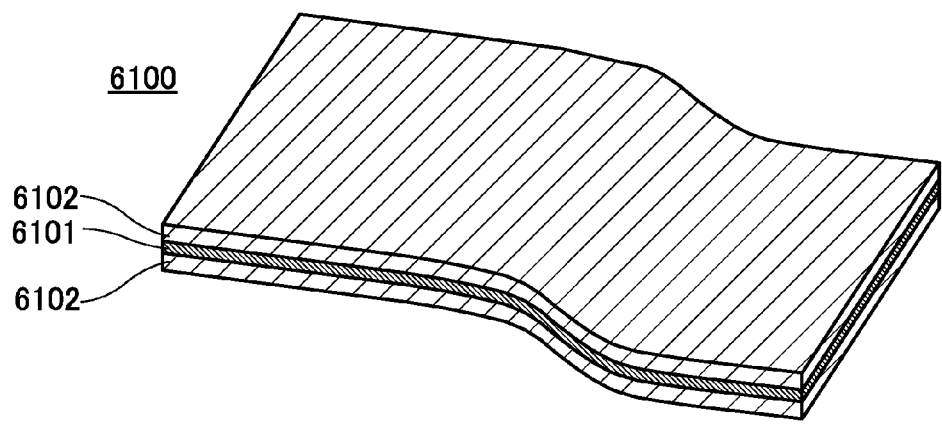
FIGS. 18A and 18B show a negative electrode.

Next, a negative electrode of the power storage device is described with reference to FIGS. 18A and 18B.

A negative electrode 6100 includes a negative electrode current collector 6101 and a negative electrode active material layer 6102 formed over the negative electrode current collector 6101 by a coating method, a CVD method, a sputtering method, or the like, for example. Although an example of providing the negative electrode active material layer 6102 on both surfaces of the negative electrode current collector 6101 with a sheet shape (or a strip-like shape) is illustrated in FIG. 18A, one embodiment of the present invention is not limited to this example. The negative electrode active material layer 6102 may be provided on one of the surfaces of the negative electrode current collector 6101. Further, although the negative electrode active material layer 6102 is provided entirely over the negative electrode current collector 6101 in FIG. 18A, one embodiment of the present invention is not limited thereto. The negative electrode active material layer 6102 may be provided over part of the negative electrode current collector 6101. For example, a structure may be employed in which the negative electrode active material layer 6102 is not provided in a portion where the negative electrode current collector 6101 is connected to a negative electrode tab.

The negative electrode current collector 6101 can be formed using a material which has high conductivity and is not alloyed with carrier ions such as lithium ions, such as stainless steel, gold, platinum, zinc, iron, copper, or titanium, an alloy thereof, or the like. Alternatively, the negative electrode current collector 6101 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The negative electrode current collector 6101 can have a foil shape, a plate (sheet) shape, a net shape, a punching-metal shape, an expanded-metal shape, or the like as appropriate. The negative electrode current collector 6101 preferably has a thickness of greater than or equal to 10 µm and less than or equal to 30 µm.

Figure 18B:
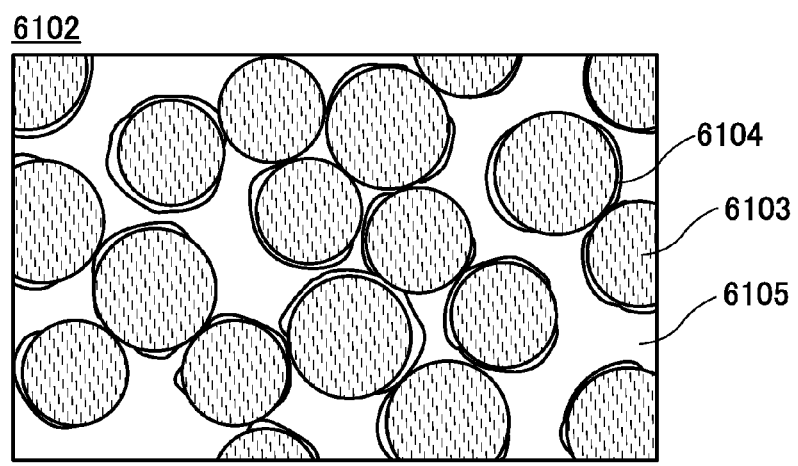

FIG. 18B is a schematic view of part of a cross-section of the negative electrode active material layer 6102. Although an example of the negative electrode active material layer 6102 including the negative electrode active material 6103 and the binder 6105 is shown here, one embodiment of the present invention is not limited to this example. It is sufficient that the negative electrode active material layer 6102 includes at least the negative electrode active material 6103.

There is no particular limitation on the material of the negative electrode active material 6103 as long as it is a material with which a metal can be dissolved and precipitated or a material into/from which metal ions can be inserted and extracted. Other than a lithium metal, graphite, which is a carbon material generally used in the field of power storage, can also be used as the negative electrode active material 6103. Examples of graphite are low crystalline carbon such as soft carbon and hard carbon and high crystalline carbon such as natural graphite, kish graphite, pyrolytic carbon, mesophase pitch based carbon fiber, mesocarbon microbeads (MCMB), mesophase pitches, and petroleum-based or coal-based coke.

As the negative electrode active material 6103, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used as the alloy-based material. Such metals have higher capacity than graphite. In particular, silicon has a significantly high theoretical capacity of 4200 mAh/g. For this reason, silicon is preferably used as the negative electrode active material 6103.

Although the negative electrode active material 6103 is illustrated as a particulate substance in FIG. 18B, the shape of the negative electrode active material 6103 is not limited thereto. The negative electrode active material 6103 can have a given shape such as a plate shape, a rod shape, a cylindrical shape, a powder shape, or a flake shape. Further, the negative electrode active material 6103 may have a three-dimensional shape such as unevenness on a surface with a plate shape, fine unevenness on a surface, or a porous shape.

The negative electrode active material layer 6102 may be formed by a coating method in such a manner that a conductive additive (not illustrated) and the binder 6105 are added to the negative electrode active material 6103 to form a negative electrode paste and the negative electrode paste is applied onto the negative electrode current collector 6101 and dried.

Note that the negative electrode active material layer 6102 may be predoped with lithium. As a predoping method, a sputtering method may be used to form a lithium layer on a surface of the negative electrode active material layer 6102.

Alternatively, the negative electrode active material layer 6102 can be predoped with lithium by providing lithium foil on the surface thereof.

Further, graphene (not illustrated) is preferably formed on a surface of the negative electrode active material 6103. In the case of using silicon as the negative electrode active material 6103, the volume of silicon is greatly changed due to occlusion and release of carrier ions in charge-discharge cycles. Therefore, adhesion between the negative electrode current collector 6101 and the negative electrode active material layer 6102 is decreased, resulting in degradation of battery characteristics caused by charging and discharging. In view of this, graphene is preferably formed on a surface of the negative electrode active material 6103 containing silicon because even when the volume of silicon is changed in charge-discharge cycles, decrease in adhesion between the negative electrode current collector 6101 and the negative electrode active material layer 6102 can be regulated, which makes it possible to reduce degradation of battery characteristics.

Graphene formed on the surface of the negative electrode active material 6103 can be formed by reducing graphene oxide in a similar manner to that of the method for forming the positive electrode. As the graphene oxide, the above-described graphene oxide can be used.

Further, a coating film 6104 of oxide or the like may be formed on the surface of the negative electrode active material 6103. A coating film (solid electrolyte interphase) formed by decomposition of an electrolyte solution in charging cannot release electric charges used at the time of forming the coating film, and therefore forms irreversible capacity. In contrast, the coating film 6104 of oxide or the like provided on the surface of the negative electrode active material 6103 in advance can reduce or prevent generation of irreversible capacity.

As the coating film 6104 coating the negative electrode active material 6103, an oxide film of any one of niobium, titanium, vanadium, tantalum, tungsten, zirconium, molybdenum, hafnium, chromium, aluminum, and silicon or an oxide film containing any one of these elements and lithium can be used. The coating film 6104 is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

A sol-gel method can be used to coat the negative electrode active material 6103 with the coating film 6104, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film 6104 can be formed on the surface of the negative electrode active material 6103.

A decrease in the capacity of the power storage device can be prevented by using the coating film 6104.

[6.3. Electrolyte Solution]

As a solvent for the electrolyte solution used in the power storage device, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent for the electrolyte solution, safety against liquid leakage and the like is improved. Further, the power storage device can be thinner and more lightweight. Typical examples of gelled high-molecular materials are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the power storage device from exploding or catching fire even when the power storage device internally shorts out or the internal temperature increases due to overcharging or the like.

In the case of using a lithium ion as a carrier ion, examples of an electrolyte dissolved in the above-described solvent are one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$, or two or more of these lithium salts in an appropriate combination in an appropriate ratio.

[6.4. Separator]

As the separator of the power storage device, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

[6.5. Nonaqueous Secondary Battery]

Next, structures of nonaqueous secondary batteries are described with reference to FIGS. 19A to 19C and FIGS. 20A and 20B.

[6.5.1. Coin-Type Secondary Battery]

FIG. 19A is an external view of a coin-type (single-layer flat type) lithium-ion secondary battery, including a cross-sectional view of the laminated lithium-ion secondary battery.

In a coin-type secondary battery 950, a positive electrode can 951 serving also as a positive electrode terminal and a negative electrode can 952 serving also as a negative electrode terminal are insulated and sealed with a gasket 953 formed of polypropylene or the like. A positive electrode 954 includes a positive electrode current collector 955 and a positive electrode active material layer 956 which is provided to be in contact with the positive electrode current collector 955. A negative electrode 957 includes a negative electrode current collector 958 and a negative electrode active material layer 959 which is provided to be in contact with the negative electrode current collector 958. A separator 960 and an electrolyte solution (not illustrated) are provided between the positive electrode active material layer 956 and the negative electrode active material layer 959.

The negative electrode 957 includes the negative electrode active material layer 959 over the negative electrode current collector 958. The positive electrode 954 includes the positive electrode active material layer 956 over the positive electrode current collector 955.

As the positive electrode 954, the negative electrode 957, the separator 960, and the electrolyte solution, the above-described materials can be used.

For the positive electrode can 951 and the negative electrode can 952, a metal having corrosion resistance to the electrolyte solution, such as nickel, aluminum, or titanium, an alloy of such a metal, or an alloy of such a metal and another metal (e.g., stainless steel) can be used. Alternatively, the positive electrode can 951 and the negative electrode can 952 are preferably covered with nickel, aluminum, or the like in order to prevent corrosion by the electrolyte solution. The positive electrode can 951 and the negative electrode can 952 are electrically connected to the positive electrode 954 and the negative electrode 957, respectively.

The negative electrode 957, the positive electrode 954, and the separator 960 are immersed in the electrolyte solution. Then, as illustrated in FIG. 19A, the positive electrode can 951, the positive electrode 954, the separator 960, the negative electrode 957, and the negative electrode can 952 are stacked in this order with the positive electrode can 951 positioned at the bottom, and the positive electrode can 951 and the negative electrode can 952 are subjected to pressure bonding with the gasket 953 provided therebetween. In such a manner, the coin-type secondary battery 950 is manufactured.

[6.5.2. Thin Secondary Battery]

Next, an example of a thin secondary battery will be described with reference to FIG. 19B. In FIG. 19B, a structure inside the laminated secondary battery is partly exposed for convenience.

A thin secondary battery 970 illustrated in FIG. 19B includes a positive electrode 973 including a positive electrode current collector 971 and a positive electrode active material layer 972, a negative electrode 976 including a negative electrode current collector 974 and a negative electrode active material layer 975, a separator 977, an electrolyte solution (not illustrated), and an exterior body 978. The separator 977 is provided between the positive electrode 973 and the negative electrode 976 in the exterior body 978. The exterior body 978 is filled with the electrolyte solution. Although one positive electrode 973, one negative electrode 976, and one separator 977 are used in FIG. 19B, the secondary battery may have a stacked-layer structure in which positive electrodes, negative electrodes, and separators are alternately stacked.

For the positive electrode, the negative electrode, the separator, and the electrolyte solution (an electrolyte and a solvent), the above-described members can be used.

In the thin secondary battery 970 illustrated in FIG. 19B, the positive electrode current collector 971 and the negative electrode current collector 974 also serve as terminals (tabs) for an electrical contact with the outside. For this reason, the positive electrode current collector 971 and the negative electrode current collector 974 each have a part exposed outside the exterior body 978.

As the exterior body 978 in the thin secondary battery 970, for example, a stacked film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolyte solution and a gas can be blocked and an insulating property and resistance to the electrolyte solution can be obtained.

[6.5.3. Cylindrical Secondary Battery]

Figure 20A:
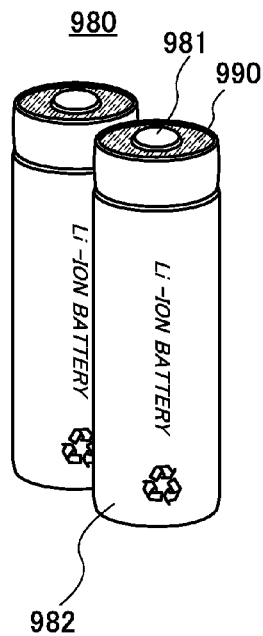
FIGS. 20A and 20B show a power storage device.

Next, an example of a cylindrical secondary battery is described with reference to FIGS. 20A and 20B. As illustrated in FIG. 20A, a cylindrical secondary battery 980 includes a positive electrode cap (battery lid) 981 on the top surface and a battery can (outer can) 982 on the side surface and bottom surface. The positive electrode cap 981 and the battery can (outer can) 982 are insulated by the gasket 990 (insulating packing).

Figure 20B:
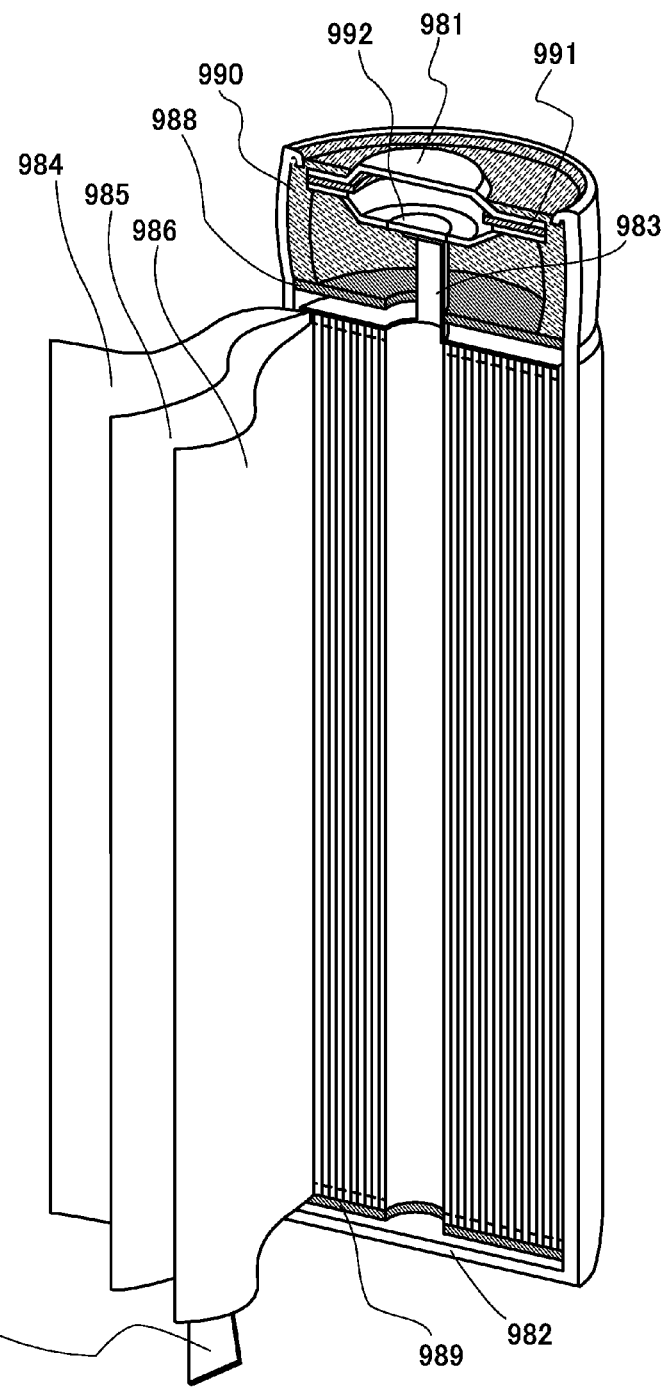

FIG. 20B is a schematic view of a cross-section of the cylindrical secondary battery. Inside the battery can 982 having a hollow cylindrical shape, a battery element in which a strip-like positive electrode 984 and a strip-like negative electrode 986 are wound with a stripe-like separator 985 provided therebetween is provided. Although not illustrated, the battery element is wound around a center pin. The battery can 982 is closed at one end and opened at the other end.

For the positive electrode 984, the negative electrode 986, and the separator 985, the above-described members can be used.

For the battery can 982, a metal having corrosion resistance to an electrolyte solution, such as nickel, aluminum, or titanium, an alloy of such a metal, or an alloy of such a metal and another metal (e.g., stainless steel or the like) can be used. Alternatively, the battery can 982 is preferably covered with nickel, aluminum, or the like in order to prevent corrosion caused by the electrolyte solution. Inside the battery can 982, the battery element in which the positive electrode, the negative electrode, and the separator are wound is provided between a pair of insulating plates 988 and 989 which face each other.

Further, an electrolyte solution (not illustrated) is injected inside the battery can 982 in which the battery element is provided. For the electrolyte solution, the above-described electrolyte and solvent can be used.

Since the positive electrode 984 and the negative electrode 986 of the cylindrical secondary battery are wound, active material layers are formed on both sides of the current collectors. A positive electrode terminal (positive electrode current collecting lead) 983 is connected to the positive electrode 984, and a negative electrode terminal (negative electrode current collecting lead) 987 is connected to the negative electrode 986. Both the positive electrode terminal 983 and the negative electrode terminal 987 can be formed using a metal material such as aluminum. The positive electrode terminal 983 and the negative electrode terminal 987 are resistance-welded to a safety valve mechanism 992 and the bottom of the battery can 982, respectively. The safety valve mechanism 992 is electrically connected to the positive electrode cap 981 through a positive temperature coefficient (PTC) element 991. The safety valve mechanism 992 cuts off electrical connection between the positive electrode cap 981 and the positive electrode 984 when the internal pressure of the battery increases and exceeds a predetermined threshold value. The PTC element 991 is a heat sensitive resistor whose resistance increases as temperature rises, and controls the amount of current by increase in resistance to prevent abnormal heat generation. Barium titanate ($BaTiO_3$)-based semiconductor ceramic or the like can be used for the PTC element.

[6.5.4. Rectangular Secondary Battery]

Next, an example of a rectangular secondary battery is described with reference to FIG. 19C. A wound body 993 illustrated in FIG. 19C includes a negative electrode 994, a positive electrode 995, and a separator 996. The wound body 993 is obtained by winding a sheet of a stack in which the negative electrode 994 overlaps with the positive electrode 995 with the separator 996 provided therebetween. The wound body 993 is covered with a rectangular sealed can or the like; thus, a rectangular secondary battery is manufactured. Note that the number of stacks each including the negative electrode 994, the positive electrode 995, and the separator 996 may be determined as appropriate depending on capacity and an element volume which are required.

As in the cylindrical secondary battery, the negative electrode 994 is connected to a negative electrode tab (not illustrated) through one of a terminal 997 and a terminal 998, and the positive electrode 995 is connected to a positive electrode tab (not illustrated) through the other of the terminal 997 and the terminal 998. Surrounding structures such as a safety valve mechanism are similar to those in the cylindrical secondary battery.

As described above, although the coin-type secondary battery, the thin (laminated) secondary battery, the cylindrical secondary battery, and the rectangular secondary battery are described as examples of the secondary battery, secondary batteries having other shapes can be used. Further, a structure in which a plurality of positive electrodes, a plurality of negative electrodes, and a plurality of separators are stacked or wound may be employed.

[6.6. Lithium-Ion Capacitor]

Next, a lithium-ion capacitor, which is an example of a power storage device, will be described.

A lithium-ion capacitor is a hybrid capacitor which combines a positive electrode of an electric double layer capacitor (EDLC) and a negative electrode of a lithium-ion secondary battery using a carbon material, and also an asymmetric capacitor in which the principles of power storage are different between the positive electrode and the negative electrode. The positive electrode enables charge and discharge by a physical action making use of an electrical double layer, whereas the negative electrode enables charge and discharge by a chemical action of lithium. With the use of a negative electrode in which lithium is occluded in advance as the carbon material or the like that is a negative electrode active material, the lithium-ion capacitor can have energy density dramatically higher than that of a conventional electrical double layer capacitor including a negative electrode using active carbon.

In a lithium-ion capacitor, instead of a positive electrode active material layer in a lithium-ion secondary battery, a material that can reversibly adsorb at least one of lithium ions and anions is used. Examples of such a material include active carbon, a conductive high molecule, a polyacenenic semiconductor (PAS), and the like.

The lithium-ion capacitor has high efficiency of charge and discharge, capability of rapid charge and discharge, and a long life even when it is repeatedly used.

Such a lithium-ion capacitor can be used in a power storage device of one embodiment of the present invention. Thus, generation of irreversible capacity is reduced, so that a power storage device having improved cycle performance can be manufactured.

Embodiment 7

Power Storage System

A structural example of a power storage system will be described.

Figure 21A:
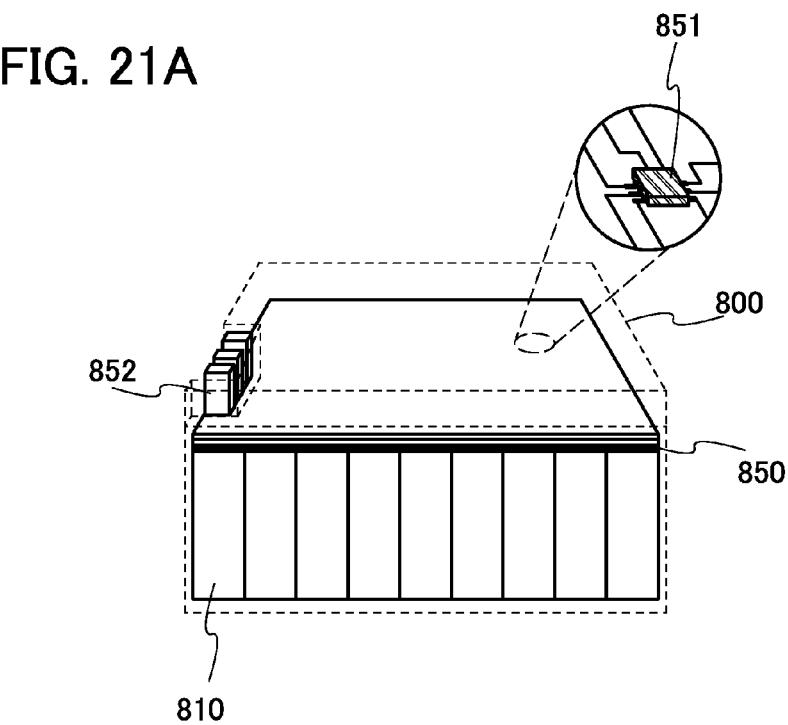
FIGS. 21A and 21B show a power storage system.
Figure 21B:
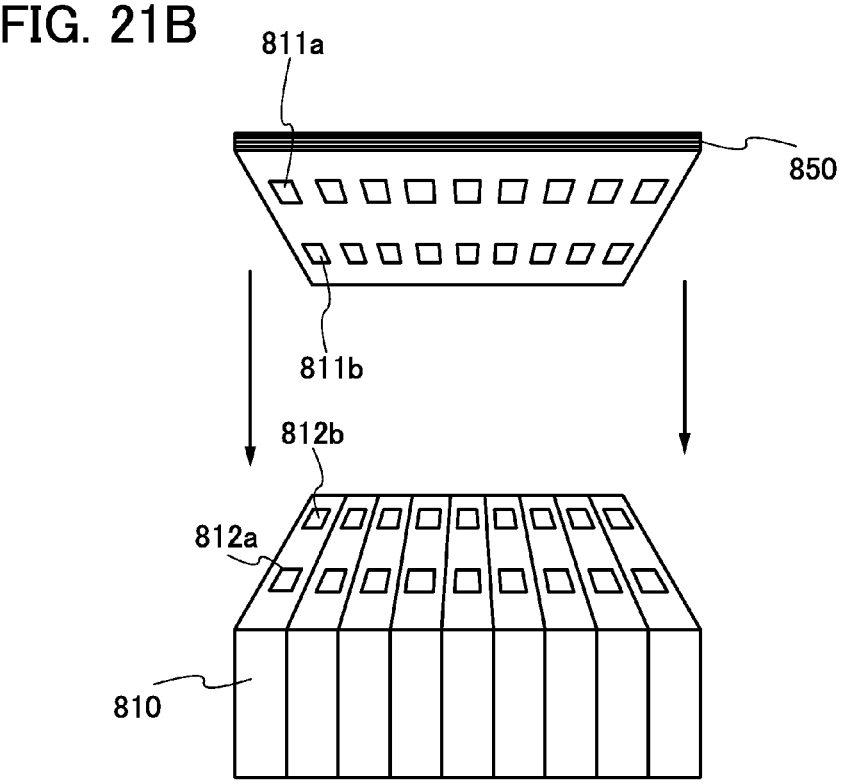

The structural example of the power storage system is illustrated in FIGS. 21A and 21B. The power storage system illustrated in FIG. 21A includes a plurality of power storage elements 810 and a circuit substrate 850 in a housing 800.

As the power storage elements 810, any of the power storage devices described with reference to FIGS. 17A and 17B, FIGS. 18A and 18B, FIGS. 19A to 19C, and FIGS. 20A and 20B can be used.

The circuit substrate 850 includes the control system described with reference to FIG. 7 including a chip 851, for example. The chip 851 is, for example, the semiconductor circuit 246 shown in FIG. 7. In addition, the circuit substrate 850 is connected to a connector 852 that is connected to an external device. The circuit substrate 850 is connected to, for example, a power supply or a load, via the connector 852.

The circuit substrate 850 is, for example, a printed circuit board (PCB). When a printed circuit board is used as the circuit board 850, electronic components such as a resistor, a capacitor, a coil (an inductor), and a semiconductor integrated circuit (IC) are mounted over the printed circuit board and connected, whereby the control system can be formed. As well as the above-described electronic components, a variety of components, for example, a temperature sensing element such as a thermistor, a fuse, a filter, a crystal oscillator, and an electromagnetic compatibility (EMC) component can be mounted.

Here, as the above semiconductor integrated circuit (IC), a circuit including a transistor can be used. Thus, power consumption of the control system can be reduced significantly.

Further, as illustrated in FIG. 21B, the circuit substrate 850 includes a plurality of connection terminals 811a and a plurality of connection terminals 811b. One connection terminal 811a and one connection terminal 811b are provided for each power storage element 810. The connection terminal 811a is connected to a connection terminal 812a of the corresponding power storage element 810. The connection terminal 811b is connected to a connection terminal 812b of the corresponding power storage element 810. At this time, the power storage element 810 is connected to the control system provided in the circuit substrate 850 through the connection terminal 811a and the connection terminal 811b.

Figure 22:
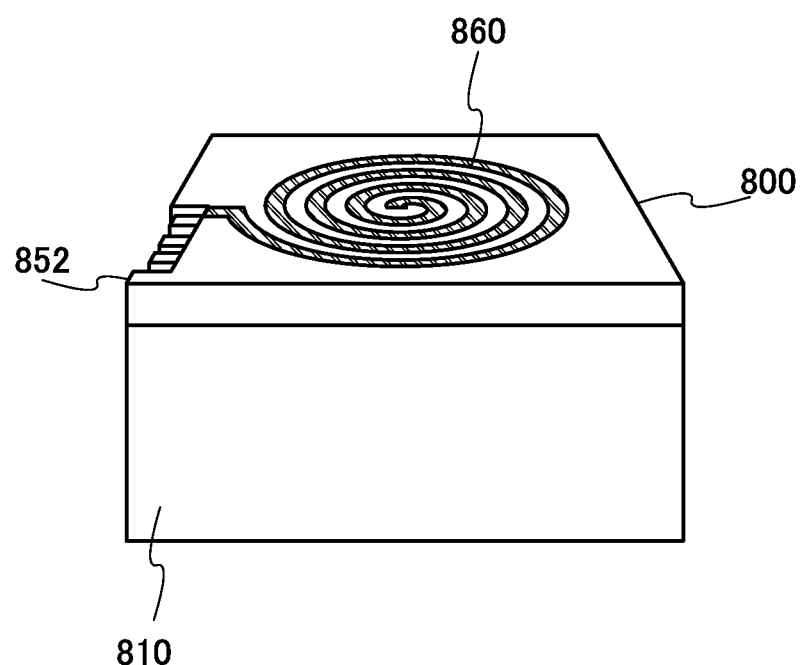
FIG. 22 shows a power storage system.

Note that as illustrated in FIG. 22, an antenna 860 may be provided in the housing 800.

The antenna 860 can be used for transmitting and receiving electric power and a signal to/from the outside of the plurality of power storage elements 810, for example. The antenna 860 is electrically connected to the circuit substrate 850 to allow the electric circuit to control the transmission and reception of electric power and a signal to/from the outside.

A variety of antennas may be provided or a structure where an antenna is not provided may be employed.

In FIG. 22, the antenna 860 has a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

In addition, the housing 800 may have a structure having a function of preventing shielding of an electric field or a magnetic field due to the power storage elements, for example. In this case, a magnetic material can be used for the housing 800, for example.

As illustrated in FIGS. 21A and 21B and FIG. 22, the power storage system can be formed. With this structure, deterioration of the power storage devices in the power storage system can be prevented, for example.

Embodiment 8

Electrical Appliance

The power storage device of one embodiment of the present invention can be used for a variety of electrical appliances.

[8.1. Range of Electrical Appliances]

Here, "electrical appliances" refer to all general industrial products including portions which operate by electric power. Electrical appliances are not limited to consumer products such as home electrical products and also include products for various uses such as business use, industrial use, and military use in their category.

[8.2. Examples of Electrical Appliance]

Examples of electrical appliances each using the power storage device of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and power storage device for leveling the amount of power supply and smart grid. In addition, moving objects (transporters) driven by an electric motor using electric power from a power storage device are also included in the category of the electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical appliances, the power storage device of one embodiment of the present invention can be used as a main power supply for almost the whole power consumption. Alternatively, in the electrical appliances, the power storage device of one embodiment of the present invention can be used as an uninterruptible power source which can supply power to the electrical appliances when the supply of power from the main power supply or a commercial power supply is stopped. Further alternatively, in the electrical appliances, the power storage device of one embodiment of the present invention can be used as an auxiliary power supply for supplying electric power to the electrical appliances at the same time as the power supply from the main power supply or a commercial power supply.

[8.3. Example of Electric Power Network]

The electrical appliances may each include a power storage device, or may be connected wirelessly or with a wiring to at least one power storage device and a control device that controls the electric power system to form an electric network (electric power network). The electric network controlled by the control device can improve usage efficiency of electric power in the whole network.

Figure 23A:
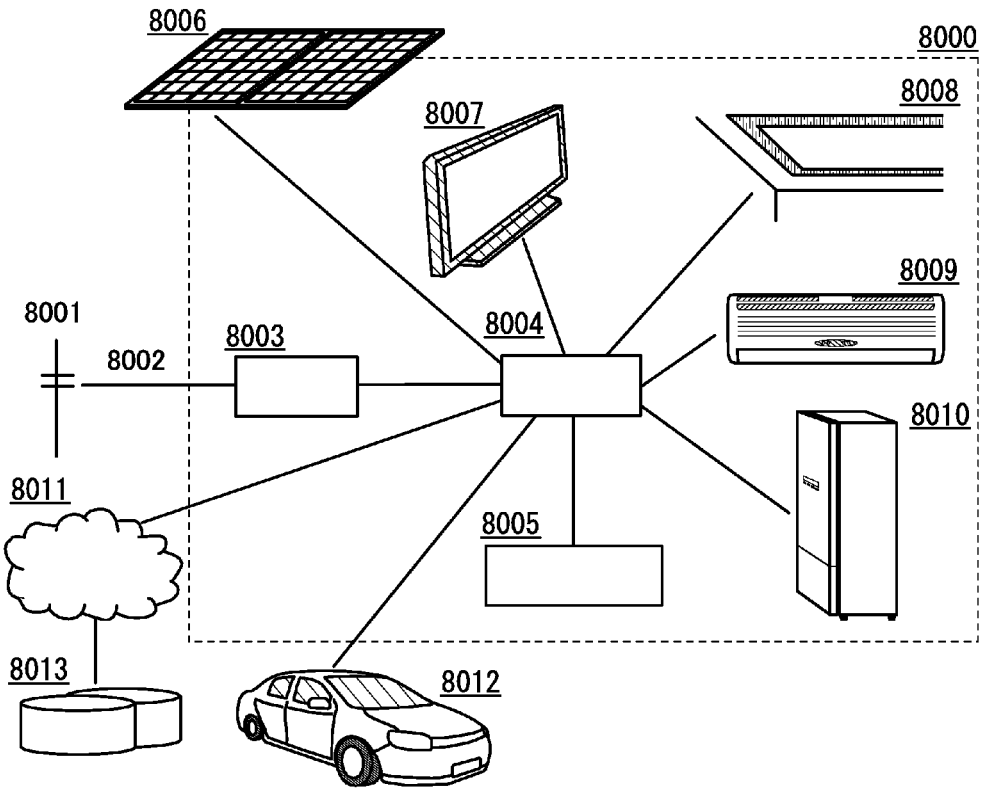
FIGS. 23A to 23C show electrical appliances.

FIG. 23A illustrates an example of a home energy management system (ITEMS) in which a plurality of home appliances, a control device, a power storage device, and the like are connected in a house. Such a system makes it possible to check easily the power consumption of the whole house. In addition, the plurality of home appliances can be operated with a remote control. Further, automatic control of the home appliances with a sensor or the control device can also contribute to low power consumption.

A panelboard 8003 set in a house 8000 is connected to an electric power system 8001 through a service wire 8002. The panelboard 8003 supplies AC power which is electric power supplied from a commercial power supply through the service wire 8002 to each of the plurality of home appliances. A control device 8004 is connected to the panelboard 8003 and also connected to the plurality of home appliances, a power storage system 8005, a solar power generation system 8006, and the like. Further, the control device 8004 can also be connected to an electric vehicle 8012 which is parked outside the house 8000 or the like and operates independently of the panelboard 8003.

The control device 8004 connects the panelboard 8003 to the plurality of home appliances to form a network, and controls the plurality of home appliances connected to the network.

In addition, the control device 8004 is connected to Internet 8011 and thus can be connected to a management server 8013 through the Internet 8011. The management server 8013 receives data on the status of electric power usage of users and therefore can create a database and can provide the users with a variety of services based on the database. Further, as needed, the management server 8013 can provide the users with data on electric power charge for a corresponding time zone, for example. On the basis of the data, the control device 8004 can set an optimized usage pattern in the house 8000.

Examples of the plurality of home appliances are a display device 8007, a lighting device 8008, an air-conditioning system 8009, and an electric refrigerator 8010 which are illustrated in FIG. 23A. However, the plurality of home appliances are not limited to these examples, and refer to a variety of electrical appliances which can be set inside a house, such as the above-described electrical appliances.

In a display portion of the display device 8007, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, and the like, is included in the category of the display device 8007.

The lighting device 8008 includes an artificial light source which generates light artificially by utilizing electric power in its category. Examples of the artificial light source are an incandescent lamp, a discharge lamp such as a fluorescent lamp, and a light-emitting element such as a light emitting diode (LED) and an organic EL element. Although being provided on a ceiling in FIG. 23A, the lighting device 8008 may be installation lighting provided on a wall, a floor, a window, or the like or desktop lighting.

The air-conditioning system 8009 has a function of adjusting an indoor environment such as temperature, humidity, and air cleanliness. FIG. 23A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 8010 is an electrical appliance for the storage of food and the like at low temperature and includes a freezer for freezing at 0° C. or lower. A refrigerant in a pipe which is compressed by a compressor absorbs heat when vaporized, and thus inside the electric refrigerator 8010 is cooled.

The plurality of home appliances may each include a power storage device or may use electric power supplied from the power storage system 8005 or the commercial power supply without including the power storage device. By using a power storage device as an uninterruptible power supply, the plurality of home appliances each including the power storage device can be used even when electric power cannot be supplied from the commercial power supply due to power failure or the like.

In the vicinity of a terminal for power supply in each of the above-described home appliances, an electric power sensor such as a current sensor can be provided. Data obtained with the electric power sensor is sent to the control device 8004, which makes it possible for users to check the used amount of electric power of the whole house. In addition, on the basis of the data, the control device 8004 can determine the distribution of electric power supplied to the plurality of home appliances, resulting in the efficient or economical use of electric power in the house 8000.

In a time zone when the usage rate of electric power which can be supplied from the commercial power supply is low, the power storage system 8005 can be charged with electric power from the commercial power supply. Further, with the use of the solar power generation system 8006, the power storage system 8005 can be charged during the daytime. Note that an object to be charged is not limited to the power storage system 8005, and a power storage device included in the electric vehicle 8012 and the power storage devices included in the plurality of home appliances which are connected to the control device 8004 may each be the object to be charged.

Electric power stored in a variety of power storage devices in such a manner is efficiently distributed by the control device 8004, resulting in the efficient or economical use of electric power in the house 8000.

As an example of controlling an electric power network, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

[8.4. Example of Electrical Appliance (Electric Vehicle)]

Next, as an example of the electrical appliances, a moving object is described with reference to FIGS. 23B and 23C. The power storage device of one embodiment of the present invention can be used as a power storage device for controlling the moving object.

Figure 23B:
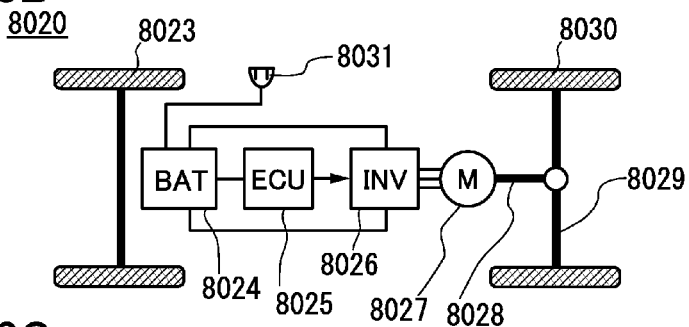
Figure 23C:
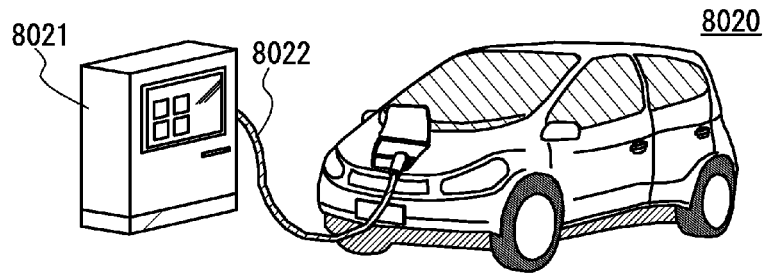

FIG. 23B illustrates an example of a structure inside an electric vehicle. An electric vehicle 8020 includes a power storage device 8024 that can be charged and discharged. Output of electric power of the power storage device 8024 is adjusted by an electronic control unit (ECU) 8025 so that the electric power is supplied to a drive motor unit 8027 through an inverter unit 8026. The inverter unit 8026 can convert DC power input from the power storage device 8024 into three phase AC power, can adjust the voltage, current, and frequency of the converted AC power, and can output the AC power to the drive motor unit 8027.

Thus, when a driver presses an accelerator pedal (not illustrated), the drive motor unit 8027 works, so that torque generated in the drive motor unit 8027 is transferred to rear wheels (drive wheels) 8030 through an output shaft 8028 and a drive shaft 8029. Front wheels 8023 are operated following the rear wheels 8030, whereby the electric vehicle 8020 can be driven.

Sensors such as a voltage sensor, a current sensor, and a temperature sensor are provided in each of the units to monitor physical values of each part of the electric vehicle 8020, as appropriate.

The electronic control unit 8025 is a processing device including a memory such as a RAM or a ROM, and a CPU, which are not illustrated. The electronic control unit 8025 outputs a control signal to the inverter unit 8026, the drive motor unit 8027, or the power storage device 8024 on the basis of operational information of the electric vehicle 8020 (e.g., acceleration, deceleration, or a stop), temperature information of a driving environment or each unit, control information, or input data on the state of charge (SOC) of the power storage device or the like. Various data and programs are stored in the memory.

As the drive motor unit 8027, a DC motor can be used instead of the AC motor, or a combination of either of these motors and an internal-combustion engine can be used.

Note that it is needless to say that one embodiment of the present invention is not limited to the moving object described above as long as the power storage device of one embodiment of the present invention is included.

The power storage device 8024 included in the electric vehicle 8020 can be charged by being supplied with electric power through external charging equipment by a plug-in system, a contactless power supply system, or the like. FIG. 23C illustrates the state where the power storage device 8024 included in the electric vehicle 8020 is charged with the use of a ground-based charging apparatus 8021 through a cable 8022. In charging, a given method such as CHAdeMO (registered trademark) may be employed as a charging method, the standard of a connector, or the like as appropriate. The charging apparatus 8021 may be a charging station provided in a commerce facility or a power source in a house. For example, with the use of a plug-in technique in which a connecting plug 8031 illustrated in FIG. 23B and connected to the power storage device 8024 is electrically connected to the charging apparatus 8021, the power storage device 8024 included in the electric vehicle 8020 can be charged by being supplied with electric power from outside. The power storage device 8024 can be charged by converting external electric power into DC constant voltage having a predetermined voltage level through a converter such as an AC-DC converter.

Further, although not illustrated, a power receiving device may be included in the moving object to charge the power storage device by supplying electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between moving objects. Furthermore, a solar cell may be provided in an exterior of the moving object to charge the power storage device 8024 when the electric vehicle is stopped or driven. To supply electric power in such a contactless manner, an electromagnetic induction method or a magnetic resonance method can be used.

Note that in the case where the moving object is an electric railway vehicle, a power storage device included therein can be charged by being supplied with electric power from an overhead cable or a conductor rail.

With the use of the power storage device of one embodiment of the present invention as the power storage device 8024, the power storage device 8024 can have favorable cycle characteristics and improved convenience. When the power storage device 8024 itself can be more compact and more lightweight as a result of improved characteristics of the power storage device 8024, the electric vehicle can be lightweight and fuel efficiency can be increased. Further, the power storage device 8024 included in the moving object has relatively large capacity; therefore, the power storage device 8024 can be used as an electric power supply source for indoor use, for example. In such a case, the use of a commercial power supply can be avoided at peak time of electric power demand.

[8.5. Example of Electrical Appliance (Portable Information Terminal)]

In addition, as another example of the electrical appliances, a portable information terminal is described with reference to FIGS. 24A to 24C.

Figure 24A:
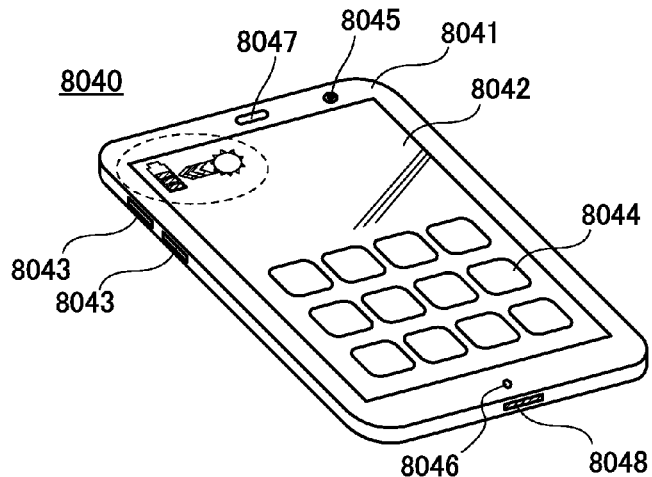
FIGS. 24A to 24C show an electrical appliance.

FIG. 24A is a perspective view illustrating a front surface and a side surface of a portable information terminal 8040. The portable information terminal 8040 is capable of executing a variety of applications such as mobile phone calls, e-mailing, viewing and editing texts, music reproduction, Internet communication, and a computer game. In the portable information terminal 8040, a housing 8041 includes a display portion 8042, a camera lens 8045, a microphone 8046, and a speaker 8047 on its front surface, a button 8043 for operation on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 8040 illustrated in FIG. 24A is an example of providing the one display portion 8042 in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Therefore, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 8042 can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The button 8043 for operation can have various functions in accordance with the intended use. For example, the button

8043 may be used as a home button so that a home screen is displayed on the display portion 8042 by pressing the button 8043. Further, the portable information terminal 8040 may be configured such that main power supply thereof is turned off with a press of the button 8043 for a predetermined time. A structure may also be employed in which a press of the button 8043 brings the portable information terminal 8040 out of a sleep mode. Besides, the button can be used as a switch for starting a variety of functions, for example, depending on the length of time for pressing or by pressing the button together with another button.

Further, the button 8043 may be used as a volume control button or a mute button to have a function of adjusting the volume of the speaker 8047 for outputting sound, for example. The speaker 8047 outputs various kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the button 8043 can have various functions. Although the number of the button 8043 is two in the portable information terminal 8040 in FIG. 24A, it is needless to say that the number, arrangement, position, or the like of the buttons is not limited to this example and can be designed as appropriate.

The microphone 8046 can be used for sound input and recording. Images obtained with the use of the camera lens 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera lens 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical appliance by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and other nonvolatile solid state drive (SSD) devices. Although the portable information terminal 8040 has the touch panel on the display portion 8042, a keyboard may be provided on the housing 8041 instead of the touch panel or may be externally added.

Although the number of the connection terminal 8048 is one in the portable information terminal 8040 in FIG. 24A, it is needless to say that the number, arrangement, position, or the like of the connection terminals is not limited to this example and can be designed as appropriate.

Figure 24B:
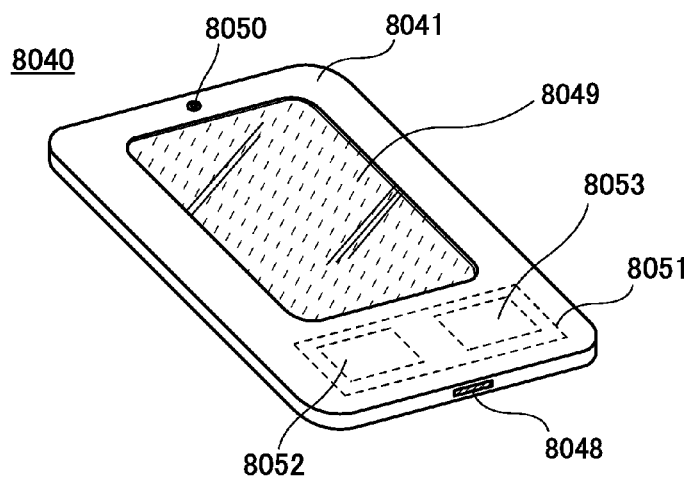

FIG. 24B is a perspective view illustrating the rear surface and the side surface of the portable information terminal 8040. In the portable information terminal 8040, the housing 8041 includes a solar cell 8049 and a camera lens 8050 on its rear surface; the portable information terminal 8040 further includes a charge and discharge control circuit 8051, a power storage device 8052, a DC-DC converter 8053, and the like. FIG. 24B illustrates an example where the charge and discharge control circuit 8051 includes the power storage device 8052 and the DC-DC converter 8053. The power storage device of one embodiment of the present invention, which is described in the above embodiment, is used as the power storage device 8052.

The solar cell 8049 attached on the rear surface of the portable information terminal 8040 can supply power to the display portion, the touch panel, a video signal processor, and the like. Note that the solar cell 8049 can be provided on one or both surfaces of the housing 8041. By including the solar cell 8049 in the portable information terminal 8040, the power storage device 8052 in the portable information terminal 8040 can be charged even in a place where an electric power supply unit is not provided, such as outdoors.

As the solar cell 8049, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 24B is described with reference to a block diagram in FIG. 24C.

Figure 24C:
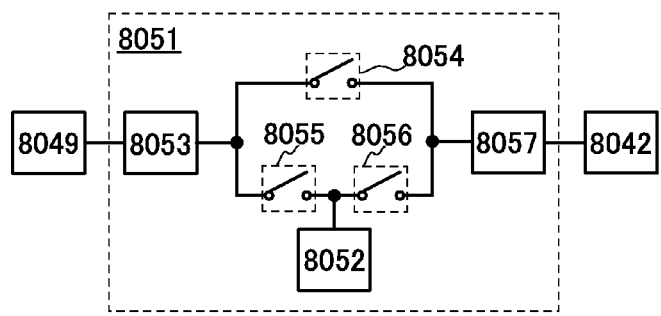

FIG. 24C illustrates the solar cell 8049, the power storage device 8052, the DC-DC converter 8053, a converter 8057, a switch 8054, a switch 8055, a switch 8056, and the display portion 8042. The power storage device 8052, the DC-DC converter 8053, the converter 8057, and the switches 8054 to 8056 correspond to the charge and discharge control circuit 8051 in FIG. 24B.

The voltage of electric power generated by the solar cell 8049 with the use of external light is raised or lowered by the DC-DC converter 8053 to be at a level needed for charging the power storage device 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the power storage device 8052 may be charged.

Although the solar cell 8049 is described as an example of a power generation means, the power generation means is not particularly limited thereto, and the power storage device 8052 may be charged by another power generation means such as a piezoelectric element or a thermoelectric conversion element (Peltier element). The charging method of the power storage device 8052 in the portable information terminal 8040 is not limited thereto, and the connection terminal 8048 may be connected to a power supply to perform charge, for example. The power storage device 8052 may be charged by a non-contact power transmission module performing charge by transmitting and receiving electric power wirelessly, or any of the above charging methods may be used in combination.

Here, the state of charge (SOC) of the power storage device 8052 is displayed on the upper left corner (in the dashed frame in FIG. 24A) of the display portion 8042. Thus, the user can check the state of charge of the power storage device 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, the use is stopped in each of the components and the use frequency of a given function is decreased. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to reduce the power consumption of the power storage device 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 24A.

It is needless to say that one embodiment of the present invention is not limited to the electrical appliance illustrated in FIGS. 24A to 24C as long as the power storage device of one embodiment of the present invention is included.

[8.6. Example of Electrical Appliance (Power Storage System)]

A power storage system will be described as an example of an electrical appliance, with reference to FIG. 25. A power storage system 8100 to be described here can be used at home as the above-described power storage system 8005. Here, the power storage system 8100 is described as a home-use power storage system as an example; however, it is not limited thereto and can also be used for business use or other uses.

Figure 25:
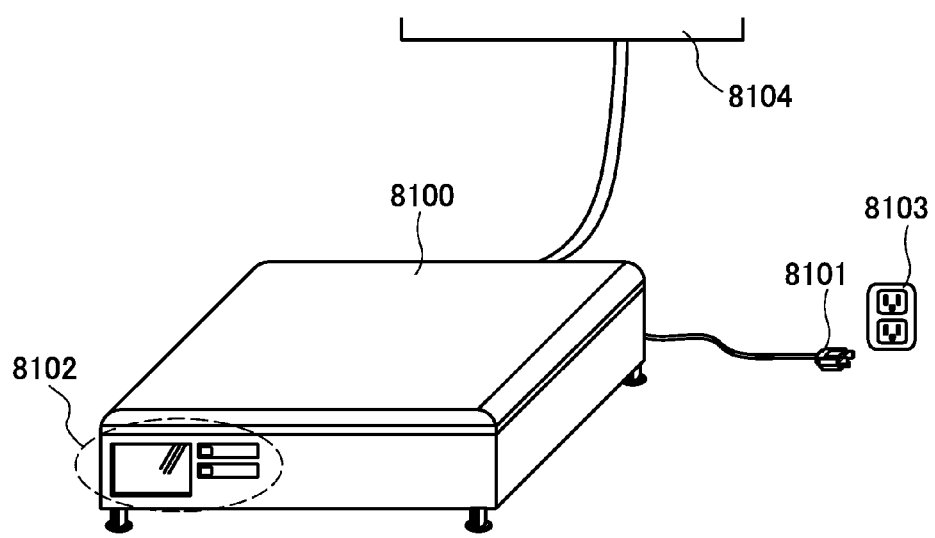
FIG. 25 shows an electrical appliance.

As illustrated in FIG. 25, the power storage system 8100 includes a plug 8101 for being electrically connected to a system power supply 8103. Further, the power storage system 8100 is electrically connected to a panelboard 8104 installed in home.

The power storage system 8100 may further include a display panel 8102 for displaying an operation state or the like. The display panel may have a touch screen. In addition, the power storage system 8100 may include a switch for turning on and off a main power supply, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

The power storage system 8100 includes the plurality of power storage elements illustrated in FIGS. 21A and 21B and a control system, for example.

The control system has functions of monitoring and controlling states of the plurality of power storage elements and protecting the power storage elements. Specifically, the control system collects data of cell voltages and cell temperatures of the power storage elements, monitors overcharge and overdischarge, monitors overcurrent, controls a cell balancer, manages the deterioration condition of a battery, calculates the remaining battery level (the state of charge (SOC)), controls a cooling fan of a driving power storage device, or controls detection of failure, for example.

Note that a power supply for charging the power storage system 8100 is not limited to the system power supply 8103 described above; for example, power may be supplied from a solar power generating system installed outside or a power storage system mounted on an electric vehicle.

This application is based on Japanese Patent Application serial no. 2012-287574 filed with Japan Patent Office on Dec. 28, 2012, the entire contents of which are hereby incorporated by reference.

What is claimed is:

1. A power storage system comprising:
    a first power storage element;
    a second power storage element;
    a third power storage element;
    a fourth power storage element;
    a first connection terminal;
    a second connection terminal;
    a third connection terminal;
    a fourth connection terminal;
    a first switch comprising:
        a first terminal electrically connected to the first connection terminal;
        a second terminal electrically connected to a first terminal of the first power storage element; and
        a third terminal electrically connected to the third connection terminal;
    a second switch comprising:
        a first terminal electrically connected to the second connection terminal;
        a second terminal electrically connected to a second terminal of the first power storage element; and
        a third terminal electrically connected to a first node;
    a third switch comprising:
        a first terminal electrically connected to the first connection terminal;
        a second terminal electrically connected to a first terminal of the second power storage element; and
        a third terminal electrically connected to the third connection terminal;
    a fourth switch comprising:
        a first terminal electrically connected to the second connection terminal;
        a second terminal electrically connected to a second terminal of the second power storage element; and
        a third terminal electrically connected to the first node;
    a fifth switch comprising:
        a first terminal electrically connected to the first connection terminal;
        a second terminal electrically connected to a first terminal of the third power storage element; and a third terminal electrically connected to a second node;
a sixth switch comprising:
- a first terminal electrically connected to the second connection terminal;
- a second terminal electrically connected to a second terminal of the third power storage element; and
- a third terminal electrically connected to the fourth connection terminal;

a seventh switch comprising:
- a first terminal electrically connected to the first connection terminal;
- a second terminal electrically connected to a first terminal of the fourth power storage element; and
- a third terminal electrically connected to the second node;

an eighth switch comprising:
- a first terminal electrically connected to the second connection terminal;
- a second terminal electrically connected to a second terminal of the fourth power storage element; and
- a third terminal electrically connected to the fourth connection terminal;

a ninth switch comprising:
- a first terminal electrically connected to the first node; and
- a second terminal electrically connected to the second node; and a tenth switch comprising:
- a first terminal electrically connected to the second node; and
- a second terminal electrically connected to the third connection terminal.

2. The power storage system, according to claim 1,
wherein the first connection terminal is electrically connected to a first terminal of a power source,
wherein the second connection terminal is electrically connected to a second terminal of the power source,
wherein the third connection terminal is electrically connected to a first terminal of a load, and
wherein the fourth connection terminal is electrically connected to a second terminal of the load.

3. The power storage system, according to claim 1,
wherein each of the first power storage element, the second power storage element, the third power storage element and the fourth power storage element comprises a first electrode, a second electrode and an electrolyte.

4. The power storage system, according to claim 3,
wherein the electrolyte comprises a lithium salt.

5. An energy management system comprising:
the power storage system according to claim 1;
an appliance; and
a control device connected to the power storage system and the appliance.

6. A power storage system comprising:
a first power storage element;
a second power storage element;
a third power storage element;
a fourth power storage element;
a first connection terminal;
a second connection terminal;
a third connection terminal;
a fourth connection terminal;
a first switch;
a second switch;
a third switch;
a fourth switch;
a fifth switch;
a sixth switch;
a seventh switch;
an eighth switch;
a ninth switch; and
a tenth switch,
wherein the first switch is configured to control a conducting state between the first connection terminal and a first terminal of the first power storage element and a conducting state between the third connection terminal and the first terminal of the first power storage element,
wherein the second switch is configured to control a conducting state between the second connection terminal and a second terminal of the first power storage element and a conducting state between a first node and the second terminal of the first power storage element,
wherein the third switch is configured to control a conducting state between the first connection terminal and a first terminal of the second power storage element and a conducting state between the third connection terminal and the first terminal of the second power storage element,
wherein the fourth switch is configured to control a conducting state between the second connection terminal and a second terminal of the second power storage element and a conducting state between the first node and the second terminal of the second power storage element,
wherein the fifth switch is configured to control a conducting state between the first connection terminal and a first terminal of the third power storage element and a conducting state between a second node and the first terminal of the third power storage element,
wherein the sixth switch is configured to control a conducting state between the second connection terminal and a second terminal of the third power storage element and a conducting state between the fourth connection terminal and the second terminal of the third power storage element,
wherein the seventh switch is configured to control a conducting state between the first connection terminal and a first terminal of the fourth power storage element and a conducting state between the second node and the first terminal of the fourth power storage element,
wherein the eighth switch is configured to control a conducting state between the second connection terminal and a second terminal of the fourth power storage element and a conducting state between the fourth connection terminal and the second terminal of the fourth power storage element,
wherein the ninth switch is configured to control a conducting state between the first node and the second node, and
wherein the tenth switch is configured to control a conducting state between the second node and the third connection terminal.

7. The power storage system, according to claim 6,
wherein the first connection terminal is electrically connected to a first terminal of a power source,
wherein the second connection terminal is electrically connected to a second terminal of the power source,
wherein the third connection terminal is electrically connected to a first terminal of a load, and
wherein the fourth connection terminal is electrically connected to a second terminal of the load.

8. The power storage system, according to claim 6, wherein each of the first power storage element, the second power storage element, the third power storage element and the fourth power storage element comprises a first electrode, a second electrode and an electrolyte.

9. The power storage system, according to claim 8, wherein the electrolyte comprises a lithium salt.

10. An energy management system comprising:
the power storage system according to claim 6;
an appliance; and
a control device connected to the power storage system and the appliance.

11. A power storage system comprising:
a first power storage element;
a second power storage element;
a third power storage element;
a fourth power storage element;
a first connection terminal electrically connected to a first terminal of a power source;
a second connection terminal electrically connected to a second terminal of the power source;
a third connection terminal electrically connected to a first terminal of a load;
a fourth connection terminal electrically connected to a second terminal of the load;
a first switch;
a second switch;
a third switch;
a fourth switch;
a fifth switch;
a sixth switch;
a seventh switch;
an eighth switch;
a ninth switch;
a tenth switch;
an encoder; and
a semiconductor circuit,
wherein the first switch is configured to control a conducting state between the first connection terminal and a first terminal of the first power storage element and a conducting state between the third connection terminal and the first terminal of the first power storage element, based on a first control signal,
wherein the second switch is configured to control a conducting state between the second connection terminal and a second terminal of the first power storage element and a conducting state between a first node and the second terminal of the first power storage element, based on the first control signal,
wherein the third switch is configured to control a conducting state between the first connection terminal and a first terminal of the second power storage element and a conducting state between the third connection terminal and the first terminal of the second power storage element, based on a second control signal,
wherein the fourth switch is configured to control a conducting state between the second connection terminal and a second terminal of the second power storage element and a conducting state between the first node and the second terminal of the second power storage element, based on the second control signal,
wherein the fifth switch is configured to control a conducting state between the first connection terminal and a first terminal of the third power storage element and a conducting state between a second node and the first terminal of the third power storage element, based on a third control signal,
wherein the sixth switch is configured to control a conducting state between the second connection terminal and a second terminal of the third power storage element and a conducting state between the fourth connection terminal and the second terminal of the third power storage element, based on the third control signal,
wherein the seventh switch is configured to control a conducting state between the first connection terminal and a first terminal of the fourth power storage element and a conducting state between the second node and the first terminal of the fourth power storage element, based on a fourth control signal,
wherein the eighth switch is configured to control a conducting state between the second connection terminal and a second terminal of the fourth power storage element and a conducting state between the fourth connection terminal and the second terminal of the fourth power storage element, based on the fourth control signal,
wherein the ninth switch is configured to control a conducting state between the first node and the second node,
wherein the tenth switch is configured to control a conducting state between the second node and the third connection terminal,
wherein the encoder is configured to encode a plurality of data signals to generate and output at least the first control signal, the second control signal, the third control signal, and the fourth control signal, and
wherein the semiconductor circuit is configured to output data of instruction to charge or discharge the first power storage element, the second power storage element, the third power storage element, and the fourth power storage element, as the plurality of data signals.

12. The power storage system, according to claim 11, wherein each of the first power storage element, the second power storage element, the third power storage element and the fourth power storage element comprises a first electrode, a second electrode and an electrolyte.

13. The power storage system, according to claim 12, wherein the electrolyte comprises a lithium salt.

14. The power storage system, according to claim 11, further comprising a current detection circuit configured to detect an amount of current flowing through the load,
wherein the semiconductor circuit is configured to output the data of instruction to charge the first power storage element, the second power storage element, the third power storage element, and the fourth power storage element, as the plurality of data signals, when the amount of current detected by the current detection circuit is lower than or equal to a reference value.

15. The power storage system, according to claim 11, wherein the semiconductor circuit comprises a processor, a memory electrically connected to the processor, and a controller electrically connected to the processor and the memory,
wherein the processor comprises a register,
wherein the register comprises a first memory circuit configured to retain data for a period in which power is supplied to the processor and a second memory circuit configured to retain data for a period in which power supply to the processor is stopped, wherein the second memory circuit comprises a transistor configured to control writing and retention of data, and
wherein the transistor has an off-state current of 100 zA or lower per micrometer of channel width.

16. The power storage system, according to claim 15, wherein the semiconductor circuit comprises a timer circuit, and
wherein the semiconductor circuit is configured to output a data signal that switches between charge and discharge of at least one of the first power storage element, the second power storage element, the third power storage element, and the fourth power storage element, when a measurement value of the timer circuit exceeds a reference value.

17. An energy management system comprising:
the power storage system according to claim 11;
an appliance; and
a control device connected to the power storage system and the appliance.

* * * * *